US012515901B2

(12) United States Patent

Ichikawa et al.

(10) Patent No.: US 12,515,901 B2
(45) Date of Patent: Jan. 6, 2026

(54) PAPER SHEET TRANSPORT SYSTEM, CONTROL DEVICE, AIR BLOWING DEVICE CONTROL METHOD, AND PROGRAM

(71) Applicant: JAPAN CASH MACHINE CO., LTD., Osaka (JP)

(72) Inventors: Masaaki Ichikawa, Osaka (JP); Hirokazu Arai, Osaka (JP)

(73) Assignee: JAPAN CASH MACHINE CO., LTD., Osaka (JP)

( * ) Notice: Subject to any disclaimer, the term of this patent is extended or adjusted under 35 U.S.C. 154(b) by 217 days.

(21) Appl. No.: 18/252,248

(22) PCT Filed: Sep. 2, 2021

(86) PCT No.: PCT/JP2021/032362
§ 371 (c)(1),
(2) Date: May 9, 2023

(87) PCT Pub. No.: WO2022/102225
PCT Pub. Date: May 19, 2022

(65) Prior Publication Data

US 2023/0416039 A1 Dec. 28, 2023

(30) Foreign Application Priority Data

Nov. 13, 2020 (JP) ................................ 2020-189418

(51) Int. Cl.
*B65H 5/22* (2006.01)
*B65H 43/00* (2006.01)
*G07D 11/16* (2019.01)

(52) U.S. Cl.
CPC ............. *B65H 5/228* (2013.01); *B65H 43/00* (2013.01); *G07D 11/16* (2019.01); *B65H 2701/1912* (2013.01); *G07D 2211/00* (2013.01)

(58) Field of Classification Search
CPC ....... B65H 5/228; B65H 2513/10; B65H 5/22
See application file for complete search history.

(56) References Cited

U.S. PATENT DOCUMENTS

2015/0291378 A1 10/2015 Ogura et al.

FOREIGN PATENT DOCUMENTS

EP 0960845 A1 * 12/1999 ............. B65H 5/228
JP 2003-137429 A 5/2003

(Continued)

OTHER PUBLICATIONS

WIPO, Japanese International Search Authority, International Search Report (with English translation) and Written Opinion mailed Oct. 5, 2021 in International Patent Application No. PCT/JP2021/032362, 8 pages.

(Continued)

*Primary Examiner* — Jeremy R Severson
(74) *Attorney, Agent, or Firm* — MASUVALLEY & PARTNERS; Peter Martinez

(57) ABSTRACT

The present invention is a paper sheet transport system including: an air blowing device that generates an air flow for transporting paper sheets; a transport device that transports paper sheets with the air flow; and a control device that controls the air blowing device, and the control device includes a measuring unit that measures the speed of paper sheets on the transport device, and an adjusting unit that adjusts the air flow according to a result of the measurement. The control device includes a detecting unit that detects arrival of paper sheets at a deceleration region, and, when paper sheets in the deceleration region are faster than a specific speed, the adjusting unit causes the air blowing device to generate an air flow in an opposite direction to that of an air flow for transporting the paper sheets.

6 Claims, 31 Drawing Sheets

(56) References Cited

FOREIGN PATENT DOCUMENTS

| | | | |
|---|---|---|---|
| JP | 6263724 | B2 | 1/2018 |
| JP | 2020-029327 | A | 2/2020 |
| JP | 2020-157164 | A | 10/2020 |
| JP | 2021-020744 | A | 2/2021 |

OTHER PUBLICATIONS

Japan Patent Office, Office Action mailed Dec. 6, 2022 with English translation in Japanese Patent Application No. 2020-189418, 7 pages.

* cited by examiner 500
540
510
520
520b
520c
521
525
540
541
541a
541b
544
544a
544b
544c
545
A
P
R
WIDTH DIRECTION 500
540
510
520
520b
521
525
541
544
545
P 500
510
520
520b
520c
521
540
541
544

500
510
520
520a
520b
520c
521
523
540
541
541a
541b
544
544a
544b
544c
545
A—A

TRANSITION ORDER

| | END MOMENT | AIR BLOWING DEVICE | SWITCHING VALVE |
|---|---|---|---|
| PREPARATORY STATE | N≧Nh | START ROTATING | NEUTRAL |
| ACCELERATION STATE | V≧Vb | ACCELERATION CONTROL | POSITIVE DIRECTION |
| CONSTANT-SPEED STATE | ARRIVAL AT P14 | CONSTANT-SPEED CONTROL | |
| DECELERATION STATE | ARRIVAL AT P16 | DECELERATION CONTROL | ACCORDING TO SPEED |

■CONSTANT-SPEED

| POSITION | SPEED | Q AFTER CHANGED | SWITCHING VALVE |
|---|---|---|---|
| Px~P13 | V≦Vb | Q×1.1 | POSITIVE DIRECTION |
| | Va2>V>Vb | MAINTAIN | |
| | Va1>V≧Va2 | Q×0.95 | |
| | V≧Va1 | Q×0.7 | |

※Px IS INITIAL DETECTION POSITION P

■DECELERATION STATE

| POSITION | SPEED | OUTPUT INTENSITY Q | SWITCHING VALVE |
|---|---|---|---|
| P14 | V≧Vc | MAINTAIN | NEUTRAL |
| | V<Vc | MAINTAIN | POSITIVE DIRECTION |
| P15 | V≧Vd1 | MAINTAIN | OPPOSITE DIRECTION |
| | Vd1>V≧Vd2 | MAINTAIN | NEUTRAL |
| | V<Vd2 | INITIALIZE | POSITIVE DIRECTION |

Xa=P14

FIG.33(b-2)

Xa=P15

PAPER SHEET TRANSPORT SYSTEM, CONTROL DEVICE, AIR BLOWING DEVICE CONTROL METHOD, AND PROGRAM

RELATED APPLICATIONS

This application is the U.S. National Phase of and claims priority to International Patent Application No. PCT/JP2021/032362, International Filing Date Sep. 2, 2021, entitled Paper Sheet Conveyance System, Control Device, Air Blowing Device Control Method, And Program, which claims benefit of Japanese Application No. JP2020-189418 filed Nov. 13, 2020, both of which are incorporated herein by reference in their entireties.

FIELD

The present invention relates to a paper sheet transport system, a control device, an air blowing device control method, and a program.

BACKGROUND

A paper sheet transport system including an air blowing device that generates an air flow for transporting paper sheets, and a transport device that transports paper sheets with the air flow is conventionally known. Some conventional paper sheet transport systems adopt a technique of appropriately adjusting the air flow (the intensity) generated by the air blowing device. For example, Patent Literature 1 discloses a technique of adjusting an air flow generated by an air blowing device according to the shape (a straight line or a curved line) of a route on which paper sheets are transported.

CITATION LIST

Patent Literature

Patent Literature 1: Japanese Patent Application Laid-open No. 2020-157164

SUMMARY

Technical Problem

In the configuration described in Patent literature 1, the air flow generated by the air blowing device is not automatically adjusted and needs to be manually adjusted. Therefore, an inconvenience that the operating time for adjusting the air flow generated by the air blowing device is lengthened is likely to occur. In view of the circumstances described above, the present invention has an object to enable easy adjustment of an air flow generated by an air blowing device.

Solution to Problem

In order to achieve the above object, a paper sheet transport system according to the present invention comprises: an air blowing device that generates an air flow for transporting paper sheets; a transport device that transports paper sheets with the air flow; and a control device that controls the air blowing device, wherein the control device includes a measuring unit that measures a speed of paper sheets on the transport device, and an adjusting unit that adjusts the air flow according to a result of the measurement.

Advantageous Effects of Invention

According to the present invention, the speed of paper sheets on a transport device is measured, and the air flow of an air blowing device is adjusted according to the result of the measurement. Therefore, the air flow generated by the air blowing device can be more easily adjusted than a configuration in which an air flow generated by an air blowing device is manually adjusted.

DESCRIPTION OF EMBODIMENTS

Figure 1:
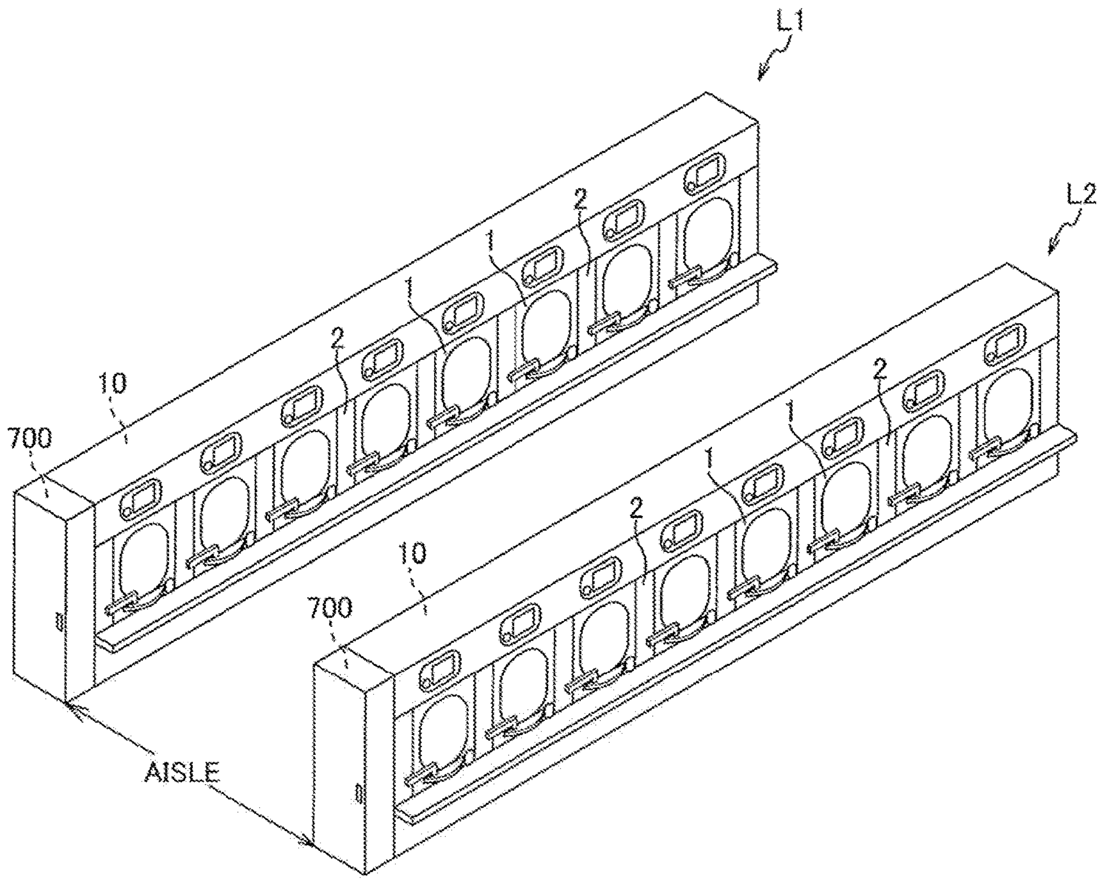
FIG. 1 is a perspective view illustrating a schematic configuration of bank facilities including a plurality of game machines.

The present invention will be described below in detail with embodiments illustrated in the drawings. Constituent elements, types, combinations, shapes, and relative arrangements described in the following embodiments are merely explanatory examples, and are not intended to limit the scope of the present invention solely thereto unless otherwise specified.

Embodiments of the present invention are described below in detail.

A. Banknote Transport System According to First Invention

A basic configuration of a banknote transport system according to a first invention, and an operation thereof are explained below.

The banknote transport system is installed on each of bank facilities in a game hall where various types of game machines such as pachinko machines or pachislot (pachinko-slot) machines are installed. While banknotes are mainly explained as an example of paper sheets in the following embodiment, the present invention is also applicable to paper sheets (sheets) other than the banknotes, including securities such as vouchers or gift certificates, cards, and the like.

Although not particularly illustrated or explained, the banknote transport system according to the present invention is also applied to a banknote transport system or a banknote transport device in casinos.

[Schematic Configuration of Bank Facilities]

FIG. 1 is a perspective view illustrating a schematic configuration of bank facilities including a plurality of game machines.

Game machines 1 are installed on bank facilities L (L1, L2, . . . ) and eight game machines 1 are arranged back to back on each of two opposing side surfaces of each of the bank facilities L, that is, a total of 16 game machines 1 are arranged back to back. An aisle on which players or clerks of the game hall walk is provided between the bank facilities L and a chair (not illustrated) is provided for each of the game machines 1 on the aisles.

A sandwiched machine 2 is installed for each of the game machines 1 on the bank facilities L. The sandwiched machine 2 includes a banknote inlet (a banknote input part) that receives input banknotes, a game media dispensing device that dispenses a number of pachinko balls corresponding to the money amount of the input banknotes, and the like. A banknote transport system 10 that transports banknotes inserted through the sandwiched machines 2 to a safe unit 700 placed at one end portion of the associated bank facility L is installed in each of the bank facilities L illustrated in FIG. 1.

Figure 2:
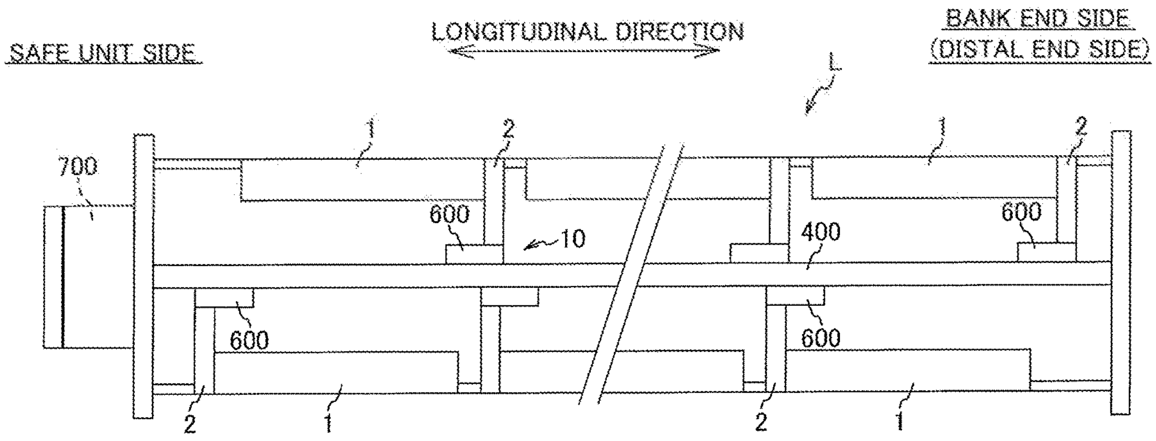
FIG. 2 is a plan view illustrating a schematic configuration of the bank facility including a plurality of the game machines.

FIG. 2 is a plan view illustrating a schematic configuration of the bank facility including a plurality of the game machines.

The banknote transport system 10 installed in each of the bank facilities L includes receiving units (banknote receiving devices) 600 that each receive banknotes inserted from the banknote inlet of the associated sandwiched machine 2 therein, a transport tube 400 that extends in a longitudinal direction of the bank facility L (an array direction of the game machines 1) and that transports the banknotes received by the receiving units 600, the safe unit 700 that is arranged at one end of the transport tube 400, and the like.

[Schematic Configuration of Banknote Transport System]

<Overall Outline>

Figure 3:
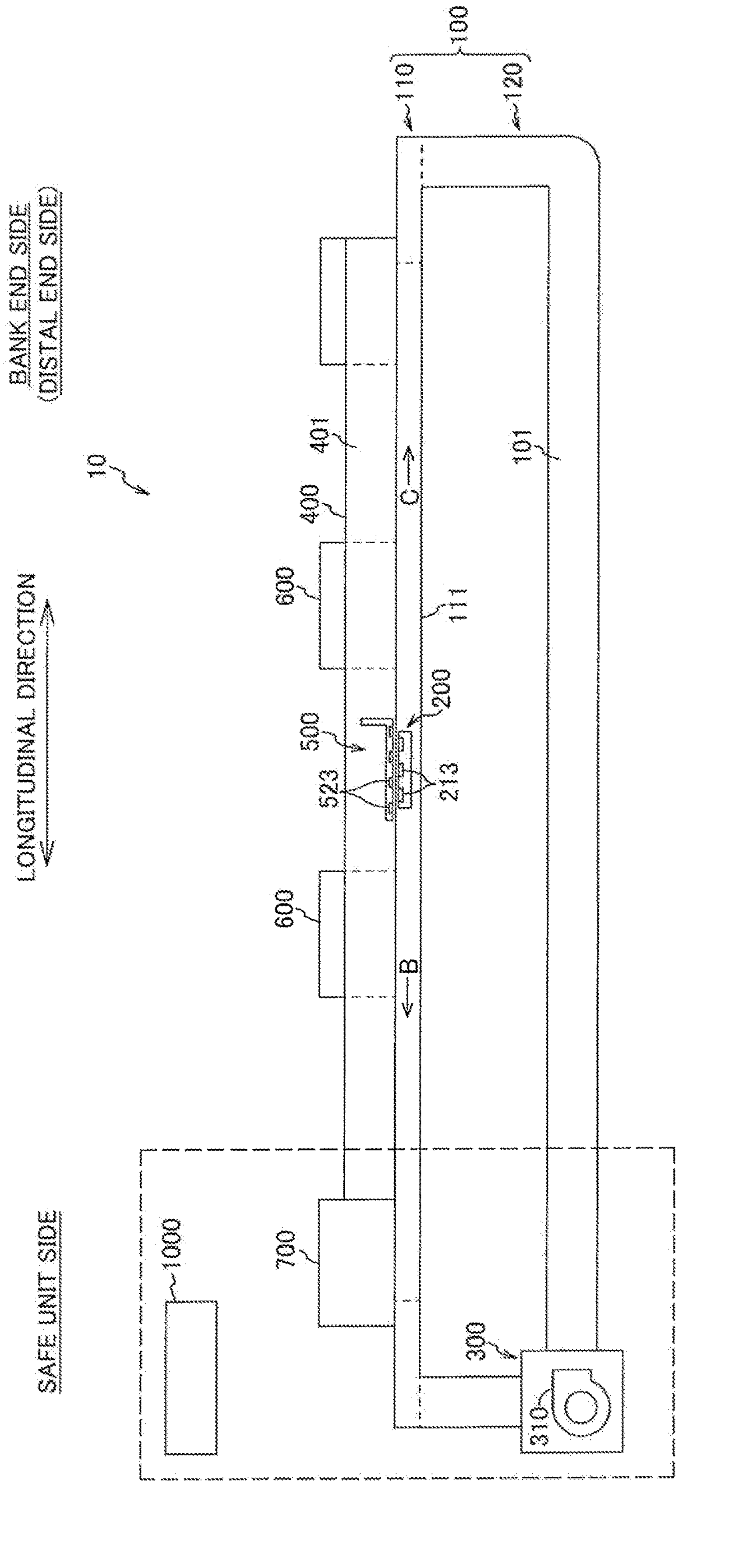
FIG. 3 is a schematic diagram illustrating a schematic configuration of a banknote transport system according to a first invention.

FIG. 3 is a schematic diagram illustrating a schematic configuration of the banknote transport system. The banknote transport system (paper sheet transport mechanism) 10 according to one embodiment of the first invention is characterized in transporting banknotes using an air flow and a magnetic force.

The banknote transport system 10 includes an air blowing tube 100 that forms a flow path (an air flow path 101) of a gas, a moving body 200 that travels (moves) inside the air blowing tube 100 while receiving an air flow flowing in a predetermined direction within the air blowing tube 100, an air-blow control unit 300 that controls the air flow flowing inside the air blowing tube 100, the transport tube 400 (a transport path 401) that has at least a portion arranged along the air blowing tube 100 to be adjacent to the air blowing tube 100, and a transport body 500 that is configured to be able to retain banknotes (paper sheets) and that travels (moves) inside the transport tube 400. The transport tube 400 forms the transport path 401 (a banknote (paper sheet) transport route and a transport space) for banknotes.

The moving body 200 includes a moving body magnetic material (moving body magnets 213), and the transport body 500 includes a transport body magnetic material (transport body magnets 523). At least one of the moving body magnetic material and the transport body magnetic material is formed of a magnet.

The banknote transport system 10 includes the receiving units 600 that receive banknotes input from outside and keep the banknotes at predetermined locations in the transport tube 400, respectively, the safe unit 700 that includes a banknote accommodating unit that accommodates therein banknotes transported by the transport body 500, and a management unit (control means) 1000 that controls the components constituting the banknote transport system 10.

In the present example, the air-blow control unit 300 and the safe unit 700 are accommodated in a body 1001 that has the management unit 1000 accommodated therein.

The banknote transport system 10 is characterized in moving the moving body 200 arranged in the air blowing tube 100 back and forth in the longitudinal direction of the air blowing tube 100 with the air flow flowing inside the air blowing tube 100, and in moving the transport body 500 arranged in the transport tube 400 along the longitudinal direction of the air blowing tube 100 with a magnetic force acting between the transport body 500 and the moving body 200. That is, the banknote transport system 10 is characterized in moving the transport body 500 in conjunction with movement of the moving body 200 receiving the air flow due to attraction and/or repulsion based on a magnetic force acting between the moving body magnets 213 and the transport body magnets 523.

<Outline of Components>

The air blowing tube 100 includes a moving route part 111 in at least a portion in the longitudinal direction, on which the moving body 200 travels along the longitudinal direction of the air blowing tube 100. The moving route part 111 is arranged in parallel and adjacently to the transport tube 400.

The moving body 200 moves inside the air blowing tube 100 while receiving an air flow flowing in a predetermined direction within the air blowing tube 100. The moving body magnets 213 mounted on the moving body 200 provide a repelling action and/or an attracting action due to a magnetic force to the transport body 500. The moving body 200 moves the moving body 200 in conjunction with its own movement due to the magnetic force.

The air-blow control unit 300 includes a blower (an air flow generating device) 310 that generates (produces) an air flow in a predetermined direction inside the air blowing tube 100 and that can change the flow volume and the flow speed of the air flow. The air-blow control unit 300 alternately generates an air flow in a first direction (a banknote collecting direction and an arrow-B direction) and an air flow in a second direction (a transport body returning direction and an arrow-C direction) being an opposite direction to the first direction inside the air blowing tube 100 to reciprocate the moving body 200 inside the air blowing tube 100.

The transport tube 400 forms a space through which banknotes and the transport body 500 move.

The transport body 500 receives the banknotes kept at the predetermined locations in the transport path 401 to retain the banknotes in an upright state, and moves inside the transport path 401 to transport the banknotes to the safe unit 700. The transport body magnets 523 mounted on the transport body 500 are subjected to the attracting action and/or the repelling action due to the magnetic force from the moving body magnets 213 included in the moving body 200. The transport body 500 moves inside the transport tube 400 in conjunction with the movement of the moving body 200 receiving the air flow.

When only the attracting force is to be applied between the moving body 200 and the transport body 500, both the magnetic materials mounted on the moving body 200 and the transport body 500 can be magnets, or one of the magnetic materials of the moving body 200 and the transport body 500 may be magnets and the other one may be a magnetic material such as iron. When only the repelling force is to be applied between the moving body 200 and the transport body 500, both the magnetic materials mounted on the moving body 200 and the transport body 500 are formed of magnets.

The receiving unit (the banknote receiving device) 600 receives banknotes inserted from the banknote inlet (the banknote inserting part) of the associated sandwiched machine 2 therein and keeps the banknotes at a predetermined location in the transport path 401. The receiving unit 600 is provided for each of the sandwiched machines 2. A plurality of the receiving units 600 are installed in the longitudinal direction of the transport tube 400 at a predetermined interval.

The safe unit 700 includes a banknote accommodating part that accommodates therein banknotes transported by the transport body 500, a drive mechanism that drives members related to accommodation of the banknotes in the banknote accommodating part, and the like.

The management unit (control means) 1000 controls operations of the components constituting the banknote transport system 10. The management unit 1000 is configured to include a general computer device that includes a CPU (Central Processing Unit), a ROM (Read Only Memory), a RAM (Random Access Memory), and the like and in which these units are connected via a bus. The CPU is an arithmetic unit that controls the entire bank transport system 10. The ROM is a nonvolatile memory that has a control program to be executed by the CPU, data, and the like stored therein. The RAM is a volatile memory to be used as a work area for the CPU. The CPU reads the control program stored in the ROM to load the control program into the RAM and execute the control program, so that various functions are realized.

[Detailed Configuration of Banknote Transport System]

Detailed configurations of the components of the banknote transport system according to the embodiment of the first invention are explained.

<Air Blowing Tube>

The air blowing tube is explained with reference to FIGS. 3 and 4.

Figure 4:
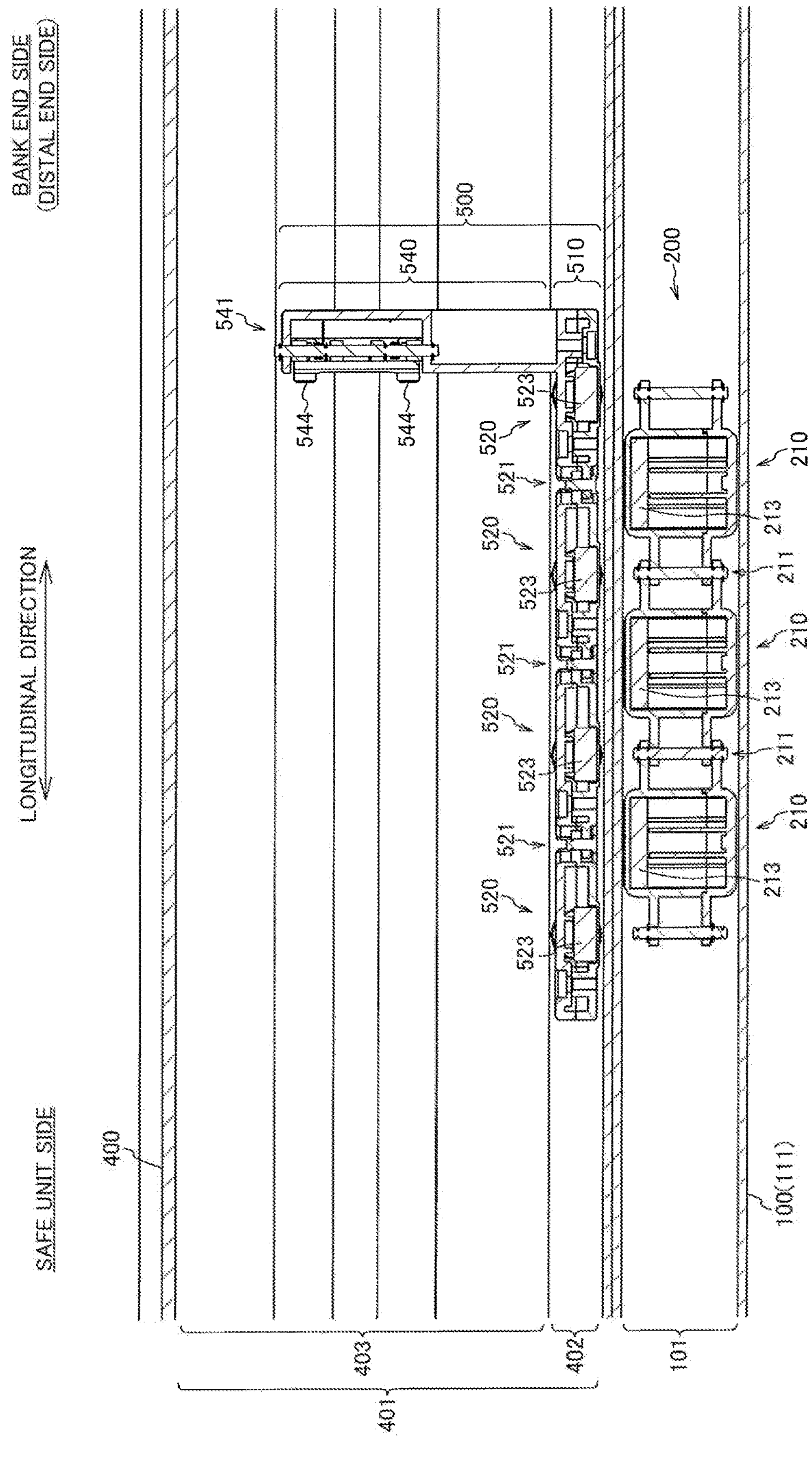
FIG. 4 is a vertical sectional view of a moving body, an air blowing tube including the moving body, a transport body, and a transport tube including the transport body in a case in which the moving body and the transport body repel each other due to a magnetic force.

FIG. 4 is a vertical sectional view of the moving body, the air blowing tube including the moving body, the transport body, and the transport tube including the transport body in a case in which the moving body and the transport body repel each other due to a magnetic force.

The air blowing tube 100 illustrated in FIG. 3 includes a first air blowing tube 110 including the moving route part 111, and a second air blowing tube 120 forming the air flow path 101 in an endless manner with the first air blowing tube 110 through a switching valve 325 (see FIG. 5), which will be described later.

Since the banknote transport system 10 moves the transport body 500 using a magnetic force, the moving route part 111 of the air blowing tube 100 includes a configuration that does not affect the travel of the moving body 200 and the travel of the transport body 500 based on the magnetic force. While it is desirable that the moving route part 111 is entirely formed of a non-magnetic material, the moving route part 111 may include a magnetic material in a portion within a range that does not affect the travel of the moving body 200 and the transport body 500.

The moving route part 111 includes a configuration (the thicknesses of the tube, the spacing between tubes, the shape thereof, and the like) that can apply a magnetic force between the moving body 200 arranged inside the moving route part 111 and the transport body 500 arranged inside the transport tube 400.

With the configuration of the air blowing tube 100 separate from and independent of the transport tube 400, an airtight flow path can be formed in the air blowing tube 100. Reduction in the transport force of the moving body 200 due to air leakage to outside of the air blowing tube 100 can be prevented. Furthermore, the blower 310 being relatively inexpensive and outputting low power can be adopted as a blower to be used to generate an air flow and reduction in the cost of the banknote transport system 10 can be realized. The air flow inside the air blowing tube 100 can be reliably controlled even when the air blowing tube 100 is elongated with an increase in the banknote transport distance. Since the moving body 200 is caused to travel with the air flow, the need to arrange a mechanical configuration such as a gear or a transport belt, lines, or electrical contacts inside the air blowing tube 100 is eliminated and the durability of the air blowing tube 100 and the moving body 200 arranged therein is increased. Furthermore, external air does not flow in the air flow path 101 airtightly configured, so that grit and dust in the external air are not drawn therein and the inside of the air flow path 101 can be kept clean.

<Moving Body>

It suffices that the moving body 200 has a shape and a configuration that enable movement in the air blowing tube 100 by being subjected to an air pressure.

As illustrated in FIG. 4, the moving body 200 has a configuration in which a plurality of divided pieces 210, 210, are sequentially coupled to each other with hinge parts 211 along a travel direction of the moving body 200 (the longitudinal direction of the air blowing tube 100). The divided pieces 210 illustrated in the present example have same configurations and each of the divided pieces 210 has the moving body magnet 213.

The moving body 200 includes the moving body magnets 213 respectively arranged at locations, in attitudes, and in shapes that enable to apply a magnetic force to the transport body 500. In the present example, the moving body magnets 213 are arranged on a side of the moving body 200 nearer the transport tube 400. The moving body magnets 213 included in the moving body 200 are arranged spaced apart from each other in the travel direction of the moving body 200. In the present example, each of the moving body magnets 213 is attached to the associated divided piece 210 in such a manner that the N pole (one of the poles) faces the side of the transport tube 400 (the upper side in FIG. 4) and the S pole (the other pole) faces the lower side in FIG. 4.

The moving body 200 illustrated in the present example is constituted of three divided pieces 210. The divided pieces 210 are coupled to each other to be angularly displaceable within a predetermined range in the upper-lower direction in FIG. 4 and the depth direction of the plane of the paper centering on the hinge parts 211, respectively. With this configuration, the moving body 200 can smoothly move in the air blowing tube 100 while being displaced even when the air blowing tube 100 forms the air flow path 101 curved in the upper-lower or right-left direction.

<Relation Between Air Blowing Tube and Moving Body>

The inner surface shape of the moving route part 111 and the outer surface shape (configuration) of the moving body 200 are formed in such a manner that the moving body 200 does not relatively rotate on a virtual axis extending along the longitudinal direction of the moving route part 111 with respect to the moving route part 111. For example, the horizontal sectional shape (the shape on a cross section orthogonal to the longitudinal direction) of the moving route part 111 and the horizontal sectional shape of the divided pieces 210 of the moving body 200 are respectively formed into rectangular shapes. With provision of the configuration described above, the attitude of the moving body 200 in the moving route part 111 can be maintained to cause the N pole (one of the poles) of each of the moving body magnets 213 to always face the side of the transport tube 400.

<Air-Blow Control Unit>

Figure 5:
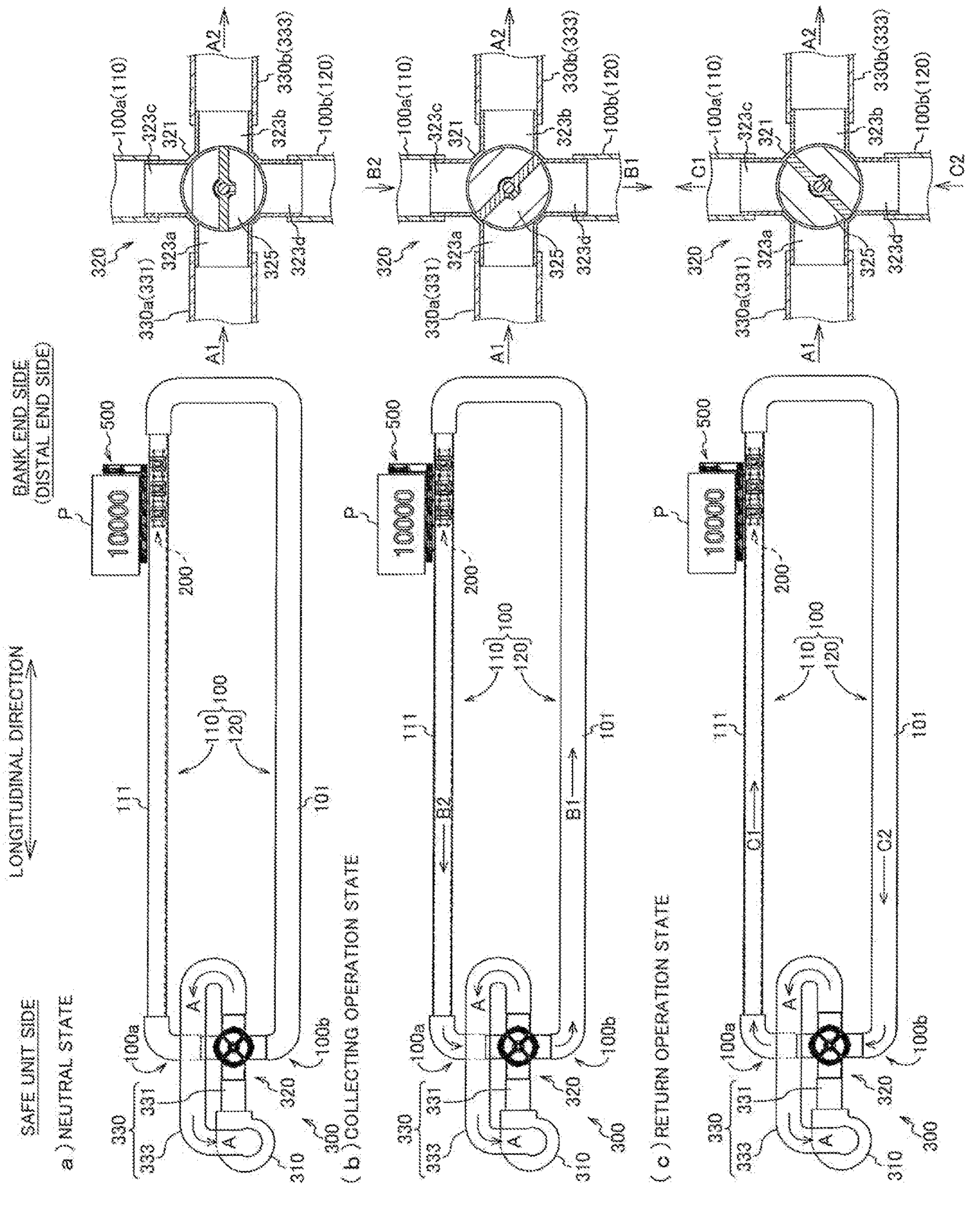
FIGS. 5(*a*) to 5(*c*) are schematic diagrams illustrating a relation between the air blowing tube and an air-blow control unit according to one embodiment of the first invention.

FIGS. 5(*a*) to 5(*c*) are schematic diagrams illustrating a relation between the air blowing tube and the air-blow control unit according to one embodiment of the first invention.

The air-blow control unit 300 according to the present embodiment includes a single blower 310 that generates an air flow flowing in a certain direction, and a switching unit 320 (the switching valve 325) that controls the direction of the air flow in the air blowing tube 100. The air-blow control unit 300 is characterized in switching the direction of the air flow in the air blowing tube 100 between the first direction (the banknote collecting direction and the arrow-B direction) and the second direction (the moving body returning direction and the arrow-C direction) opposite to the first direction using the switching unit 320.

The air-blow control unit (an air flow control apparatus) 300 includes the switching unit (an air flow switching unit) 320 that controls the discharge direction of the air flow, a first circulation pipe 330 that forms an endless air flow path through the switching unit 320, and the blower 310 that is arranged at an appropriate place in the first circulation pipe 330 to generate an air flow flowing in a certain direction inside the first circulation pipe.

The switching unit 320 includes a casing 321 in which four flow paths 323 (a first flow path 323*a* to a fourth flow path 323*d*: ports) respectively connecting to external pipes are formed, and the switching valve 325 that is arranged in a joint portion (an intersecting portion) of the four flow paths 323 to switch the communication state among the flow paths 323 and/or the opening degrees at the time of communication. The flow paths 323 are communicated with and connected to an air discharge tube 331, an air intake tube 333, the first air blowing tube 110, and the second air blowing tube 120 that are external pipes, respectively. In the present example, the flow paths 323 are arranged in a cross manner (a radial manner). The switching valve 325 illustrated in the present example is a rotary valve such as a ball valve and the switching valve 325 rotates in the casing 321 by a predetermined angle, whereby the communication states of the flow paths 323 and the opening degrees of the flow paths 323 are switched.

The switching valve 325 is an electric-operated valve and is driven by a motor to control the rotation angle. For example, a stepping motor can be used as the motor. The switching valve 325 is, for example, controlled to have a desired rotation angle by the management unit 1000 that controls the rotation angle of the stepping motor on the basis of a drive pulse. Of course, other methods may be used for driving means for rotating the switching valve 325 and control of the rotation angle of the switching valve 325. For example, a configuration in which a rotary encoder that rotates in conjunction with the switching valve 325, and a sensor that detects the rotation angle of the rotary encoder are mounted on the switching unit 320 and in which the management unit 1000 executes feedback control of the rotation angle of the switching valve 325 may be adopted.

The first circulation pipe 330 includes the air discharge tube 331 that has one end portion (one end portion 330*a* of the first circulating pipe 330) communicatively connected to the first flow path 323*a* of the switching unit 320 and the other end portion communicatively connected to the outlet of the blower 310, and the air intake tube 333 that has one end portion communicatively connected to the inlet of the blower 310 and the other end portion (the other end portion 330*b* of the first circulation pipe 330) communicatively connected to the second flow path 323*b* of the switching unit 320.

The air blowing tube (the second circulation pipe) 100 has one end portion 100*a* communicatively connected to the third flow path 323*c* of the switching unit 320 and the other end portion 100*b* communicatively connected to the fourth flow path 323*d* of the switching unit 320, and forms an endless air flow path through the switching unit 320. The air blowing tube 100 reciprocates the moving body 200 placed therein in the arrow-B direction and the arrow-C direction in FIG. 5 with the air flow.

The air blowing tube 100 according to the present example includes the first air blowing tube 110 forming the moving route part 111 of the moving body 200, and the second air blowing tube 120 communicatively connected to the first air blowing tube 110. The first air blowing tube 110 is communicatively connected to the third flow path 323*c* and the second air blowing tube 120 is communicatively connected to the fourth flow path 323*d*.

<<Operation of Switching Unit: Neutral State>>

FIG. 5(*a*) illustrates a neutral state.

The switching valve 325 is at a neutral position for establishing communication between the first flow path 323*a* and the second flow path 323*b* while not establishing communication between the first and second flow paths 323*a* and 323*b* and the third and fourth flow paths 323*c* and 323*d*.

Accordingly, the air flow circulates in the first circulation pipe 330 in an arrow-A (A1 and A2) direction and no air flow is generated inside the air blowing tube 100. Therefore, the moving body 200 is in a state stopped in the air blowing tube 100.

<<Operation of Switching Unit: First Communication State>>

FIG. 5(*b*) illustrates a first state in which an air flow flowing in the air blowing tube 100 in the first direction (an arrow-B1 or B2 direction) is generated inside the air blowing tube 100. This state is, for example, a banknote collecting operation state for transporting banknotes collected by the transport body 500 to the safe unit 700.

The switching valve 325 is in a first communication position for establishing communication between the first flow path 323*a* and the fourth flow path 323*d* and establishing communication between the second flow path 323*b* and the third flow path 323*c*. At this time, the first flow path 323*a* and the fourth flow path 323*d* are not communicated with the second flow path 323*b* and the third flow path 323*c*.

The air circulates in an endless manner between the first circulation pipe 330 and the air blowing tube 100. That is, air (in the arrow-A1 direction) discharged from the discharge tube 331 to flow in the first flow path 323*a* flows in the second air blowing tube 120 from the fourth flow path 323*d* (in the arrow-B1 direction) due to the switching valve 325. Air flowing in the arrow-B2 direction inside the first air blowing tube 110 to flow in the third flow path 323*c* flows in the intake tube 333 from the second flow path 323*b* (in the arrow-A2 direction) due to the switching valve 325, returns to the blower 310, and is discharged again from the discharge tube 331.

<<Operation of Switching Unit: Second Communication State>>

FIG. 5(*c*) illustrates a second state in which an air flow flowing in the second direction (an arrow-C1 or C2 direction) is generated inside the air blowing tube 100. This state is, for example, a return operation state for returning the transport body 500 from the side of the safe unit 700 (the side of the management unit 1000) to the distal end side of the transport tube 400.

The switching valve 325 is in a second communication position for establishing communication between the first flow path 323*a* and the third flow path 323*c* and establishing communication between the second flow path 323*b* and the fourth flow path 323*d*. At this time, the first flow path 323*a* and the third flow path 323*c* are not communicated with the second flow path 323*b* and the fourth flow path 323*d*.

The air circulates in an endless manner between the first circulation pipe 330 and the air blowing tube 100. That is, air (in the arrow-A1 direction) discharged from the discharge tube 331 to flow in the first flow path 323*a* flows in the first air blowing tube 110 from the third flow path 323*c* (the arrow-C1 direction) due to the switching valve 325. Air flowing in the arrow-C2 direction inside the second air blowing tube to flow in the fourth flow path 323*d* flows in the intake tube 333 from the second flow path 323*b* (in the arrow-A2 direction) due to the switching valve 325, returns to the blower 310, and is discharged again from the discharge tube 331.

<<Operation of Switching Unit: Summary>>

By connecting two endless pipes (the first circulation pipe 330 and the air blowing tube 100) via the switching unit 320 as described above, three states including the neutral state in which no air flow is generated in the air blowing tube 100, the first communication state in which an air flow flowing in the first direction (the arrow-B direction) is generated inside the air blowing tube 100, and the second communication state in which an air flow flowing in the second direction (the arrow-C direction) is generated inside the air blowing tube 100 can be switched by changing the position of the switching valve 325 while an air flow in a certain direction (the arrow-A direction) is generated by the single blower 310.

In intermediate positions taken by the switching valve 325 among the three states described above, the communication state changes from those in the three states. That is, since the communication relation among the flow paths and the opening degrees of the flow paths can be adjusted according to the angle of the switching valve 325 in the casing 321 in the present embodiment, an air volume of the air flow according to the opening degrees of the flow paths can be generated inside the air blowing tube 100. That is, the speed of the moving body 200 can be varied according to the wind speed in the air blowing tube 100.

The moving speed of the moving body 200 may be adjusted by control of the air volume of the blower 310. For example, the air volume of the blower 310 may be adjusted by varying the rotational speed of blades of the blower 310 by PWM (Pulse Width Modulation) control.

However, since the rotation responsiveness of the switching valve 325 is higher than the variation responsiveness of the rotational speed of the blower 310, adjustment of the rotation angle of the switching valve 325 is more advantageous to rapidly adjust the speed of the moving body 200.

<Transport Tube>

The transport tube (transport route) 400 is explained with reference to FIGS. 4 and 6.

Figure 6:
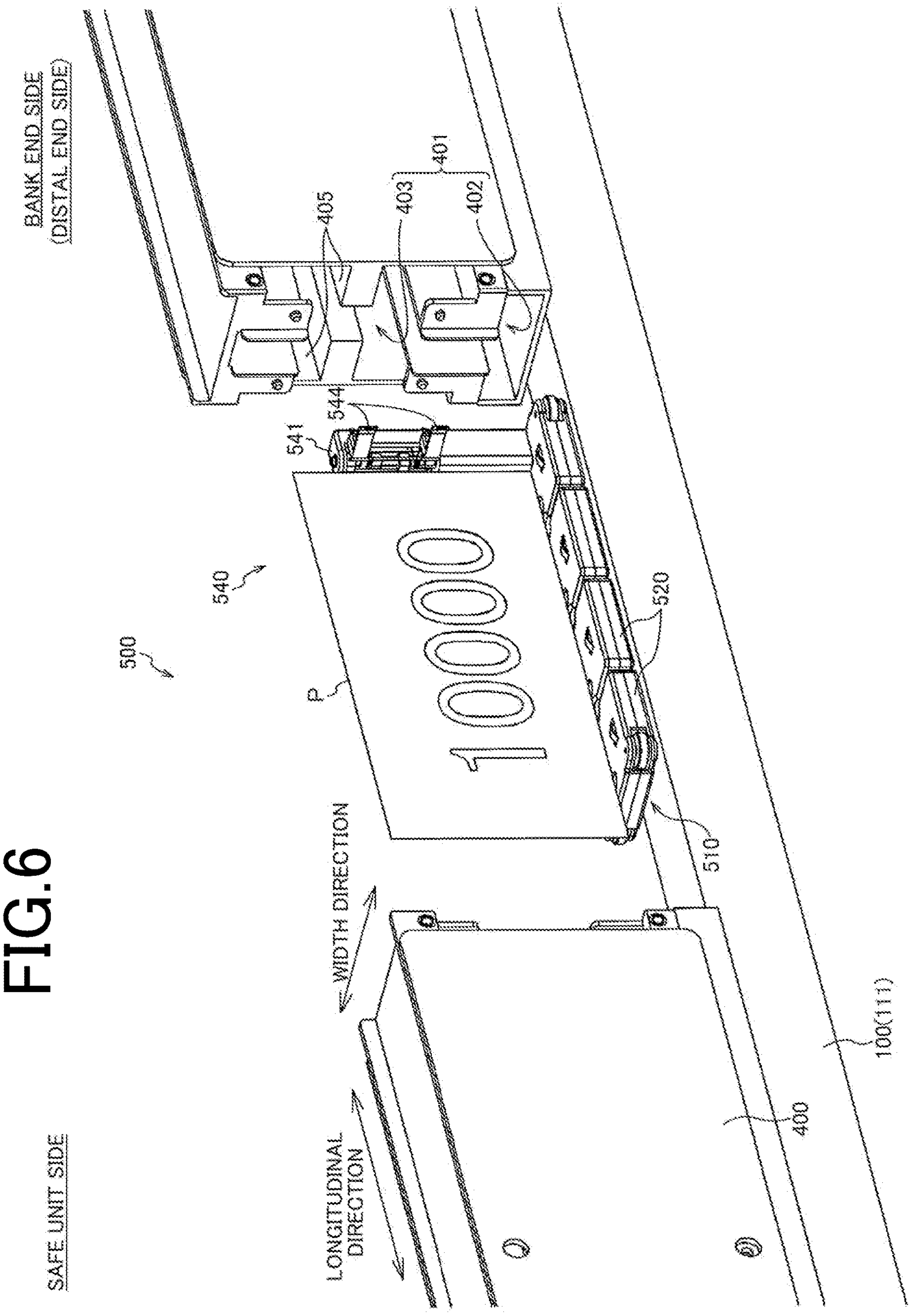
FIG. 6 is a perspective view illustrating a relation between the transport tube and the transport body.

FIG. 6 is a perspective view illustrating a relation between the transport tube and the transport body. FIG. 6 illustrates a state in which the inner part of the transport tube 400 is partially exposed.

Since the transport body 500 is transported with a magnetic force in the banknote transport system 10, the transport tube 400 is formed of a material that does not affect the travel of the transport body 500 based on the magnetic force. Although it is desirable that the transport tube 400 is entirely formed of a non-magnetic material, the transport tube 400 may include a magnetic material in a part thereof in a range that does not affect the travel of the transport body 500.

The transport tube 400 includes a configuration (the thickness of the tube, the spacing between the tubes, the shape thereof, and the like) that can apply a magnetic force between the moving body 200 arranged inside the moving route part 111 and the transport body 500 arranged inside the transport tube 400.

Although the transport tube 400 is arranged above the air blowing tube 100 in the present example, the location relation between the air blowing tube 100 and the transport tube 400 is not limited thereto. The transport tube 400 may be arranged below the air blowing tube 100 or the transport tube 400 may be arranged on the lateral side of the air blowing tube 100.

While the transport tube 400 is illustrated as means that constitutes the transport path 401, the means that constitutes the transport path 401 does not need to be tubular and the present invention can be achieved even with a configuration in which a part or the whole of the transport path 401 is open to outside. That is, the transport tube 400 may have any form as long as an elongated space serving as the transport path 401 can be formed therein.

<Transport Body>

As illustrated in FIGS. 4 and 6, the transport body 500 includes a transport base 510 that is arranged at a location nearer the air blowing tube 100 in the transport path 401 and that is subjected to a magnetic force from the moving body 200, and a banknote collecting/retaining part 540 provided on the opposite side of the transport base 510 to the air blowing tube 100.

<<Transport Base>>

The transport base 510 has a configuration in which a plurality of divided pieces 520, 520, . . . are sequentially coupled to each other with hinge parts 521 along the travel direction of the transport body 500 (the longitudinal direction of the transport tube 400). Each of the divided pieces 520 illustrated in the present example includes the transport body magnet 523.

The transport base 510 includes the transport body magnets 523 arranged at locations, in attitudes, and in shapes that can be subjected to the effect of the magnetic force from the moving body 200. In the present example, the transport body magnets 523 are arranged on the side of the transport base 510 nearer the air blowing tube 100. The transport body magnets 523 included in the transport base 510 are arranged spaced apart from each other in the travel direction of the transport body 500. In the present example, each of the transport body magnets 523 is attached to the associated divided piece 520 in such a manner that the N pole (one of the poles) faces the side of the air blowing tube 100 (the lower side in FIGS. 4 and 6) and the S pole (the other pole) faces the upper side in FIGS. 4 and 6. The transport base 510 magnetically levitates in the transport tube 400 under a repelling force due to the magnetic force from the moving body 200.

The transport base 510 illustrated in the present example is constituted of four divided pieces 520. The divided pieces 520 are coupled to each other to be angularly displaceable within a predetermined range in the upper-lower direction in FIGS. 4 and 6 and the depth direction of the plane of paper centering on the hinge parts 521, respectively. With the configuration described above, the transport body 500 can smoothly move in the transport tube 400 even when the transport tube 400 forms the transport path 401 curved in the upper-lower or right-left direction.

<<Banknote Collecting/Retaining Part>>

The banknote collecting/retaining part 540 is placed on the transport base 510. The banknote collecting/retaining part 540 includes a support member 541 that is upright in a direction away from the air blowing tube 100, and collecting members (collecting pawls) 544 that are protruded from the support member 541 in the width direction at an end portion on the bank end side in the longitudinal direction of the transport tube 400 (on the distal end side with respect to the safe unit 700). The support member 541 is protruded upward from a middle portion of the transport base 510 in the width direction.

The banknote collecting/retaining part 540 retains banknotes P to cause the long edge direction of the banknotes P to follow the longitudinal direction of the transport tube 400 and in an upright attitude. One of long sides (a long side positioned on the lower side in FIG. 6) of the banknote P is supported by the transport base 510. The rear end edge (one of short sides) of the banknote is supported by the support member 541 or the collecting members 544.

<Relation Between Transport Tube and Transport Body>

The transport tube 400 includes therein a base transport path 402 arranged on the side nearer the air blowing tube 100, and a banknote transport path 403 arranged on the opposite side to the air blowing tube 100. The base transport path 402 is a horizontally-long space where the transport base 510 of the transport body 500 travels, and the banknote transport path 403 is a vertically-long space where the banknote collecting/retaining part 540 of the transport body 500 and banknotes retained by the banknote collecting/retaining part 540 travel.

Since the transport body 500 illustrated in the present example travels while being subjected to a repelling force due to a magnetic force from the moving body 200, the base transport path 402 and the transport base 510 are configured to inhibit separation (movement toward the banknote transport path 403) of the transport base 510 from the base transport path 402 and maintain the transport base 510 at a location where the effect of the magnetic force can be received from the moving body 200.

The inner surface shape of the base transport path 402 and the outer surface shape of the transport base 510 are formed in such a manner that the transport base 510 does not relatively rotate on a virtual axis extending along the longitudinal direction of the base transport path 402 with respect to the base transport path 402. For example, the horizontal sectional shape of the base transport path 402 and the horizontal sectional shape of the transport base 510 are formed in rectangular shapes. With provision of the configuration described above, the attitude of the moving body 200 in the base transport path 402 is maintained to cause the N pole (one of the poles) of each of the transport body magnets 523 to always face the side of the air blowing tube 100.

<Relation Between Moving Body and Transport Body>

A relation between the moving body magnetic material and the transport body magnetic material is explained.

<<Only Repulsion>>

As illustrated in FIG. 4, one or more magnets can be arranged in both the moving body 200 and the transport body 500 in directions repelling each other to apply only the repelling force between the moving body 200 and the transport body 500. When only the repelling force is to be applied between the moving body 200 and the transport body 500, it is desirable that a plurality of magnets are arranged on at least one of the moving body 200 and the transport body 500 at a predetermined interval in the travel direction. With arrangement of the magnets in the travel direction on at least one of the moving body 200 and the transport body 500, the moving body magnets 213 and the transport body magnets 523 are alternately arrayed when the transport body 500 travels while being subjected to the repelling force from the moving body 200. That is, when the transport body 500 travels, the transport body 500 is relatively positioned with respect to the moving body 200. In this case, it is particularly preferable that the difference between the number of magnets included in the moving body 200 and the number of magnets included in the transport body 500 is one. In other words, when n is a natural number, it is preferable that n magnets are arranged on one of the moving body 200 and the transport body 500 and that n+1 magnets are arranged on the other one.

When the transport tube 400 is placed above the air blowing tube 100 and a repelling force is applied between the transport body 500 and the moving body 200, the transport body 500 levitates in the transport tube 400 and therefore the transport body 500 is less likely to be in contact with the transport tube 400. Therefore, it is possible to prevent reduction in the transport force of the transport body 500 due to friction with the transport tube 400 and smoothly move the transport body 500. Since the contact between the transport body 500 and the transport tube 400 is suppressed, generation of fine dust (powdery dust) due to contact between members can be prevented.

When the repelling force is applied between the moving body 200 and the transport body 500, the transport force can be increased by increasing the number of magnets included in the moving body 200 and the transport body 500.

<<Only Attraction>>

Figure 7:
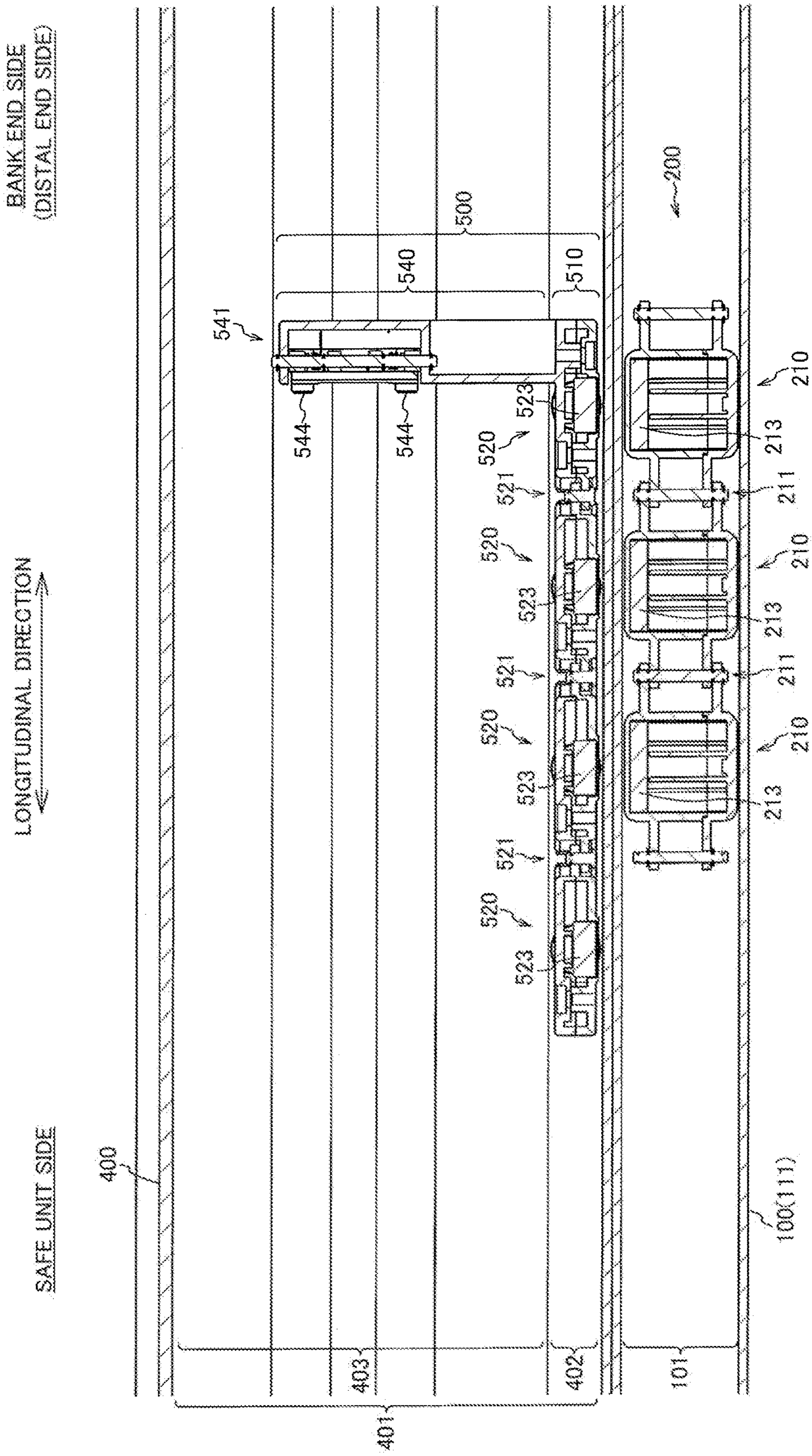
FIG. 7 is a vertical sectional view of the moving body, the air blowing tube including the moving body, the transport body, and the transport tube including the transport body in a case in which the moving body and the transport body attract each other due to a magnetic force.

FIG. 7 is a vertical sectional view of the air blowing tube and the transport tube including the moving body and the transport body in a case in which the moving body and the transport body attract each other due to a magnetic force.

In an illustrated example, the moving body magnets 213 and the transport body magnets 523 are respectively attached to the moving body 200 and the transport body 500 in attitudes attracting each other. Since the locations in the longitudinal direction of the moving body magnets 213 and the transport body magnets 523 match with walls of the air blowing tube 100 and the transport tube 400 interposed therebetween, positioning of the transport body 500 with respect to the moving body 200 is easy.

When only the attracting force based on the magnetic force is to be applied between the moving body 200 and the transport body 500, it suffices that at least either the magnetic material mounted on the moving body 200 or the magnetic material mounted on the transport body 500 is a magnet. For example, magnets may be arranged on one of the transport body 500 and the moving body 200 and a magnetic material (for example, iron plates), other than magnets, that is attracted by magnets may be arranged on the other one.

When only the attracting force based on the magnetic force is to be applied between the moving body 200 and the transport body 500, it suffices that at least one set of magnetic materials (for example, a set of a magnet and a magnet or a set of a magnet and an iron plate) is arranged on the transport body 500 and the moving body 200.

<<Repulsion and Attraction>>

Both the repelling force and the attracting force may be applied between the moving body 200 and the transport body 500. That is, a set of magnets that apply a repelling force to each other, and a set of magnets that apply an attracting force to each other may be mixed on the moving body 200 and the transport body 500. An example in which both the repelling force and the attracting force are applied will be described later with reference to FIG. 8.

<<Orientation of Magnets>>

While the poles of each of the magnets are arranged to face in the upper-lower direction (a staking direction of the air blowing tube 100 and the transport tube 400) in the embodiment described above, the poles of each of the magnets may be arranged to face in the travel direction (for example, to cause the N pole to face toward the safe unit and the S pole to face toward the bank end side/the distal end side). Alternatively, the poles of each of the magnets may be arranged diagonally to the travel direction. The action of the magnetic force can be appropriately adjusted according to the orientation of the magnets.

<<Orientation of Magnets: Arrangement in Tandem>>

Figure 8:
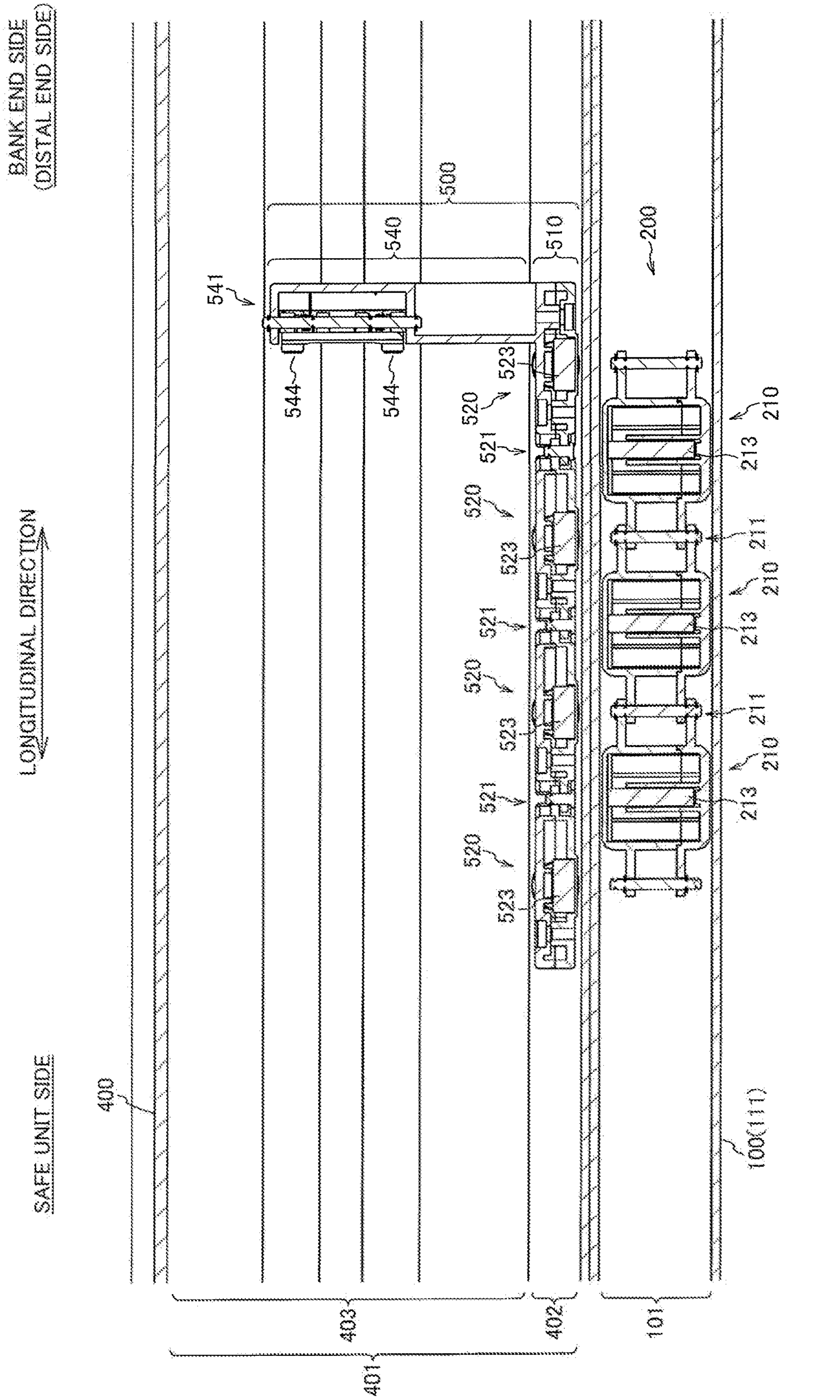
FIG. 8 is a vertical sectional view of the air blowing tube and the transport tube including the moving body and the transport body in a case in which the poles of each of moving body magnets are arranged to face in a travel direction.

FIG. 8 is a vertical sectional view of the air blowing tube and the transport tube including the moving body and the transport body in a case in which the poles of each of the moving body magnets are arranged to face in the travel direction.

In an illustrated example, each of the moving body magnets 213 is attached to the associated divided piece 210 in such a manner that the N pole (one of the poles) faces the side of the safe unit (the left side in FIG. 8) and the S pole (the other pole) faces the distal end side (the right side in FIG. 8). Each of the transport body magnets 523 is attached to the associated divided piece 520 in such a manner that the N pole faces the side of the air blowing tube 100 and the S pole faces the upper side in FIG. 8.

Since surfaces (the N poles) on the safe unit side of the moving body magnets 213 respectively repel the transport body magnets 523 (the N poles), and the surfaces (the S poles) on the distal end side of the moving body magnets 213 respectively attract the transport body magnets 523 (the N poles), both the repelling force and the attracting force can be applied between the moving body 200 and the transport body 500.

[First Modified Embodiment Related to Air Blow Control]

Figure 9:
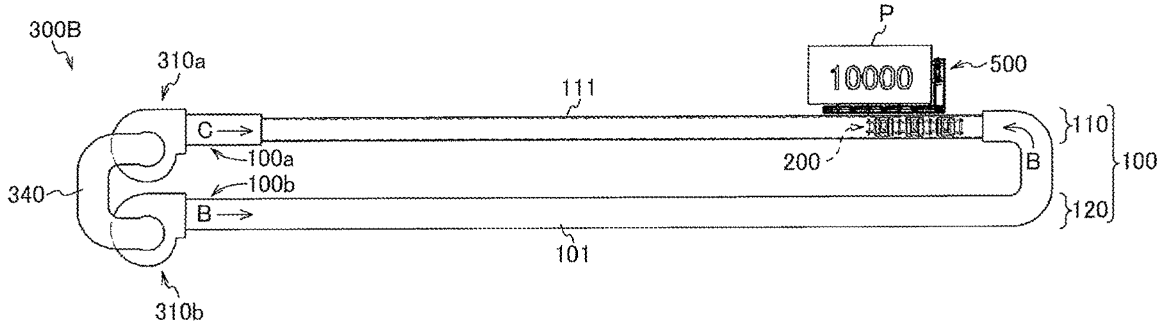
FIG. 9 is a diagram illustrating a first modification of the air-blow control unit.

FIG. 9 is a diagram illustrating a first modification of the air-blow control unit.

An air-blow control unit 300B may have a configuration including a blower 310*a* having an outlet connected to one end portion 100*a* of the air blowing tube 100, a blower 310*b* having an outlet connected to the other end portion 100*b* of the air blowing tube 100, and a connection pipe 340 that connects the inlets of the blowers 310*a* and 310*b* to each other. The air blowing tube 100 (the first air blowing tube 110 and the second air blowing tube 120) is configured in an endless manner through the two blowers 310*a* and 310*b* and the connection pipe 340.

Turning on/off of the blowers 310*a* and 310*b* and the air volume thereof are controlled by the management unit 1000.

When an air flow flowing in a first direction (an arrow-B direction) is to be generated inside the air blowing tube 100 (the first state and the banknote collecting operation state), one blower 310*b* is turned on to generate an air flow and the other blower 310*a* is turned off Air flowing inside the air blowing tube 100 flows in the outlet of the blower 310*a* and is discharged from the inlet of the blower 310*a*. The air further passes through the connection pipe 340 to return to the inlet of the blower 310*b* and is discharged from the outlet of the blower 310*b*.

When an air flow flowing in a second direction (an arrow-C direction) is to be generated inside the air blowing tube 100 (the second state and the transport body returning state), it suffices to turn one blower 310*b* off and turn the other blower 310*a* on to generate the air flow.

In this way, the use of two blowers also enables the air flow in the first direction and the air flow in the second direction to be generated inside the air blowing tube 100.

Since the inlets of the two blowers 310*a* and 310*b* are connected with the connection pipe 340 in the present example, air can be efficiently circulated inside the air flow path 101 airtightly configured.

[Second Modified Embodiment Related to Air Blow Control]

Figure 10:
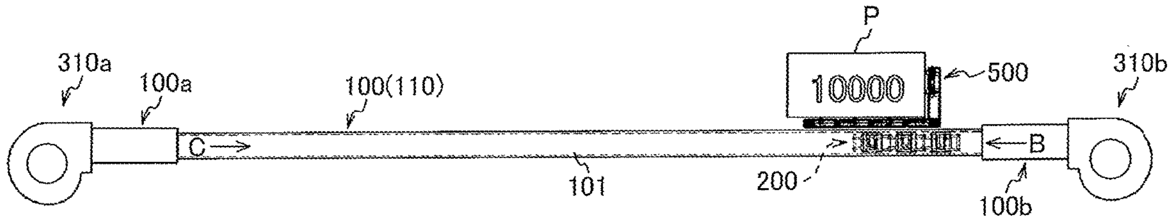
FIG. 10 is a diagram illustrating a second modification of the air-blow control unit.

FIG. 10 is a diagram illustrating a second modification of the air-blow control unit.

An air-blow control unit 300C may have a configuration including the blowers 310*a* and 310*b* at one end portion 100*a* and the other end portion 100*b* of the air blowing tube 100, respectively. Turning-on/off of the blowers 310*a* and 310*b* and the air volume thereof are controlled by the management unit 1000.

When an air flow flowing in a first direction (an arrow-B direction) is to be generated inside the air blowing tube 100 (the first state and the banknote collecting operation state), one blower 310*b* is turned on to generate an air flow and the other blower 310*a* is turned off. The blower 310*b* takes external air to the inside from the inlet and discharges the air, thereby generating the air flow in the arrow-B direction inside the air blowing tube 100. This air flow is taken into the blower 310*a* from the outlet of the blower 310*a* and is discharged from the inlet.

When an air flow flowing in a second direction (an arrow-C direction) is to be generated inside the air blowing tube 100 (the second state and the transport body returning state), it suffices to turn one blower 310*b* off and turn the other blower 310*a* on to generate the air flow.

Since the present example does not require pipes for causing the air flow path 101 to be a circulation path, the configuration is simplified.

B. Banknote Transport System According to Second Invention

<<Basic Configuration of Banknote Transport System>>

A banknote transport system according to a second invention is explained next.

The second invention includes further embodied details of the receiving units (banknote receiving devices) 600, the transport tube 400, the transport body 500, and the like in the banknote transport system 10 according to the first invention, and is explained with reference to FIGS. 1 to 10 where like parts are denoted by like reference signs.

Figure 11:
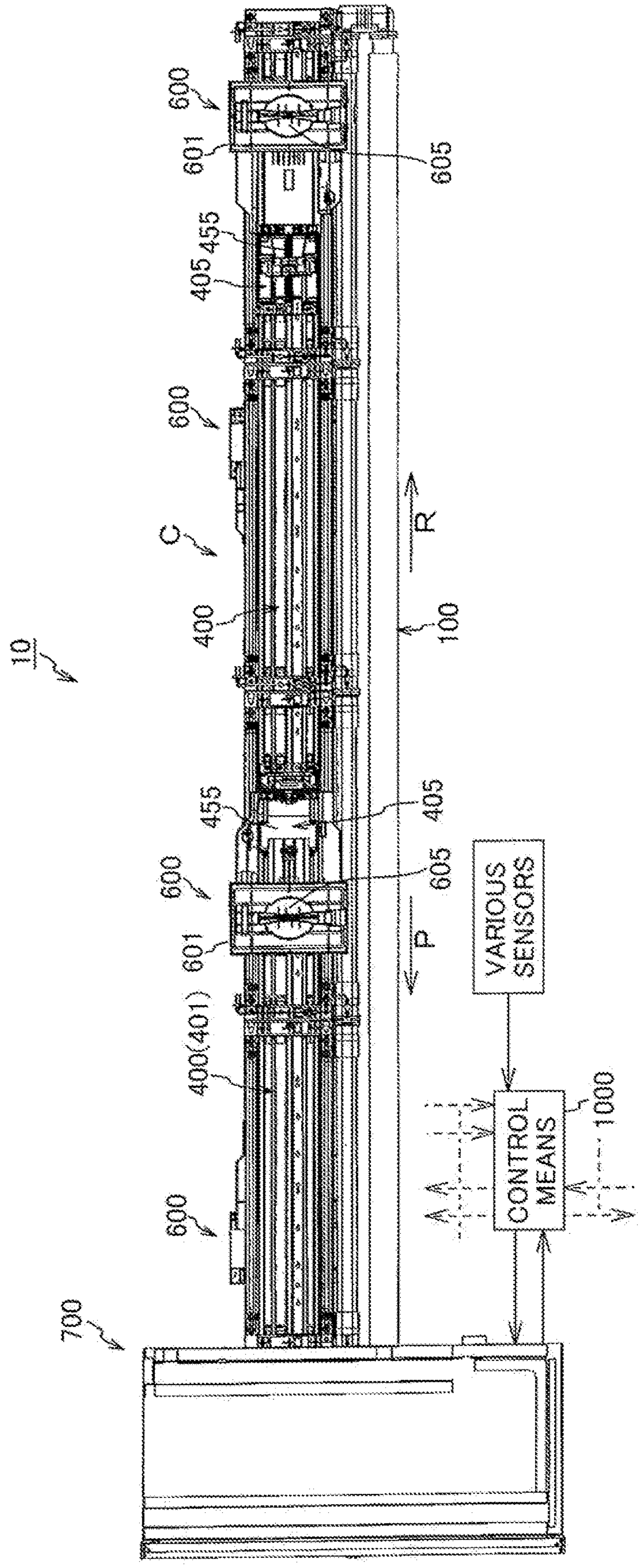
FIG. 11 is a front view of the banknote transport system 10 including receiving units (banknote receiving devices) 600.
Figure 12:
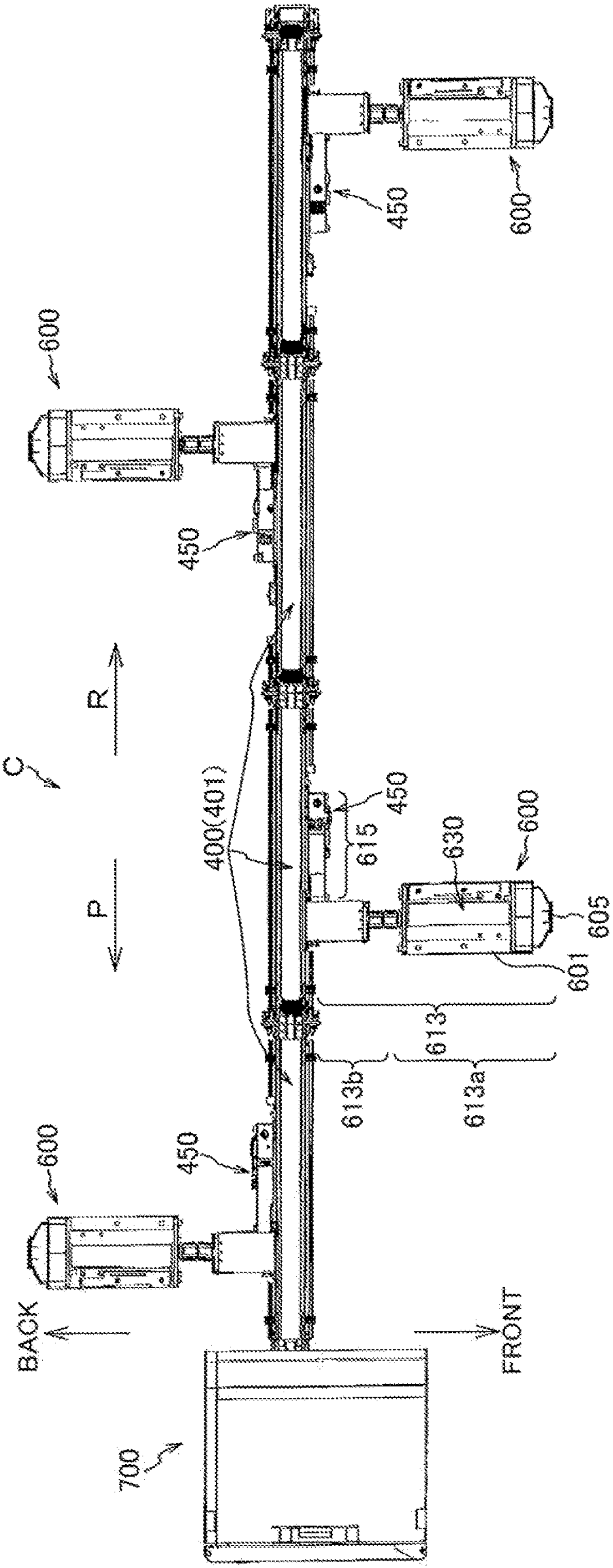
FIG. 12 is a plan view of the banknote transport system.
Figure 13:
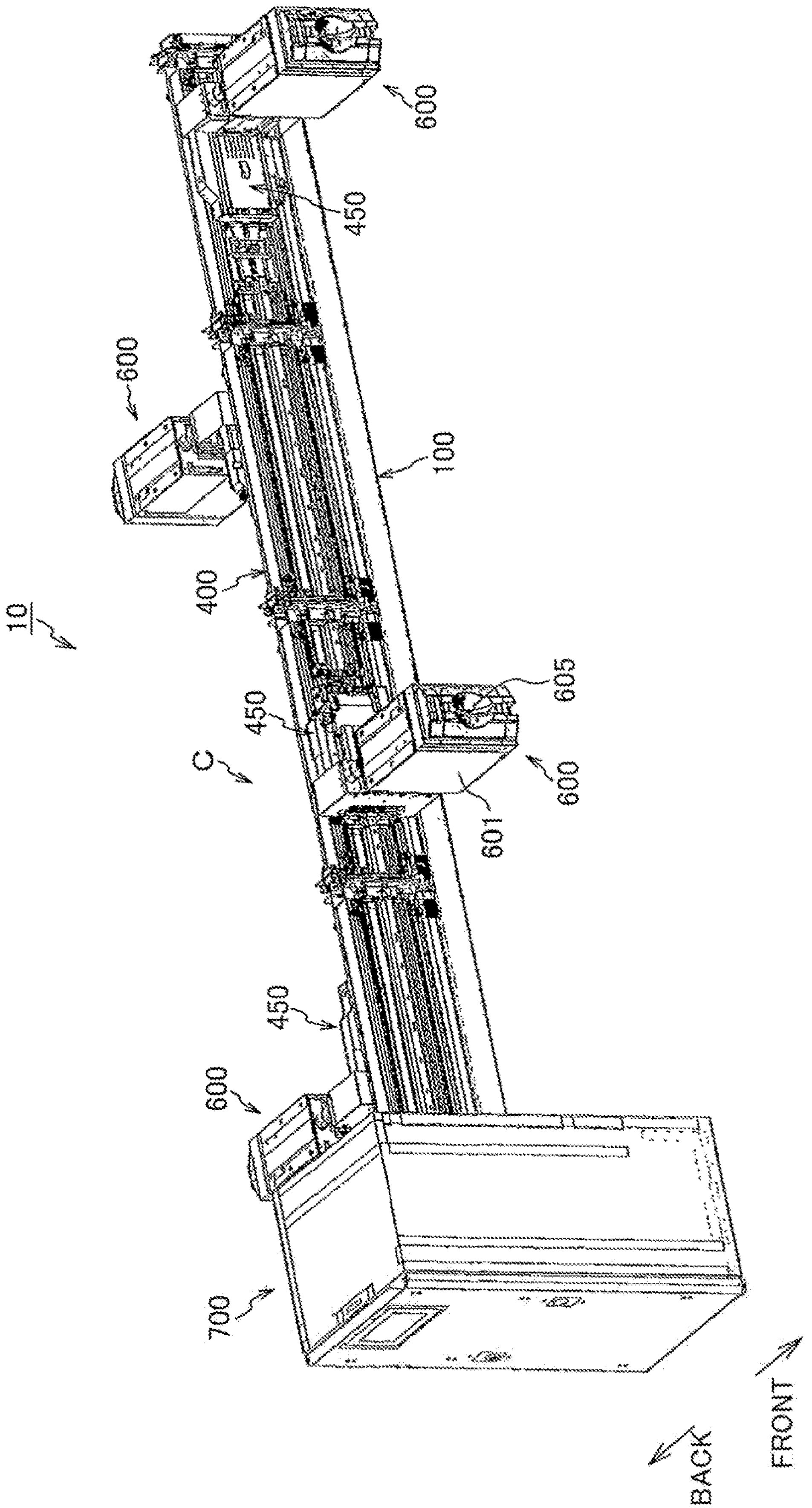
FIG. 13 is a front left perspective view of the banknote transport system.
Figure 14:
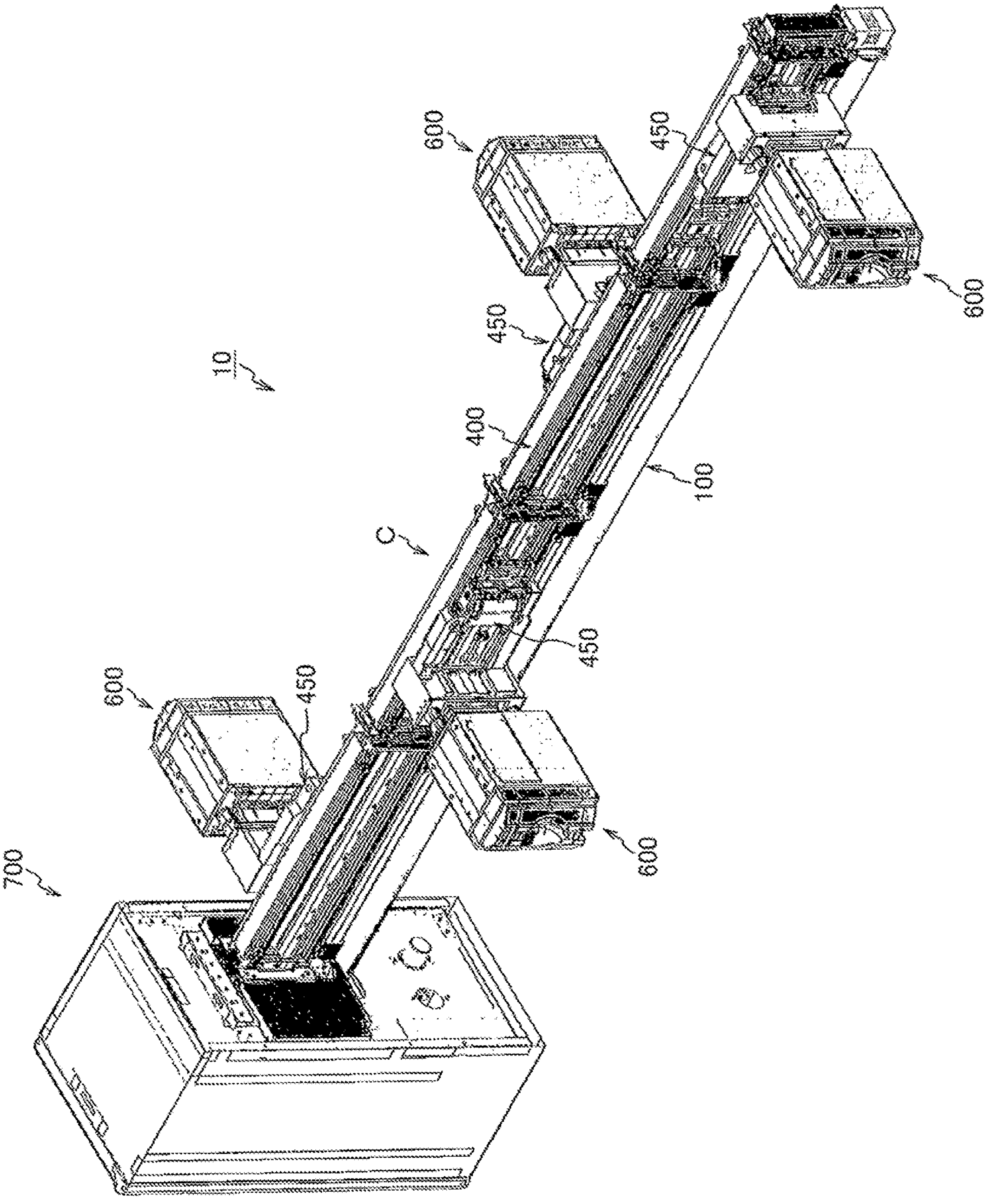
FIG. 14 is a front right perspective view of the banknote transport system.

FIG. 11 is a front view of the banknote transport system 10 including the receiving units (banknote receiving devices) 600, FIG. 12 is a plan view of the banknote transport system, FIG. 13 is a front left perspective view of the banknote transport system, and FIG. 14 is a front right perspective view of the banknote transport system.

Figure 15:
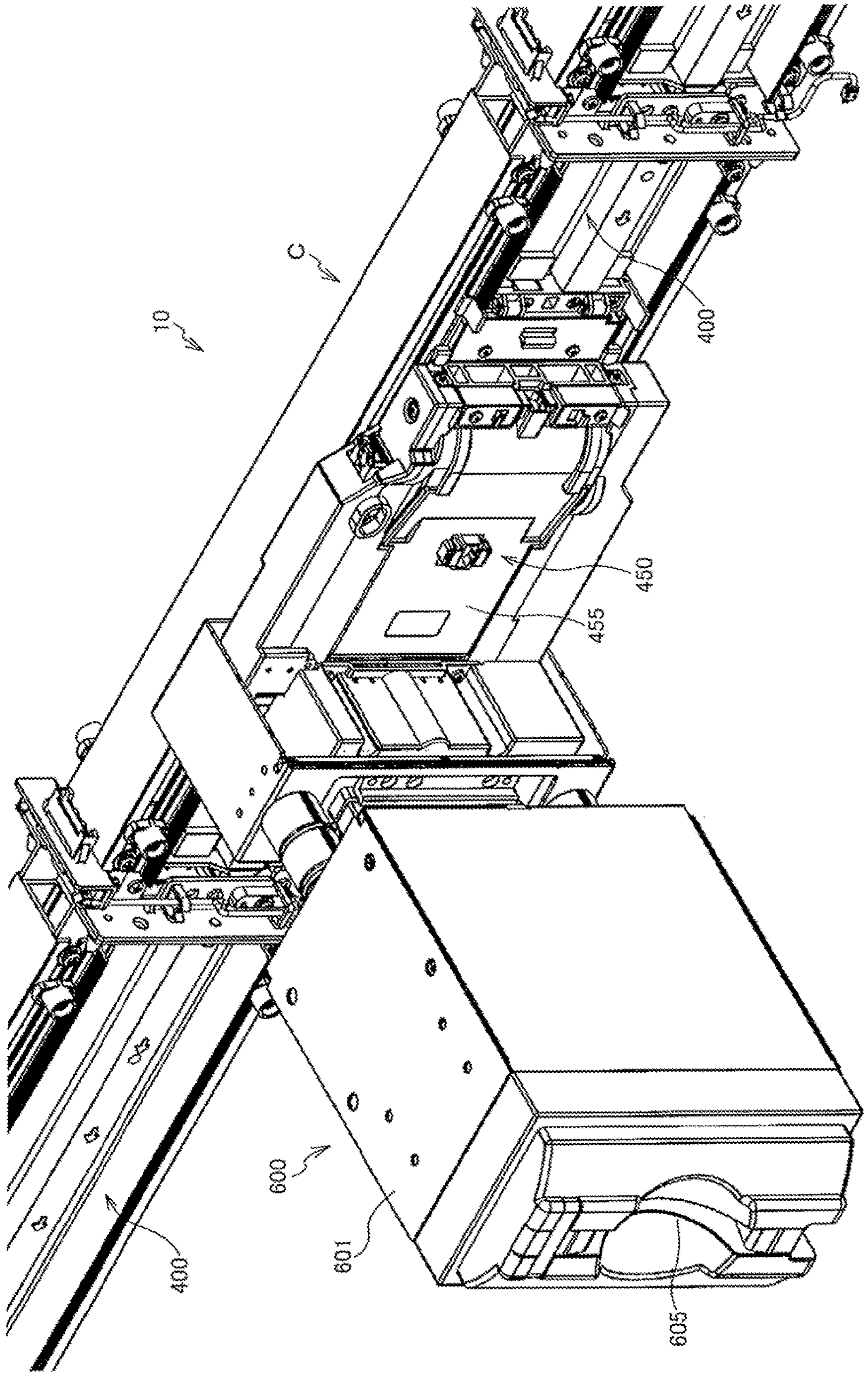
FIG. 15 is a perspective view illustrating a configuration of a coupling portion between the receiving unit and a transport tube 400.
Figure 16:
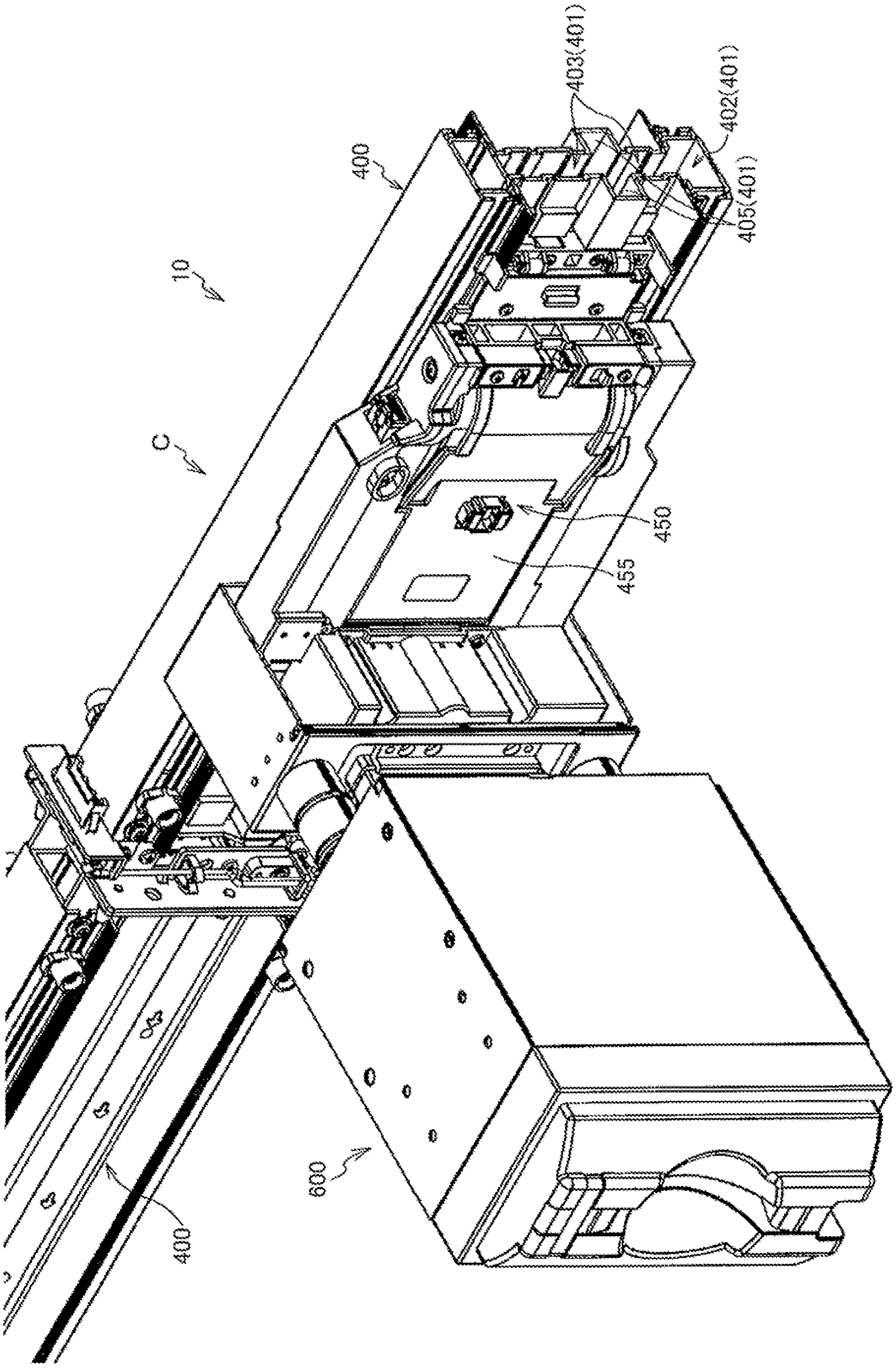
FIG. 16 is a perspective view illustrating a part of the transport tube in FIG. 15 in a vertical section.
Figure 17:
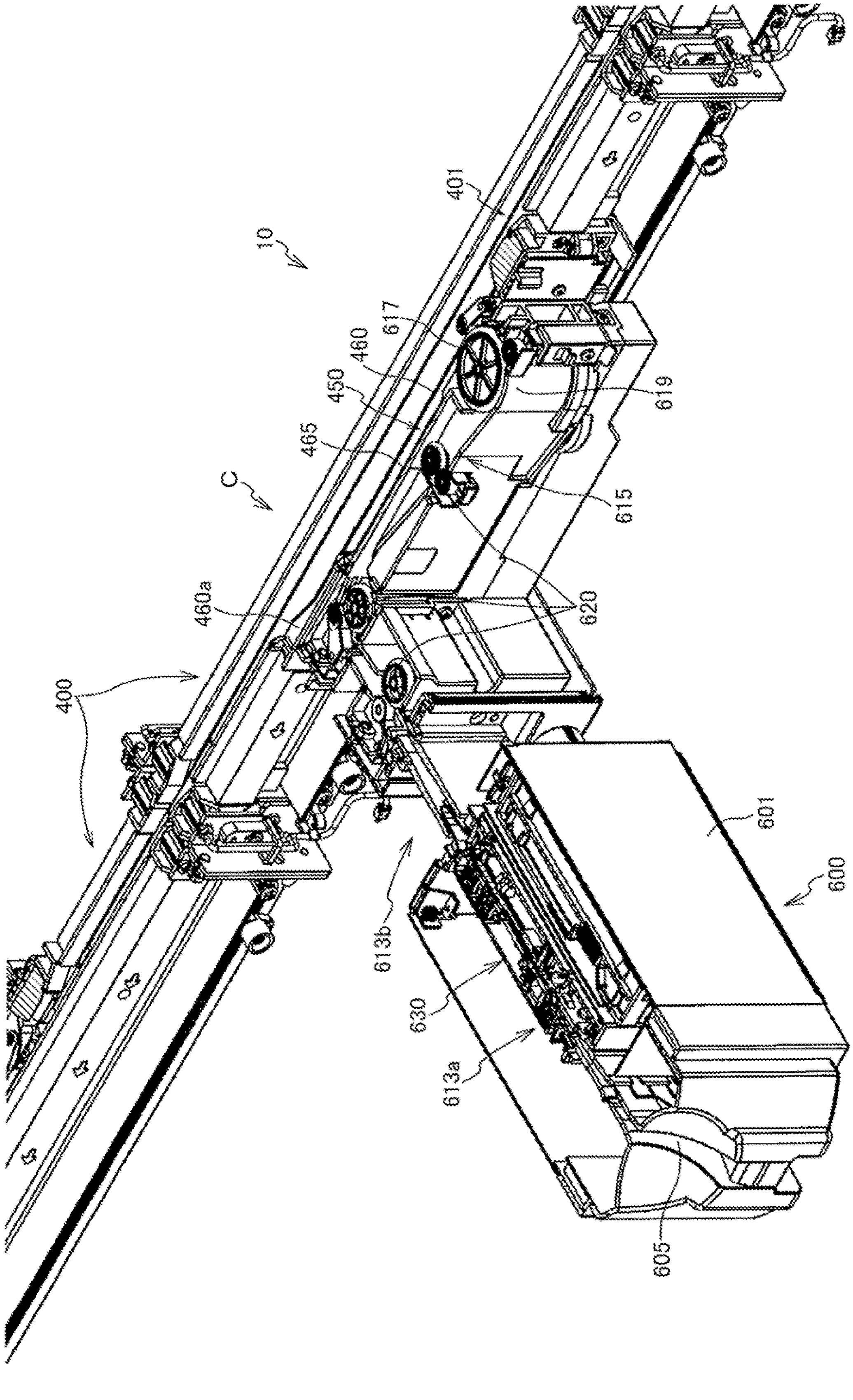
FIG. 17 is a horizontal sectional perspective view illustrating the configuration of the coupling portion between the receiving unit and the transport tube 400.
Figure 18:
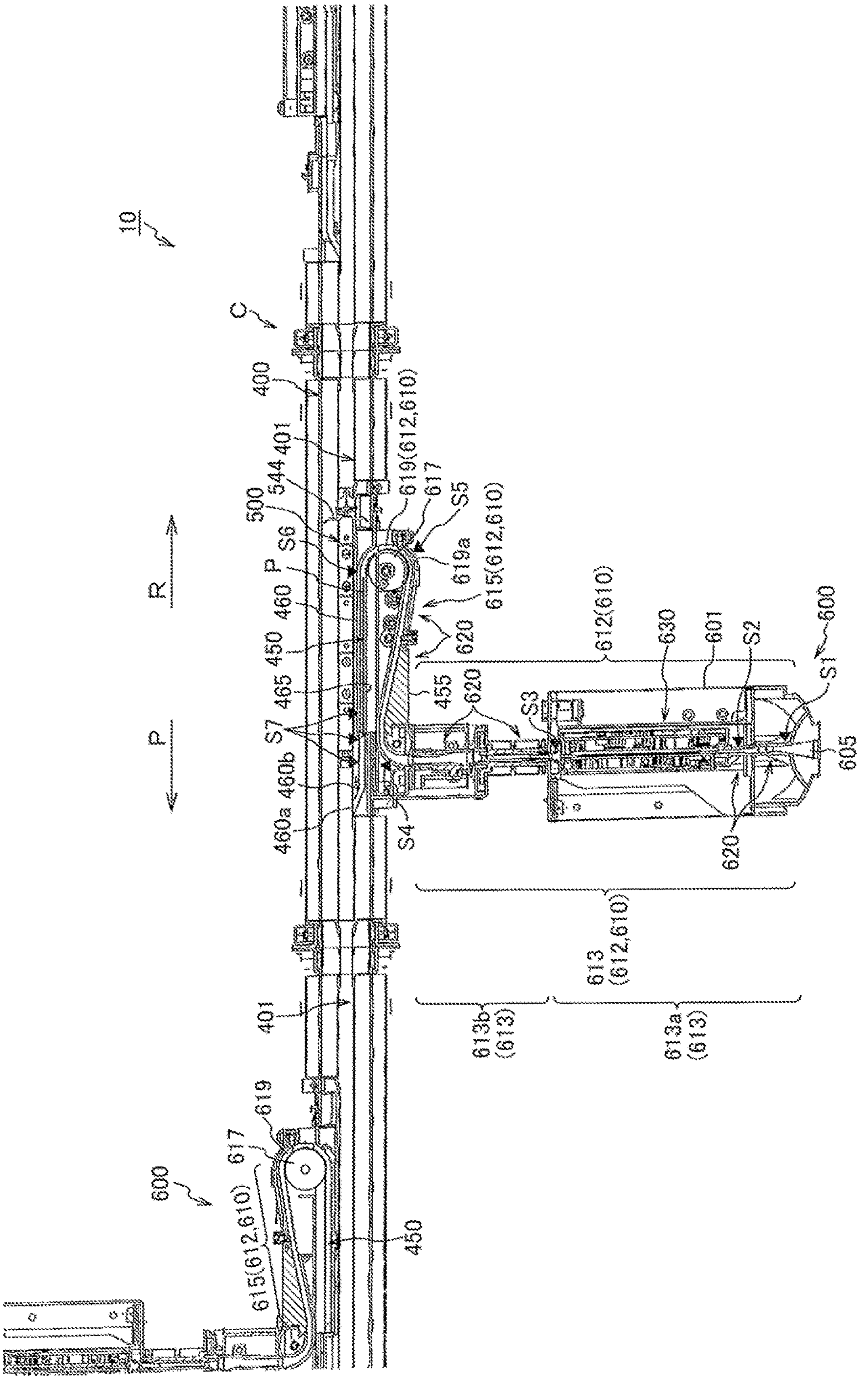
FIG. 18 is a horizontal sectional view of a part of a banknote transport device C.

FIG. 15 is a perspective view illustrating a configuration of a coupling portion between the receiving unit and the transport tube 400, FIG. 16 is a perspective view illustrating a part of the transport tube in FIG. 15 in a vertical section, FIG. 17 is a horizontal sectional perspective view illustrating the configuration of the coupling portion between the receiving unit and the transport tube 400, and FIG. 18 is a horizontal sectional view of a part of a banknote transport device C.

The banknote transport system 10 according to the second invention schematically includes the banknote transport device C including the transport tube 400 (the transport path 401) as a mainstream that has at least a portion arranged along the air blowing tube 100 to be adjacent to the air blowing tube 100, the transport body (a banknote transport shuttle) 500 for transporting banknotes that move inside the transport tube 400, and keeping parts 450 as tributaries that are provided at a plurality of places along the transport path 401 and that keep banknotes to be transferred onto the transport body 500, respectively, the receiving units 600 that are each arranged at each of the keeping parts to receive a banknote P input one by one from outside and to move the received banknote P to the associated keeping part 450, driving devices (such as a transport mechanism 620) that drive driving targets such as the banknote transport device C and the receiving units 600, the safe unit 700, and the control means (the management unit) 1000 that controls these components, in addition to the air blowing tube 100 that forms the flow path of a gas, the moving body 200, the air-blow control unit 300, the blower 310, and the like.

Furthermore, the moving body 200 includes the moving body magnetic material 213, and the transport body 500 includes the transport body magnetic material 523. At least one of the moving body magnetic material and the transport body magnetic material is a magnet, and the transport body is moved in conjunction with movement of the moving body receiving the air flow due to attraction and/or repulsion based on a magnetic force acting between the moving body magnetic material and the transport body magnetic material.

Although the transport path 401 being the transport body route extends as a linear route in the present embodiment, this is an example and the transport path 401 may be configured to form a loop including curved routes.

While each of the receiving units 600 is included in the associated sandwiched machine 2 illustrated in FIG. 1 and the game machine 1 is arranged at a location adjacent to each of the sandwiched machines 2 on the bank facilities L in an actual game hall, explanations of the game machines are omitted in the present embodiment.

Each of the receiving units 600 includes a banknote receiving part (paper sheet receiving part) 605 that receives an input banknote, an introducing part 610 that sequentially transfers (guides) the banknote input to the banknote receiving part 605 to the associated keeping part 450, the transport mechanism 620 (details are not illustrated) such as a roller, a belt, and a motor constituting the introducing part 610, and the like.

The transport body 500 moving on the transport path 401 includes the banknote collecting/retaining part (transfer means) 540 that sequentially collects a banknote stopped at each of the keeping parts 450 in the course of passing the keeping parts with which the receiving units 600 are respectively communicated, and transfers the banknote onto the transport body in an upright state to retain the banknotes in a stacked manner. The banknote collecting/retaining part has a configuration to retain banknotes with one face (a side surface) of a following banknote stacked on one face (a side surface) of precedent banknotes that have already been transferred thereon.

The transport path 401 extends between a right end portion (an initial position) in FIGS. 11 to 14 and a banknote discharge position inside the safe unit 700, and transport body sensors (photosensors, not illustrated) are arranged at places in the transport path 401, respectively, to check in real time the current position of the transport body 500 in the transport path, whether the transport body has passed the places, and the timing of the passage. For example, transport body detecting sensors are arranged at appropriate places including the initial position, each of the keeping parts 450, the safe unit 700, and other places, respectively. Also at places in the longitudinal direction of the air blowing tube 100, moving body sensors for detecting the position of the moving body 200, whether the moving body has passed the places, the timing of the passage are arranged, respectively.

When the sensor in the keeping part 450 of a certain receiving unit 600 detects that there is no banknote in the keeping part, the control means 1000 drives the transport mechanism 620 of the introducing part 610 to transfer the following banknote input to the banknote receiving part to the keeping part, and stops the transport mechanism at a time when movement of the banknote to the keeping part is detected and verified. When input of the following banknote to the banknote receiving part 605 is detected while a banknote kept in the keeping part 450 is detected, the control means 1000 drives the transport mechanism 620 of the introducing part 610 to receive the banknote and stops the banknote in the introducing part. Therefore, users of the game machine can uninterruptedly input two paper sheets such as banknotes and the waiting time can be shortened.

<<Receiving Unit 600>>

As illustrated in FIGS. 15 to 18, each of the receiving units (the banknote receiving devices) 600 includes the banknote receiving part (banknote receiving port) 605 that is provided at the front of a body 601 of the receiving unit and that receives a banknote input one by one, and the introducing part 610 that is arranged from the banknote receiving part 605 to the inside of the body 601 and that introduces the received banknote into the associated keeping part 450. The introducing part 610 schematically includes an introducing route 612 that is a space for sequentially transferring (guiding) a banknote input into the banknote receiving part 605 to the keeping part 450, and the transport mechanism 620 constituted of a roller, a belt, a pulley, a gear, a motor, and the like arranged along the introducing route.

The introducing part 610 is provided with a recognition unit 630 that recognizes and judges authenticity of an input banknote, denomination thereof, and the like, and the control means 1000 reverses the transport mechanism 620 to discharge the banknote from the banknote receiving part 605 when the banknote is judged not to be received. A banknote that is judged to be receivable by the recognition unit 630 is transported by the transport mechanism 620 inside the introducing part 610 to the associated keeping part 450.

The introducing route 612 includes a first introducing route part 613 that extends from the banknote receiving part 605 to the transport path 401 to be orthogonal thereto, a second introducing route part 615 that is communicatively connected to the first introducing route part 613 to extend in a retraction direction R that is a direction substantially parallel to the transport path 401 and away from the safe unit 700, and an inversion path (inversion part) 619 that is formed on an outer periphery side of an inversion roller 617 arranged at a termination portion of the second introducing route part 615 and that causes the second introducing route part 615 to be communicated with the keeping part 450 as illustrated in FIGS. 17 and 18. The inversion path 619 is directly communicated with the keeping part 450 and a banknote having passed through the inversion path enters the keeping part 450 and stops in the keeping part 450. The inversion path 619 is latched between the outer periphery of the inversion roller 617 and a transport guide plate 619*a* that is arranged to be opposed to the outer periphery with a predetermined transport space away therefrom.

The keeping part 450 is a space formed in a body 455 to transport and keep a banknote, and is formed of a guide plate 460 on the side of the transport path 401 and another guide plate 465 arranged with a predetermined transport space away from the guide plate 460. The keeping part 450 is designed to have a length and a shape that enable a longest banknote in the long edge direction to be kept therein while the extended attitude parallel to the transport path 401 is maintained in a state in which the rear end edge of the longest banknote has passed through the inversion path 619. A banknote kept in the keeping part needs to be positioned in such a manner that the banknote can be transferred from the keeping part onto the transport body (banknote carrier) 500 while the collecting pawls 544 press the rear end edge of the banknote in a forward direction P in contact therewith when the transport body passes the keeping part. The rear end of a banknote kept in the keeping part is configured to be sufficiently separated from inversion driving means such as the inversion roller 617, so that the banknote can be continuously kept without influences of the inversion roller or the like even when the inversion roller is driven.

As illustrated in FIG. 18, a tracking sensor S1 that detects enter of a banknote is installed in the banknote receiving part 605, and other tracking sensors S2 to S5 are provided at appropriate places on the downstream side, for example, the entrance and the exit of the recognition unit 630, the connection portion between the first introducing route part 613 and the second introducing route part 615, and the inversion path 619, respectively.

A sensor S6 that detects enter of a banknote from the inversion path 619 and sensors S7 that detect collection of a banknote from the keeping part 450 are arranged in the keeping part.

The first introducing route part 613 includes an entrance route part 613*a* including the recognition unit 630, and a keeping route part 613*b* for a following banknote on the downstream side. A banknote that is judged to be receivable on the basis of recognition information obtained when the banknote passes the recognition unit 630 moves to the keeping route part 613*b* and is transported into the keeping part 450 through the second introducing route part 615 and the inversion path 619 when the sensors S6, S7, and the like detect no precedent banknote kept in the keeping part 450. The range of the keeping position for a following banknote may reach the inversion path 619 beyond the keeping route part 613*b*.

At a time when the sensors S6, S7, and the like detect that the banknote front end or the banknote rear end has reached the adequate keeping position after passage of the banknote rear end through the inversion route 619 is detected, the transport is stopped and the banknote shifts to a standby state. The location of the banknote rear end at the time when the banknote has shifted to the standby state is set to a location where the rear end is not in contact with transport means on the side of the introducing part 610, such as the inversion roller 617 constituting the inversion path, so that the banknote can maintain the stopped state without interference even when the transport mechanism on the upstream side, including the inversion roller, is driven to transport the following banknote. For example, even when the following banknote is judged not to be received by the recognition unit 630 and the transport mechanisms of the first introducing route part 613 and the second introducing route part 615 are accordingly reversely driven, the location of the banknote stopped in the keeping part, and the operation thereof are not affected.

When it is detected that a banknote P1 in the keeping part is collected by the transport body 500 and is not in the keeping part, a following banknote P2 having been kept in the route part 613*b* or 615 on the upstream side of the inversion path 619 is sent into the keeping part 450 through the inversion path by redriving of the transport mechanism including the inversion roller 617.

<<Transport Body (Banknote Collecting Shuttle>>

Figures 19A, 19B, 19C, 19D:
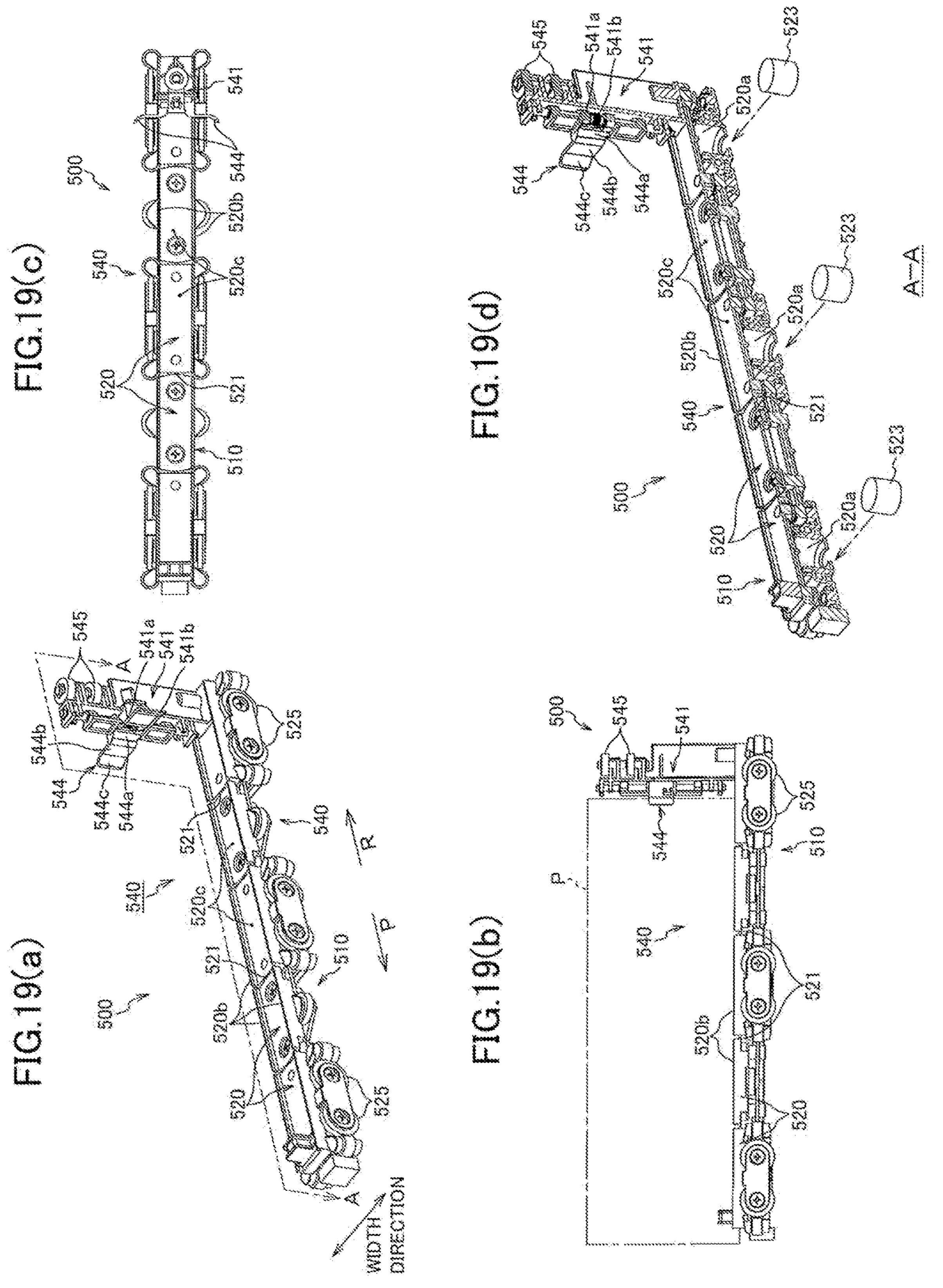
FIGS. 19(*a*), 19(*b*), 19(*c*), and 19(*d*) are an exterior perspective view, a front view, a plan view, and a sectional view along A-A in FIG. 19(*a*) of a transport body 500 in a state in which collecting members (collecting pawls) are opened.
Figure 20A:
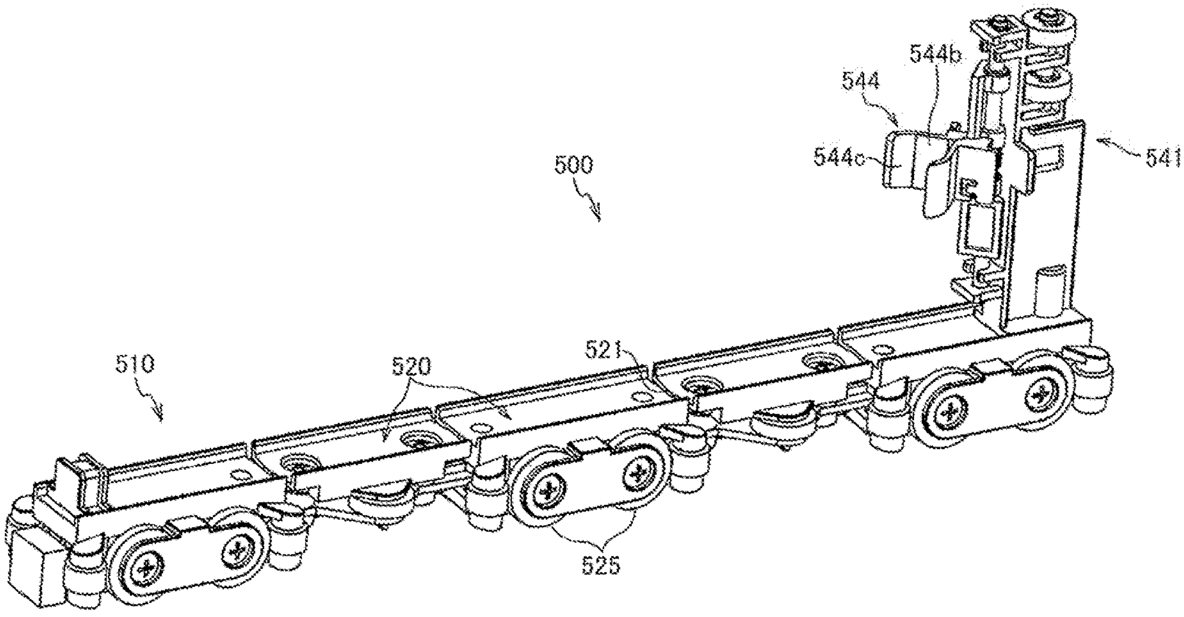
FIGS. 20(*a*) and 20(*b*) are an exterior perspective view and a plan view of the transport body 500 in a state in which the collecting members (the collecting pawls) are closed.
Figure 20B:
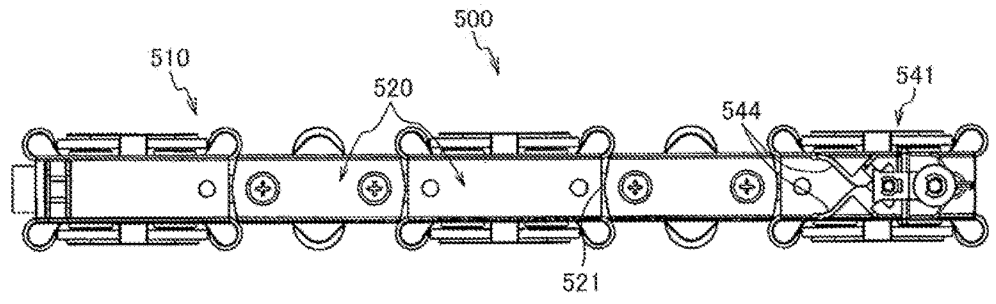
Figure 21:
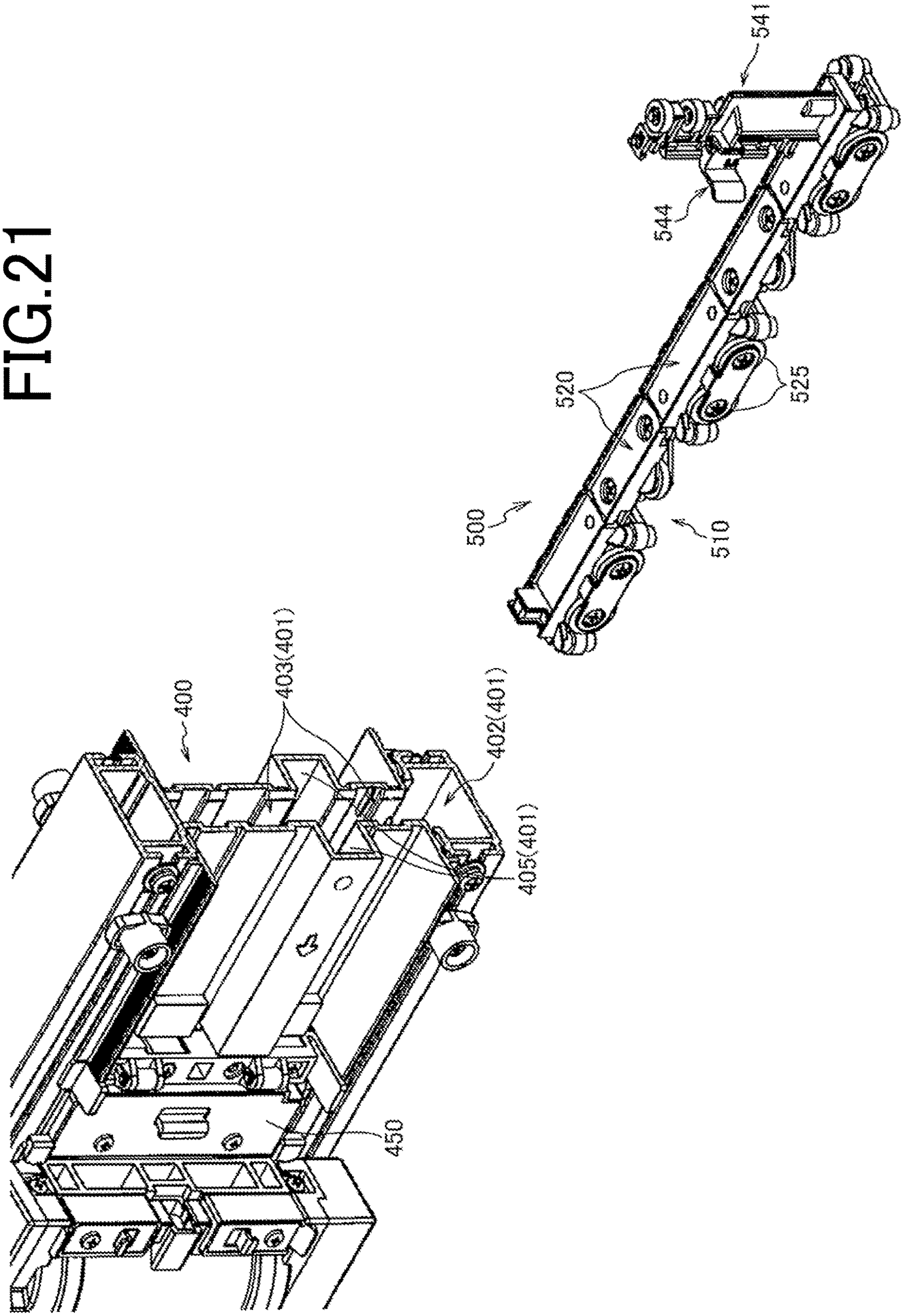
FIG. 21 is a partial sectional view illustrating a location relation between the transport tube 400 and the transport body 500.
Figure 22A:
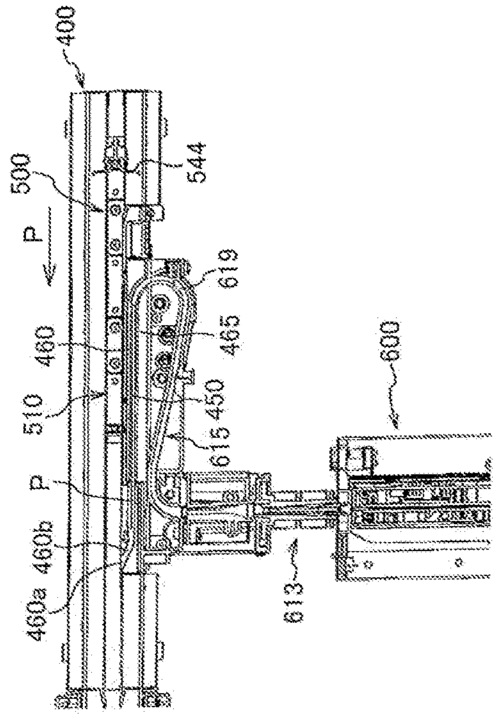
FIGS. 22(*a*), 22(*b*), 22(*c*), and 22(*d*) are plan horizontal sectional views illustrating a procedure in which the collecting members enter a keeping part to collect a kept banknote in the process of the transport body 500 moving forward.
Figure 22B:
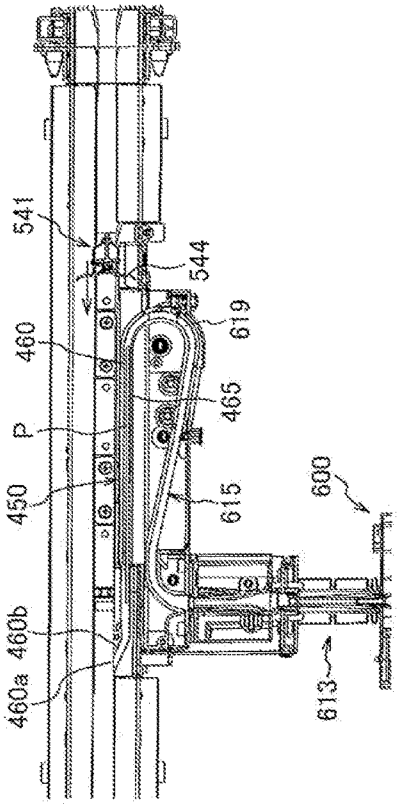
Figure 22C:
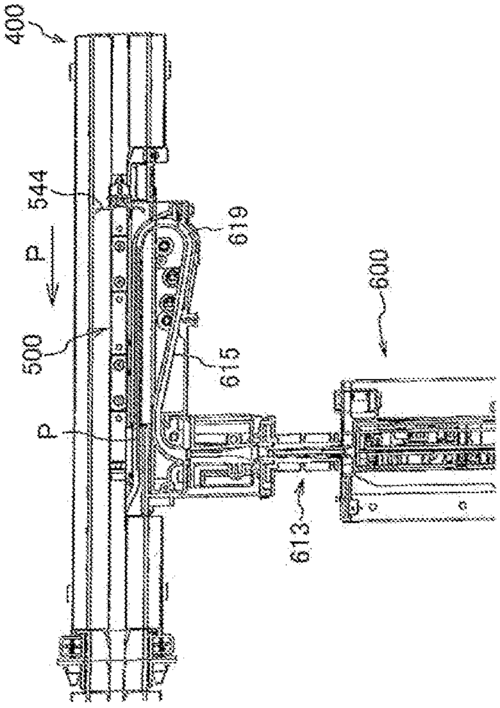
Figure 22D:
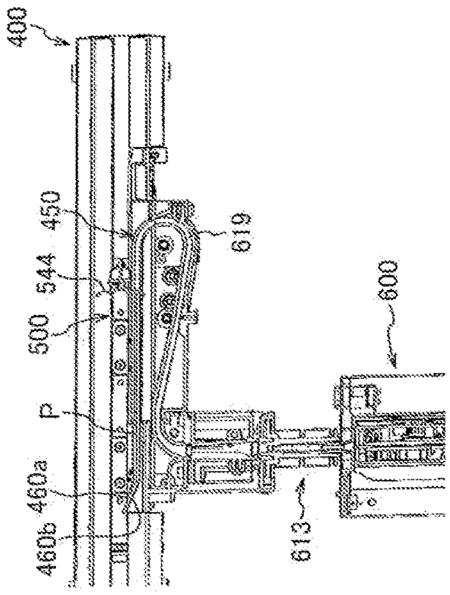
Figure 23:
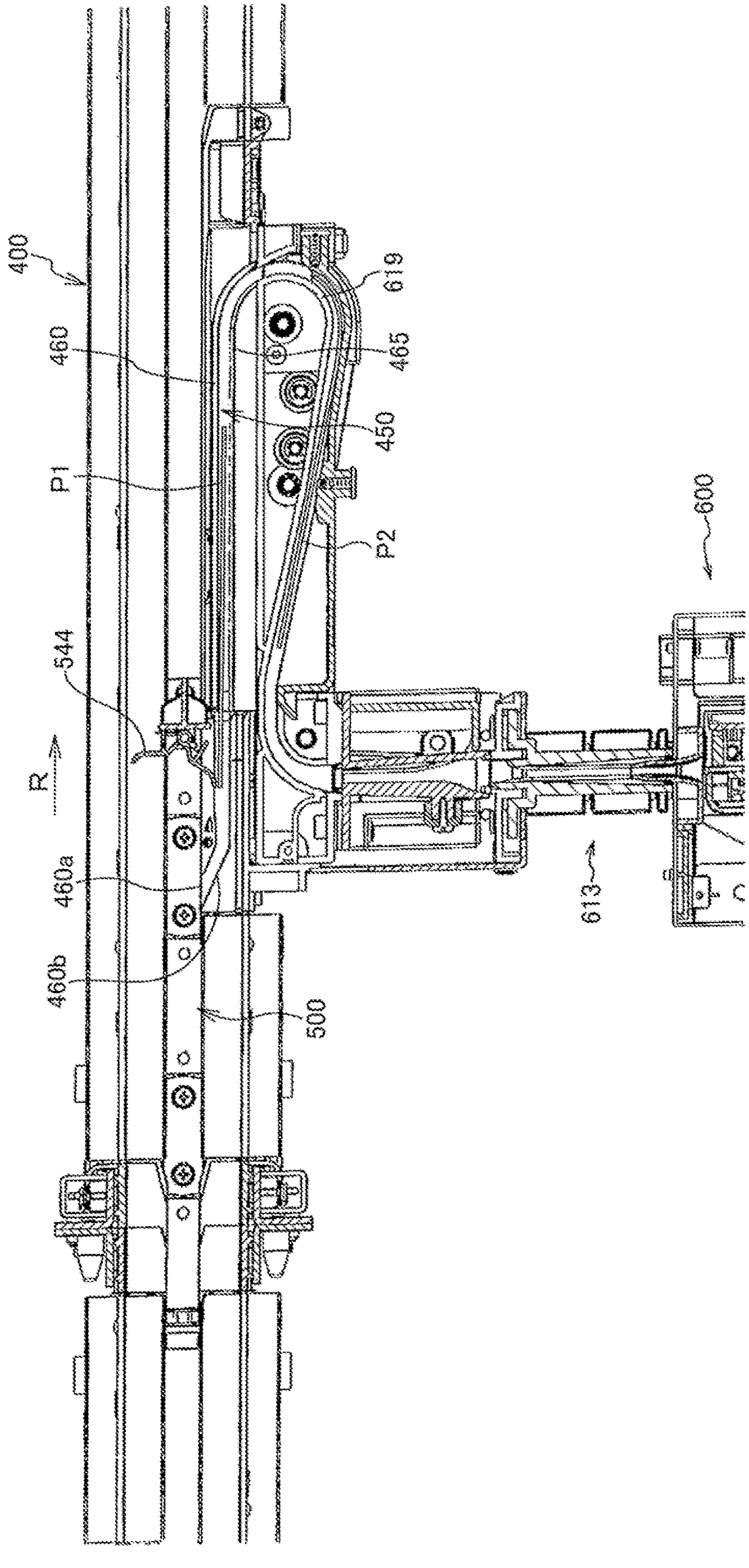
FIG. 23 is a plan horizontal sectional view illustrating a state in which one of the collecting pawls deforms in the process of the transport body moving backward.

FIGS. 19(*a*), 19(*b*), 19(*c*), and 19(*d*) are an exterior perspective view, a front view, a plan view, and a sectional view along A-A in FIG. 19(*a*) of the transport body 500 in a state in which the collecting members (the collecting pawls) are opened. FIGS. 20(*a*) and 20(*b*) are an exterior perspective view and a plan view of the transport body 500 in a state in which the collecting members (the collecting pawls) are closed. FIG. 21 is a partial sectional view illustrating the location relation between the transport tube 400 and the transport body 500. FIGS. 22(*a*), 22(*b*), 22(*c*), and 22(*d*) are plan horizontal sectional views illustrating a procedure in which the collecting members enter the keeping part to collect a kept banknote in the process of the transport body 500 moving forward. FIG. 23 is a plan horizontal sectional view illustrating a state in which one of the collecting pawls deforms in the process of the transport body moving backward.

The transport body 500 illustrated in FIGS. 19 to 21 are slightly different from the transport body illustrated in FIG. 6 in the configurations of the transport base 510 and the collecting members 544.

That is, the transport base 510 has a configuration in which the divided pieces 520 are coupled to each other with the hinges 521 to be displaceable in the upper-lower or right-left direction (or also in oblique directions) and the transport body magnet (transport body magnetic material) 523 is arranged in an internal space 520*a* of each of the divided pieces illustrated in FIG. 19(*d*). A rotatable roller 525 is also arranged on both side surfaces of each of the divided pieces 520 to enable smooth movement inside the transport tube 400. Rollers 545 are rotatably arranged on an upper portion of the support member 541 to reduce resistance with the inner wall of the transport tube.

The banknote collecting/retaining part (transfer means) 540 retains banknotes P to cause the long edge direction of the banknotes P to be in parallel to the longitudinal direction of the transport tube 400 and in an upright attitude. A long side on the lower side of the banknote P horizontally long and in the upright attitude is supported by the upper surface (the flat surface) of the transport base 510 (the divided pieces 520). The rear end edge (one of short sides) of the banknote is supported by the support member 541 and the collecting members 544.

While projections 520*b* preventing dropping of banknotes are provided on each of the divided pieces 520 on both end edges in the width direction, respectively, a region 520*c* on the inner side of the projections 520*b* is a flat surface and can stably support the long side on the lower side of the banknote. Since the regions 520*c* on the inner sides of the divided pieces 520 are communicated with each other in the longitudinal direction, the banknote can be loaded across the inner regions 520*c* of plural divided pieces.

The banknote collecting/retaining part 540 erected on the transport base 510 includes, at an end portion on the bank end side in the longitudinal direction of the transport tube 400 (on the distal end side with respect to the safe unit 700), the support member 541 that is upright in a direction away from the air blowing tube 100, and the collecting members 544 including the two collecting pawls 544 that are protruded (spread) in the width direction from the support member 541 in a wing-like manner (at an acute angle or an obtuse angle) in plan view and that are pivotally supported by a pivotally support part 541*a* on the side of the support member 541 to be openable/closable in the horizontal direction. Since the illustrated pivotally support part 541*a* is in parallel to the support member 541, that is, in a vertical attitude, the collecting pawls 544 rotating on the pivotally support part open and close in the horizontal direction. The rotation direction of the collecting pawls may be other directions.

Unlike the configuration example of FIG. 6 in which upper and lower two pairs of the collecting members are arranged, a pair of the collecting members 544 is arranged at a predetermined height location of the support member 541. The two collecting pawls 544 constituting the collecting members 544 are at the maximum open angle in the spread state illustrated in FIG. 19 and cannot rotate any more in the opening direction while they can rotate in the closing direction from the spread state. FIG. 20 illustrate a state (closed state) in which the two collecting pawls 544 are at the minimum open angle. Each of the collecting pawls 544 is always elastically biased in the opening direction by a spring (elastic member) 541*b* provided on the pivotally support part 541*a*. When the transport body 500 moves on the transport path 401 in the forward direction P toward the safe unit 700, each of the collecting pawls 544 maintains the spread state due to the spring 541*b* and the collecting pawls can therefore catch the rear end edge of a banknote stopping in the upright state in each of the keeping parts 450 to transfer the banknote onto the transfer base 510 while moving the banknote in the forward direction P in the keeping part. Concave portions 405 (FIGS. 16 and 21) serving as collecting pawl passages are formed at places that are both inner walls of the transport tube 400 and that are passed by the collecting pawls to enable the collecting pawls 544 to maintain the spread position in the process of the transport base 510 moving in the transport path 401 in the forward direction P toward the safe unit 700, respectively. The concave portions 405 in each of the keeping parts 450 are laid out to enable each of the collecting pawls to be brought into contact with the rear end edge of a banknote in the keeping part. It is preferable that the collecting pawls 544 be configured to independently perform the opening/closing operation. In such a case, each of the collecting pawls may be constituted to be individually rotated by one coil spring (or torsion spring), or the spring 541*b* may be provided for each of the collecting pawls.

Each of the collecting pawls 544 in the spread state illustrated in FIG. 19 includes a base end piece 544*a* on the inner side, which is pivotally supported by the pivotally support part 541*a* to be able to rotate, an intermediate piece 544*b* extending outward in the width direction of the transport body from the base end piece 544*a*, and an end portion piece 544*c* bent or curved to be protruded in a diagonally forward direction from the intermediate piece 544*b*. When the collecting pawl 544 passes through in a keeping part 450, the intermediate piece 544b and the end portion piece 544c mainly enter the keeping part 450 and push the whole banknote in the forward direction while being in contact with the rear end edge of the kept banknote. If the banknote rear end edge being in contact with the intermediate piece 544b is about to be deviated outward in the width direction along the face of the intermediate piece, the end portion piece 544c can reliably block the deviation because the end portion piece 544c is protruded obliquely from an end portion of the intermediate piece 544b. After the kept banknote is transferred onto the transport base 510, the end portion piece 544c prevents the loaded banknotes from being deviated in the width direction or dropping.

With the configuration of the intermediate piece 544b having an attitude parallel to the width direction of the transport path 401 or oblique to the forward direction P in the spread state of the collecting pawls 544 as illustrated in FIGS. 19, the intermediate piece can reliably catch and press the banknote rear end edge in the forward direction when brought into contact with the read end edge in each of the keeping parts.

As described above, the collecting members 544 include a pair of collecting pawls pivotally supported by the support member to be openable/closable in a substantially horizontal direction, and each of the collecting pawls opens and closes between the spread position protruded outward in the width direction and the retracted position retracted inward in the width direction and is biased toward the spread position by the elastic member.

Since each of the collecting pawls 544 has the configuration described above, merely linearly moving the transport body at the time of collecting banknotes in the keeping parts that are alternately positioned at different locations in the longitudinal direction across the transport path 401 enables the banknotes to be reliably collected by the associated collecting pawl and to be accumulated in a central portion of the transport body in the width direction.

When the transport body 500 moves in the retraction direction R in the transport path, the collecting pawls interfere with banknotes in the keeping parts. However, the collecting pawls change the position in the closing direction against the biasing of the elastic member in the process of continuing to move in contact with the banknotes. Accordingly, the transport body 500 can smoothly continue to move in the returning direction without providing impact such as damages on the kept banknotes.

Since the method of sequentially loading a collected following banknote with one face of the following banknote stacked on one face (one side surface) of already loaded banknotes in a state in which the banknotes are already loaded on the transport base 510 in the upright state is adopted, the front end edge of the following banknote does not hit the rear end edge of the already loaded banknotes to become unloadable.

As illustrated in FIGS. 18, 22, 23, and the like, the guide plate 460 is provided between each of the keeping parts 450 and the transport path 401 as a partition that separates these parts from each other, and an opening part 460a for extracting a banknote to the transport path 401 is provided at an end portion of the guide plate 460 in the forward direction. A slit (not illustrated) through which the associated collecting pawl 544 can pass is formed on the guide plate 460 in parallel to the banknote transport direction, thereby preventing the guide plate 460 from blocking the collecting pawl during passage in the keeping part. A slit (not illustrated) through which the associated collecting pawl 544 can pass is also formed on the other guide plate 465 in parallel to the banknote transport direction, thereby preventing the guide plate 465 from blocking the collecting pawl during passage in the keeping part.

In the process of a banknote in the keeping part being pushed at the rear end edge by the collecting pawl to move in the forward direction P, the front end of the banknote protrudes from the opening part 460a toward the transport path 401 and leaves the keeping part. An inclined surface 460b that guides the banknote toward the transport path at that time to enable the banknote front end edge to be reliably guided to the side of the transport path is provided on the opening part (FIGS. 19, 22, and 23).

As described above, in the process of a banknote in each of the keeping parts 450 being pushed by the associated collecting pawl to move inside the keeping part toward the transport path 401, the movement is always from the front end portion of the banknote along the longitudinal direction. That is, due to the guide plate 460, the banknote kept in each of the keeping parts cannot move in a direction orthogonal to (approaching) the transport path 401 and moves from the opening part 460a onto the transport body while moving in the forward direction P along the longitudinal direction of the keeping part. Furthermore, banknotes already loaded on the transport body and banknotes kept in the keeping parts are previously set in the location relation to be at the same height location and in the same attitude with the guide plate 460 interposed therebetween, and are arranged to reliably enable the respective locations in the banknote thickness direction (the width direction of the transport path) to be different from each other (to prevent the banknotes from interfering with each other). Accordingly, when transfer of a banknote pushed out from the opening part 460a onto the transport body is completed, the banknote is smoothly loaded on one side surface of the already loaded banknotes to be stacked thereon. Therefore, failure in the loading such as displacement, or dropping due to hit of the end edges of the banknotes never occurs.

As described above, the banknotes kept in the keeping parts and the banknotes loaded on the transport body are in the location relation not interfering with each other, and only the collecting pawls 544 on the transport body are in the location relation that can interfere with the kept banknotes. Therefore, when the collecting pawls enter the space of each of the keeping parts, the collecting pawls can catch the banknote rear end in the keeping part, push the banknote in the forward direction from the kept location to cause the front end edge of the banknote to be protruded from the opening part 460a, and finally transfer the whole banknote onto the transfer body.

The collecting pawls 544 are configured to be able to individually rotate (retract) in the closing direction against the spring 541b when the collecting pawls 544 are brought into contact with an obstacle (banknotes in the keeping parts 450) in the process of the transport base 510 moving inside the transport path 401 in the retraction direction R away from the safe unit 700, and to return to the original spread position after passing the obstacle. Accordingly, even when one of the collecting pawls 544 is brought into contact with a banknote P1 in one keeping part 450 located on the passage route in the process of the transport base 510 moving in the retraction direction R, this collecting pawl passes the banknote while retracting in the closing direction during movement in contact with the banknote. Therefore, the transport base 510 can smoothly move (see FIG. 23).

As illustrated in FIG. 16, the concave portions 405 are formed on two opposing inner walls of the transport path 401, respectively, to enable the two collecting pawls 544 to smoothly pass through. The concave portions 405 are convex portions when seen from outside. While the concave portions 405 are formed on almost the entire length of the transport path 401 (almost the whole of the moving route of the transport body 500), the concave portions 405 are not provided at places where the receiving units 600 are arranged, that is, in the range interfering with the keeping parts 450. That is, convex wall portions of the transport path constituting the concave portions 405 are removed in each of the exterior bodies 455 (FIGS. 16 and 18) including the associated keeping part 450 therein. A banknote in the kept state is arranged in the space inside the exterior body 455 forming each of the keeping parts 450. Therefore, if the convex wall portion constituting each of the concave portions 405 extends to the inside of each of the keeping parts, the wall portion interferes with the space for keeping a banknote. In the exterior body 455 of the keeping part, slits for avoiding the collecting pawls are formed on the guide plates 460 and 465 forming the keeping part, respectively. Accordingly, the collecting pawls entering the exterior body can be brought into contact with the kept banknote to transport the banknote.

A procedure in which the transport body (the banknote collecting/retaining part 540) collects banknotes stopping in the keeping parts 450 in the process of moving on the transport path 401 in the forward direction P toward the safe unit is explained next with reference to FIG. 22.

In a state illustrated in FIG. 22(*a*), while a portion of about two-thirds of the transport body 500 from the head of the transport base 510 reaches a location overlapping with the keeping part 450, the support member 541 is located behind the keeping part and accordingly the collecting pawls 544 are also behind the keeping part. In FIGS. 22(*b*) and 22(*c*), the support member 541 approaches more to the keeping part 450 than that in FIG. 22(*a*) while the collecting pawls 544 are still outside the keeping part. Subsequently, in FIG. 22(*d*), the support member 541 enters the keeping part and, when there is a banknote in the keeping part, the collecting pawl 544 on the side of the keeping part is in contact with the rear end edge of the banknote and moves the banknote in the width direction of the transport path 401 while pushing the banknote in the forward direction P. Therefore, the banknote P is transferred (collected) onto the transport base 510 while keeping the upright attitude. When there are banknotes already transferred onto the transport base, the banknote P is loaded to be stacked on the lateral side of the already loaded banknotes.

When the transport body 500 passes this keeping part 450 to collect a banknote in the next keeping part located downstream in the moving direction, the collecting pawl 544 located on the side of the next keeping part collects the banknote.

FIG. 23 illustrates a state in which one of the collecting pawls 544 rotates in the closing direction to avoid a banknote P stopping in the keeping part 450 in the process of the transport body 500 moving on the transport path 401 in the retraction direction R away from the safe.

With the banknote transport system according to the present invention, even when the transport body is moved at a high speed, a banknote retained by each of the game media dispensing devices (the receiving units) can be reliably and promptly collected and transferred onto the transport body and a plurality of banknotes can be stably transported without paper jam while retained in an aligned manner.

<<Banknote Collecting Procedure by Transport Body>>

In the banknote transport system 10 having the configuration described above, various types of processing described below can be performed depending on whether there is a banknote in the keeping parts 450 and the introducing parts 610.

Figure 24:
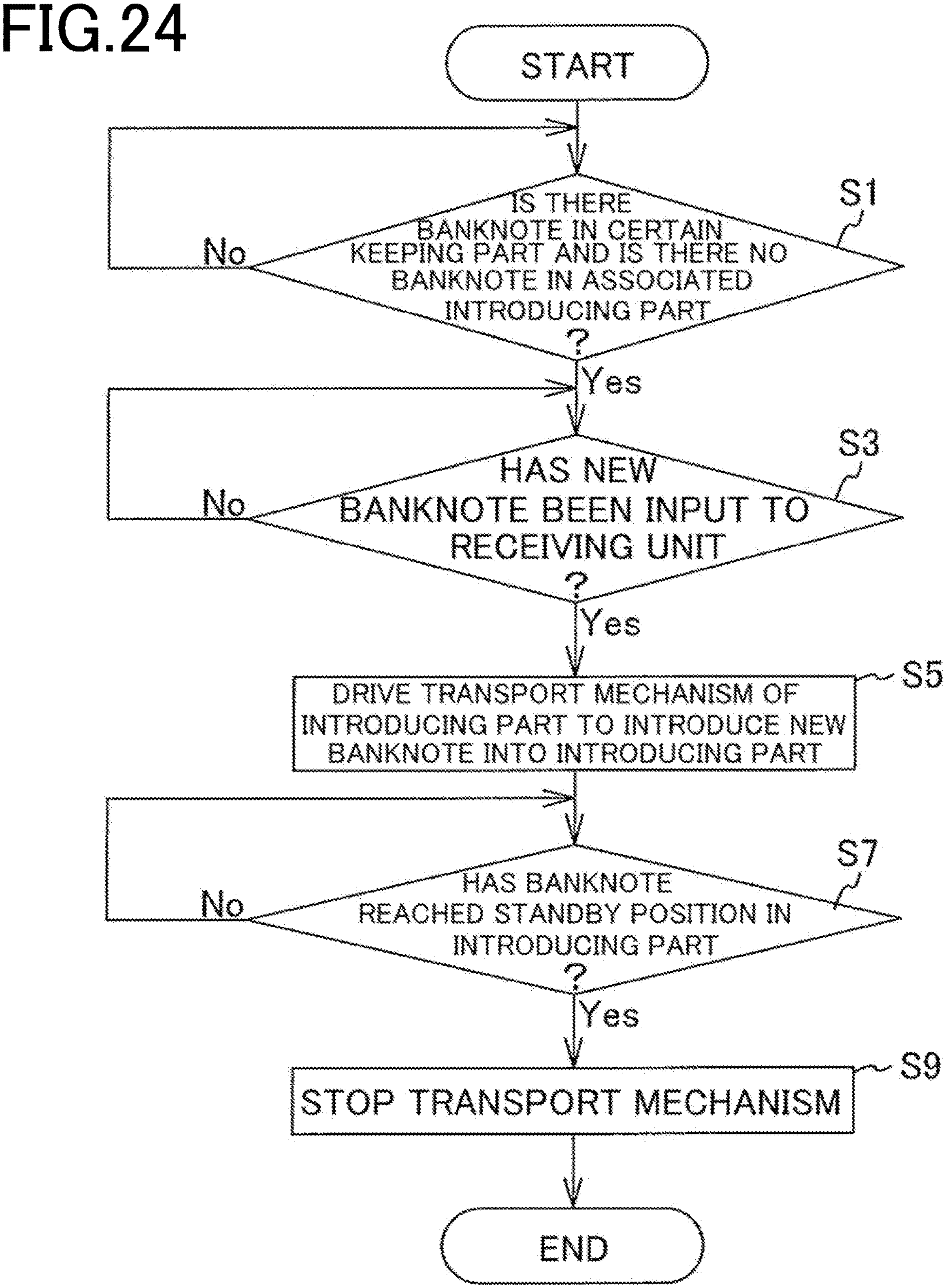
FIG. 24 is a flowchart illustrating an example of a collecting procedure and an introducing procedure for banknotes by the transport body.

FIG. 24 is a flowchart illustrating an example of a collecting procedure and an introducing procedure for banknotes by the transport body.

When it is detected that a banknote is stopped in a certain keeping part 450 and that there is no banknote in the associated introducing part 610 (YES at Step S1), and when it is detected that a following banknote has been newly input to the receiving unit (the banknote receiving device) 600 corresponding to the keeping part (YES at Step S3), the control means 1000 controls relevant components to receive the following banknote in the introducing part 610 and stop (keep) the banknote in the introducing part (Steps S5, S7, and S9).

This enables any place in the introducing part 610 on the upstream side of the keeping part 450 to be used as a keeping part for the following banknote, and the second banknote can be therefore input in a state in which no banknote is in the keeping part.

Figure 25:
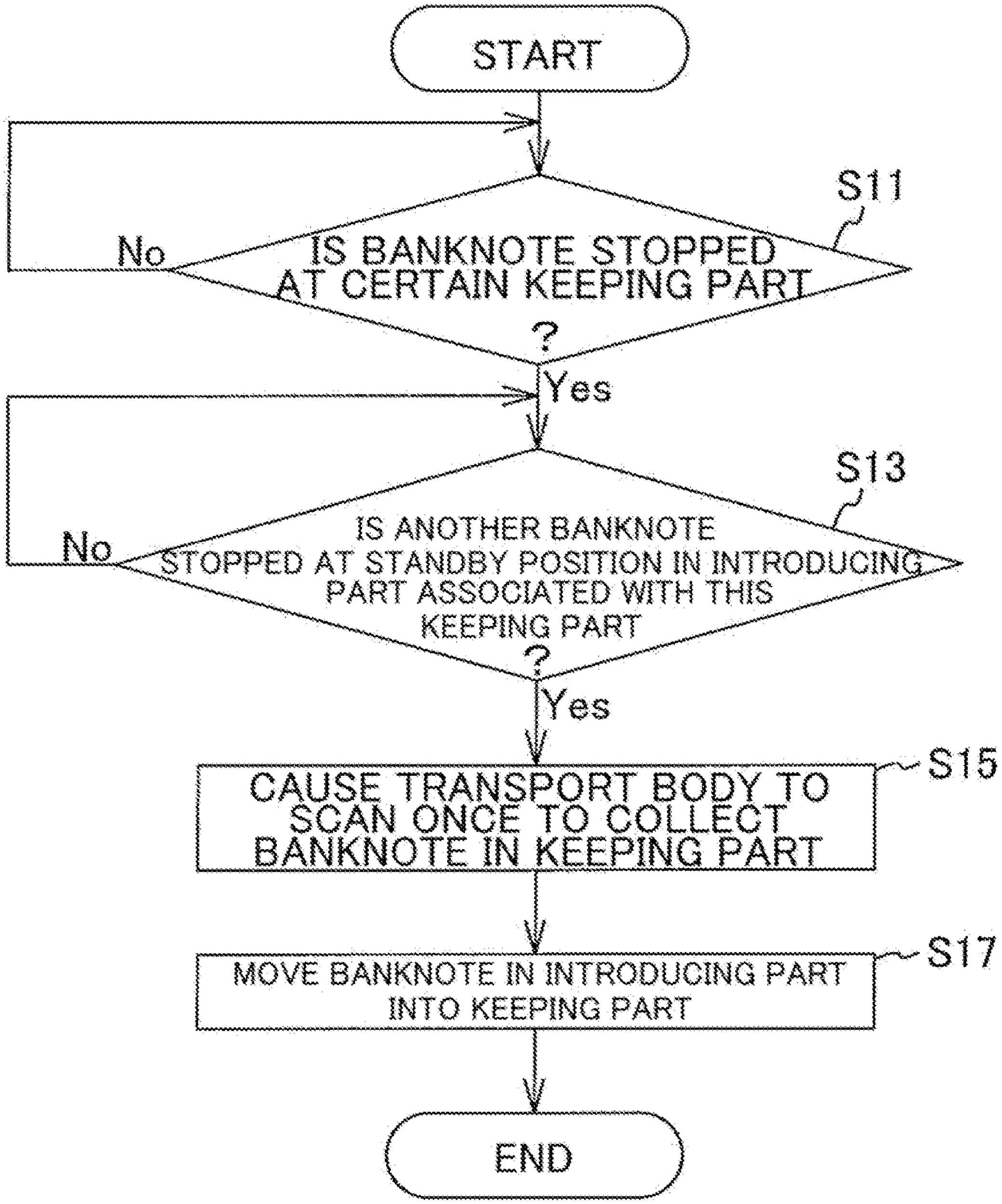
FIG. 25 is a flowchart illustrating another example of the collecting procedure and the introducing procedure for paper sheets by the transport body.

FIG. 25 is a flowchart illustrating another example of the collecting procedure and the introducing procedure for banknotes by the transport body.

When it is detected that different banknotes are simultaneously in a standby state in any one of the keeping parts 450 and in the introducing part 610 on the upstream side of this keeping part, respectively (YES at Steps S11 and S13), the control means 1000 controls relevant components to enable the banknote in the keeping part 450 to be collected by causing the transport body 500 to scan once from the initial position to the location of the safe unit 700 using the moving body 200 (Step S15) and to enable the banknote in the introducing part 610 to move into the keeping part 450 (Step S17).

When banknotes are in a state kept in the keeping part 450 and the introducing part 610, respectively, the third banknote cannot be input. However, the control described above enables the introducing part 610 to be emptied and the third banknote to be input therein.

Figure 26:
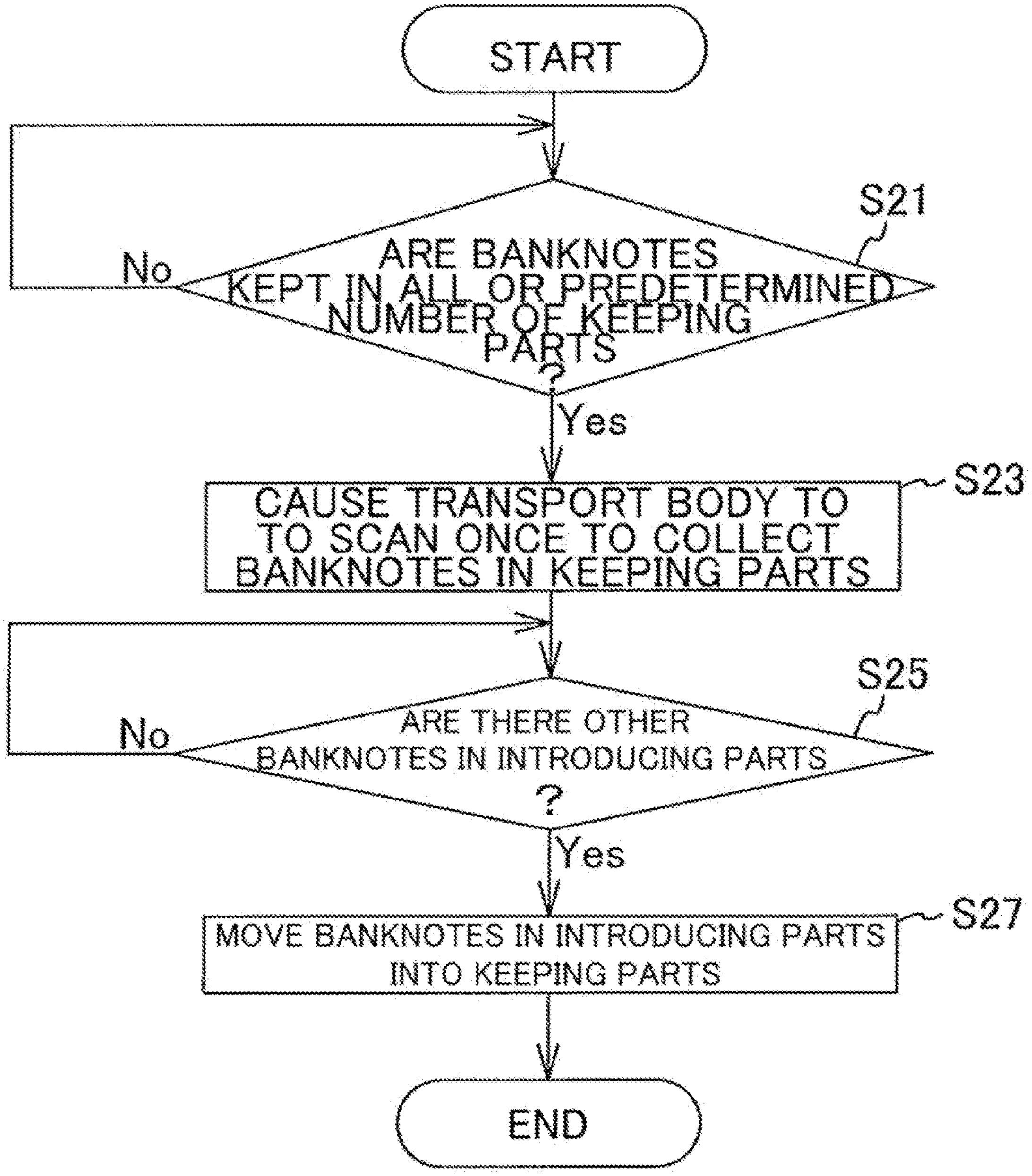
FIG. 26 is a flowchart illustrating another example of the collecting procedure and the introducing procedure for paper sheets by the transport body.

FIG. 26 is a flowchart illustrating another example of the collecting procedure and the introducing procedure for banknotes by the transport body.

When it is detected that banknotes are in a standby state in all the keeping parts 450 or when it is detected that banknotes are kept in a predetermined number or more (for example, ten or more) keeping parts, respectively (YES at Step S21), the control means 1000 causes the transport body 500 to scan once from the initial position to a location near the safe unit 700 using the moving body 200 (Step S23). Accordingly, the control means 1000 controls relevant components to collect the banknotes in the keeping parts 450 and, when there are banknotes in the introducing parts 610, move these banknotes into the associated keeping parts, respectively (Steps S25 and S27).

This can reduce the waiting time in which banknotes cannot be input, and can increase the convenience of users.

C. Banknote Transport System According to Third Invention

<<Basic Structure of Banknote Transport System>>

A banknote transport system according to a third invention is explained next.

FIGS. 27 to 34 are diagrams for explaining an embodiment of the third invention. In the present embodiment, with connection of the two endless pipes via the switching unit 320, the air flow in the air blowing tube 100 can be adjusted by changing the position (the rotation angle) of the switching valve 325 while an air flow in a certain direction is generated by the single blower 310 as illustrated in FIGS. 5(*a*) to 5(*c*).

Specifically, no air flow is generated in the air blowing tube 100 at the position of the switching valve 325 illustrated in FIG. 5(*a*). An air flow in a direction (hereinafter, "positive direction") from the bank end (the distal end with respect to the safe unit 700) to the safe unit 700 is generated at the position of the switching valve 325 illustrated in FIG. 5(*b*). An air flow in a direction (hereinafter, "opposite direction") from the safe unit 700 to the bank end side is generated at the position of the switching valve 325 illustrated in FIG. 5(*c*). In the following descriptions, the position of the switching valve 325 where no air flow is generated in the air blowing tube 100 is referred to also as "neutral position" for sake of explanations. The position of the switching valve 325 where the air flow in the positive direction is generated in the air blowing tube 100 is referred to also as "positive direction position" and the position of the switching valve 325 where the air flow in the opposite direction is generated in the air blowing tube 100 is referred to also as "opposite direction position".

In the embodiment described above, the moving body 200 staying on the bank end side can be moved to the safe unit 700 by changing the switching valve 325 to the positive direction position, similarly to other embodiments. The transport body 500 moves with the movement of the moving body 200 and banknotes in the keeping parts 450 are collected by the transport body 500. In the following descriptions, an operation of the moving body 200 on the bank end side to move to the safe unit 700 is referred to also as "collecting operation" for sake of explanations.

In the present embodiment, the collecting operation is performed at various moments. For example, the collecting operation is performed at a moment when a predetermined time has passed from insertion of a banknote into the receiving units 600. The collecting operation is also performed at a moment when the second banknote is inserted into one receiving unit 600 and a moment when the total number of banknotes inserted into the receiving units 600 reaches a predetermined number. In the configuration described above, the number of banknotes transported (retained) by the transport body 500 can differ according to the collecting operation.

In a configuration in which banknotes are transported by a transport device with an air flow generated by an air blowing device, there are circumstances where various failures are likely to occur if banknotes are not transported at an appropriate speed. For example, when the speed of banknotes is too low (the force is weak), an inconvenience that the banknotes stop in the middle of the transport route is likely to occur. When the speed of banknotes is too high, an inconvenience that the banknotes are damaged is likely to occur. In view of these circumstances, a configuration (a measuring unit 101*x* and an adjusting unit 103*x*) to suppress these failures is adopted in the present embodiment.

Figure 27:
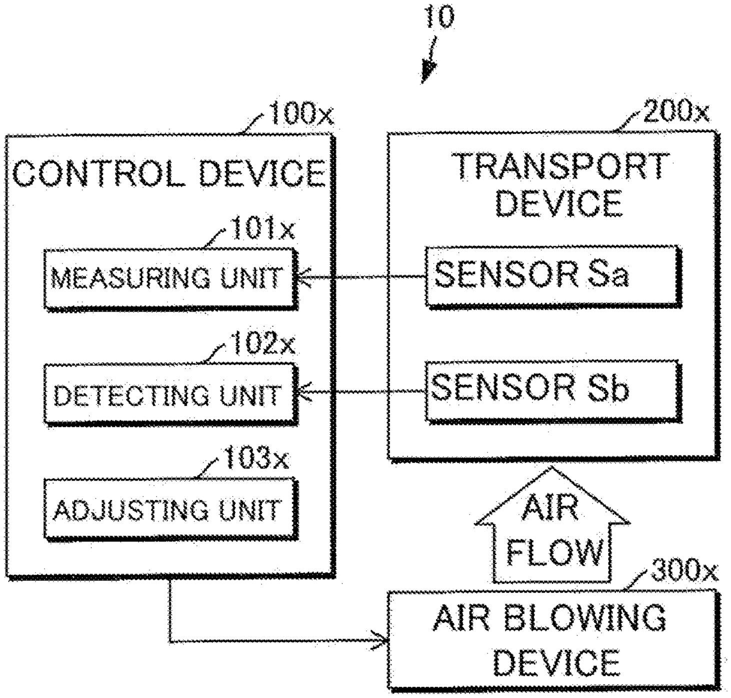
FIG. 27 is a functional block diagram of the banknote transport system.

FIG. 27 is a functional block diagram of the banknote transport system 10 according to the present embodiment. The banknote transport system 10 is configured to include a control device 100*x*, a transport device 200*x*, and an air blowing device 300*x*. The air blowing device 300*x* is a device that generates an air flow and, for example, the air-blow control unit 300 (including the switching valve 325) described above can be adopted as the air blowing device 300*x*. The transport device 200*x* is a device that transports paper sheets with the air flow generated by the air blowing device 300*x* and, for example, a combination of the air blowing tube 100, the moving body 200, the transport body 500, and the like described above can be adopted as the transport device 200*x*.

The control device 100*x* is realized, for example, by a CPU of the management unit 1000 described above executing a program. The control device 100*x* is configured to include the measuring unit 101*x*, a detecting unit 102*x*, and the adjusting unit 103*x*. The measuring unit 101*x* measures the speed of banknotes (paper sheets) in the transport device 200*x*. Specifically, the transport device 200*x* according to the present embodiment is provided with sensors Sa.

Each of the sensors Sa is in an ON-state in a period in which banknotes move at a specific location (a detection position P described later) on the transport route of the transport device 200*x* (see FIG. 29(*b*)). The measuring unit 101*x* measures (estimates) the speed of banknotes from the length of time when the sensor Sa is in an ON-state (see FIGS. 29(*a*) and 29(*b*)).

The detecting unit 102*x* detects arrival of paper sheets in the transport device 200*x* at a deceleration region. The deceleration region is a region in which the speed of banknotes is to be decelerated. For example, when banknotes (the moving body 200) move from the bank end to the safe unit 700, a portion of a predetermined distance from the safe unit 700 on the transport route is the deceleration region (see FIG. 30(*b*) described later). In the period in which the moving body 200 moves in the deceleration region, the banknote transport system 10 is controlled to be brought to a decelerated state described later.

The deceleration region can be properly changed. For example, when the transport route includes a curve, a portion immediately before the curve may be set as the deceleration region. As will be described later in detail, the transport device 200*x* according to the present embodiment is provided with sensors Sb. A specific sensor Sb (a sensor Sb at a detection position P14 described later) is brought to an ON-state when banknotes (the transport body 500) arrive at the deceleration region in the transport device 200*x*. The detecting unit 102*x* detects arrival of banknotes in the transport device 200*x* at the deceleration region when the sensor Sb changes to an ON-state.

The adjusting unit 103*x* adjusts the air flow generated by the air blowing device 300*x* according to the speed of banknotes measured by the measuring unit 101*x*. Specifically, the adjusting unit 103*x* adjusts (decreases, maintains, or increases) an output intensity Q of the air blowing device 300*x* (the intensity of output for rotating blades of the blower 310). For example, the adjusting unit 103*x* adjusts the output intensity Q of the air blowing device 300*x* to cause the speed of banknotes in a constant-speed state (see FIG. 30(*b*)) described later to fall within a predetermined range (from a speed Vb (about 1600 millimeters (mm)/second) to a speed Va2 (about 2200 mm/sec)). Specifically, when banknotes in the constant-speed state are slower than the speed Vb, the adjusting unit 103*x* increases the output intensity Q of the air blowing device 300*x*. On the other hand, when banknotes in the constant-speed state are faster than the speed Va2, the adjusting unit 103*x* decreases the output intensity Q of the air blowing device 300*x*.

When banknotes in the deceleration region (the decelerated state) are faster than a specific speed (a speed Vd1 described later), the adjusting unit 103*x* causes the air blowing device 300*x* to generate an air flow in a direction (the opposite direction) opposite to the air flow for transporting the banknotes. Specifically, when the banknotes in the deceleration region are faster than the specific speed, the adjusting unit 103*x* changes the switching valve 325 to the opposite direction position to generate the air flow in the opposite direction. The configuration described above has an advantage that the speed of banknotes (the moving body 200) in the safe unit 700 is more likely to be sufficiently lowered (to have an appropriate magnitude).

When banknotes in the deceleration region are at a predetermined speed (a speed lower than the speed Vd1 and higher than a speed Vd2 described later) equal to or lower than the specific speed, the adjusting unit 103*x* stops the air flow in the air blowing device 300*x*. Specifically, when banknotes in the deceleration region are at the predetermined speed, the adjusting unit 103*x* changes the switching valve 325 to the neutral position to stop the air flow for transporting banknotes (the air flow in the air blowing tube 100). When the air blowing device 300*x* stops the air flow in the air blowing tube 100, the moving body 200 decelerates due to an air resistance and a frictional force.

A comparative example in which the air flow in the air blowing tube 100 is uniformly changed to the opposite direction regardless of the speed of banknotes in the deceleration region is assumed. In this comparative example, the air flow is changed to the opposite direction even when banknotes are sufficiently decelerated. Therefore, a failure of stopping of the banknotes before arrival at the safe unit 700 is likely to occur. In the present embodiment, in view of these circumstances, there are a case in which the air flow in the opposite direction is generated in the air blowing tube 100 and a case in which the air flow is stopped depending on the speed of banknotes in the deceleration region. In the case in which the air flow in the air blowing tube 100 is stopped, banknotes (the moving body 200) can be more gently decelerated than the case in which the air flow in the opposite direction is generated. The configuration according to the present embodiment has an advantage that the inconvenience described above is suppressed because banknotes are gently decelerated in the case in which the speed in the deceleration region is the predetermined speed lower than the specific speed.

Figure 28A:
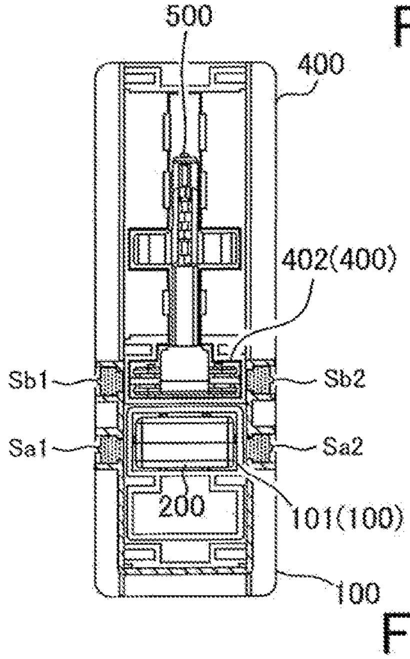
FIG. 28 are diagrams for explaining respective sensors that detect the moving body and the transport body.
Figure 28B:
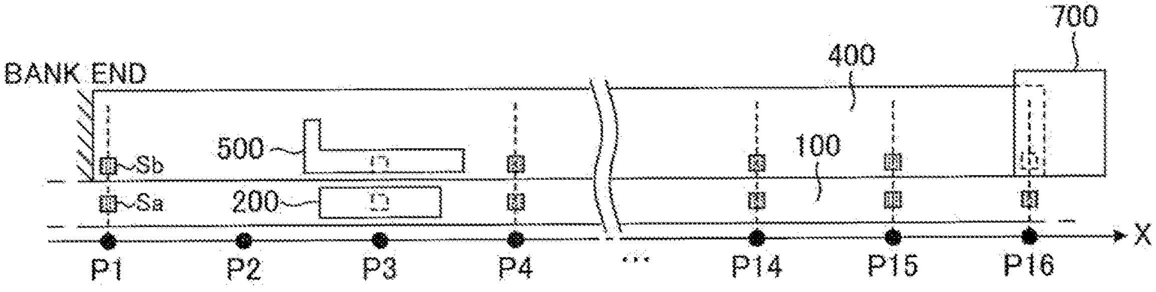

FIG. 28(*a*) is a diagram for explaining a specific example of the sensor Sa and the sensor Sb. FIG. 28(*a*) illustrates a section of the air blowing tube 100 and the transport tube 400 cut in a direction orthogonal to the longitudinal direction. As illustrated in FIG. 28(*a*), the sensor Sa is provided on the air blowing tube 100. The sensor Sa is provided at a location in the longitudinal direction of the air blowing tube 100 (the air flow path 101) to enable the moving body 200 at the associated detection position P (see FIG. 28(*b*)) to be detected. In the present embodiment, a plurality of the sensors Sa are provided on the air flowing tube 100 at a predetermined interval (a plurality of the detection positions P are provided).

Specifically, each of the sensors Sa is configured to include a light emitting element Sa1 and a light receiving element Sa2. The light emitting element Sa1 is provided on one of side walls of the air blowing tube 100 and the light receiving element Sa2 is provided on the other side wall of the air blowing tube 100. In a period in which the moving body 200 is not at the associated detection position P, detection light emitted from the light emitting element Sa1 is received by the light receiving element Sa2. On the other hand, when the moving body 200 reaches the detection position P, the detection light emitted from the light emitting element Sa1 is shielded by the moving body 200 and is not received by the light receiving element Sa2. In the following descriptions, a state in which the detection light is not incident on the light receiving element Sa2 of the sensor Sa is referred to as "ON-state of the sensor Sa (a state in which the moving body 200 is detected)" for sake of explanations.

As illustrated in FIG. 28(*a*), the sensor Sb is provided on the transport tube 400. The sensor Sb detects the transport body 500. A plurality of the sensors Sb are provided for the sensors Sa described above, respectively, and each of the sensors Sb is provided substantially just above the corresponding sensor Sa. Each of the sensors Sb is configured to include a light emitting element Sb1 and a light receiving element Sb2. The light emitting element Sb1 is provided on one of side walls of the transport tube 400 and the light receiving element Sb2 is provided on the other side wall of the transport tube 400. In a period in which the transport body 500 is not at the associated detection position P, detection light emitted from the light emitting element Sb1 is received by the light receiving element Sb2. On the other hand, when the transport body 500 reaches the detection position P, the detection light emitted from the light emitting element Sb1 is shielded by the transport body 500 and is not received by the light receiving element Sb2. A state in which the detection light is not incident on the light receiving element Sb2 of the sensor Sb1 is hereinafter referred to as "ON-state of the sensor Sb (a state in which the transport body 500 is detected)" for sake of explanations.

FIG. 28(*b*) is a diagram for explaining the locations of the sensors Sa in the air blowing tube 100 in the present embodiment. That is, FIG. 28(*b*) is a diagram for explaining a specific example of the detection positions P. As illustrated in FIG. 28(*b*), 16 sensors Sa are provided on the air blowing tube 100 at a predetermined interval in the longitudinal direction. This configuration can be rephrased as that 16 detection positions P are provided in the longitudinal direction of the air blowing tube 100.

In the following descriptions, the travel direction (the positive direction) of the moving body 200 in the collecting operation is referred to also as "X-axis direction" for sake of explanations. That is, the direction from the bank end toward the safe unit 700 in the longitudinal direction of the air blowing tube 100 is the X-axis direction. The detection positions P are a detection position P1, a detection position P2, and a detection position P16 in this order from the bank end. The moving body 200 stays at the detection position P1 in a period in which the collecting operation is not performed. The detection position P16 is located at the safe unit 700. However, the number of the sensors Sa (the detection positions P) and the locations thereof are not limited to this example and can be properly changed.

Figure 29A:
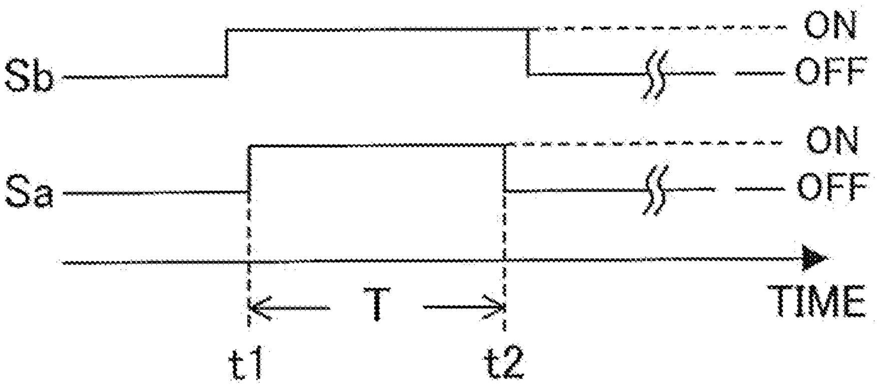
FIG. 29 are diagrams for explaining an example of a measuring method of the speed of the moving body.
Figure 29B:
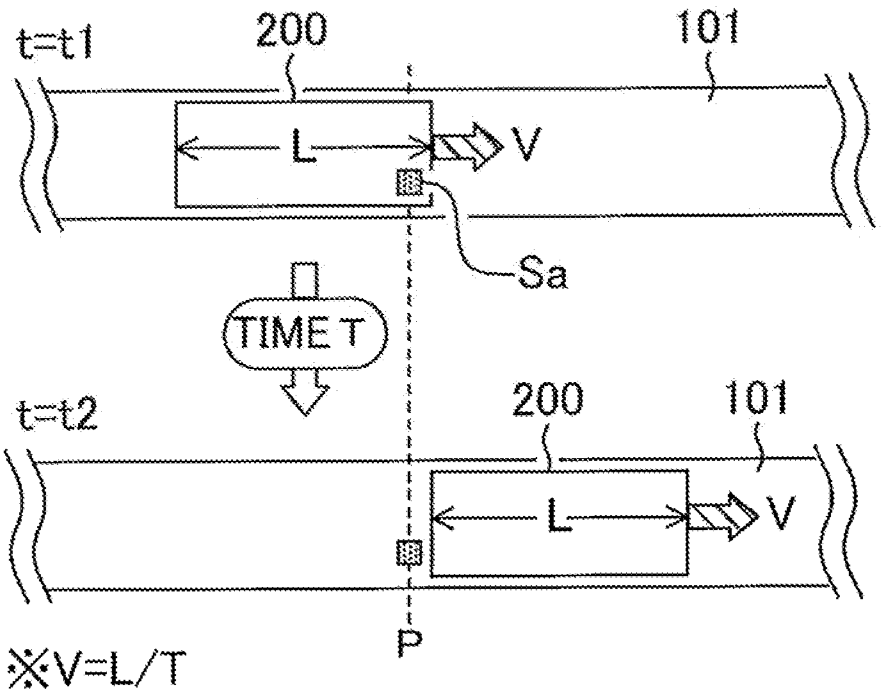

FIG. 29(*a*) is a diagram for explaining a specific example in a period in which the sensor Sa is in an ON-state and a period in which the sensor Sb is in an ON-state. As described above, the sensor Sa is brought to thane ON-state when the moving body 200 reaches the corresponding detection positions P. Specifically, the moving body 200 is about L (mm) in the length in the X-axis direction (the travel direction) (see FIG. 29(*b*) described later). Each of the sensors Sa is in an ON-state from when an end portion (hereinafter, "front end portion") of the moving body 200 in the travel direction reaches the corresponding detection position P until when an end portion (hereinafter, "back end portion") thereof on the opposite side in the travel direction passes through the detection position P (see FIG. 29(*b*)).

In the above configuration, each of the sensors Sa is in an ON-state during a time (hereinafter, "time T") for the moving body 200 to move by the distance L (mm) after arrival of the front end portion of the moving body 200 at the corresponding detection position P. In the specific example illustrated in FIG. 29(*a*), a case in which the front end portion of the moving body 200 reaches one of the detection positions P at a time point t1 and the back end portion passes through the detection position P at a time point t2 is assumed. In the present embodiment, the speed (hereinafter, "speed V") of the moving body 200 at the detection position P is calculated (estimated) using the time T (sec) and the length L (mm) of the moving body 200. The time T is measured, for example, by a predetermined timer.

FIG. 29(*b*) is a diagram for explaining a specific example of a calculation method of the speed V of the moving body 200. In the specific example of FIG. 29(*b*), a case in which the front end portion of the moving body 200 reaches the detection position P at the time point t1 and the back end portion passes through the detection position P at the time point t2 is assumed similarly to the specific example of FIG. 29(*a*) described above. The control device 100*x* (the measuring unit 101*x*) divides the length L (mm) of the moving body 200 by the time T (a time in which the associated sensor Sa is in an ON-state) to calculate the speed V (V=L/T). As will be described later in detail, the control device 100*x* adjusts the output intensity of the air blowing device 300*x* and the position of the switching valve 325 according to the calculated speed V. The calculation method of the speed V can be properly changed and is not limited to this example.

Referring back to FIG. 29(*a*), the sensors Sb that detect the transport body 500 are provided at the detection positions P, respectively, as described above. Therefore, the sensors Sb detect the transport body 500 (are brought to an ON-state) in the period in which the associated sensors Sa detect the moving body 200, respectively. The control device 100*x* of the present embodiment determines that the transport body 500 is positioned on the bank end when the sensor Sb at the detection position P1 (see FIG. 28(*b*)) among the detection positions P is in an ON-state. On the other hand, when the sensor Sb at the detection position P16 among the detection positions P is in an ON-state, the control device 100*x* determines that the transport body 500 is positioned at the safe unit 700.

Figures 30A, 30B:
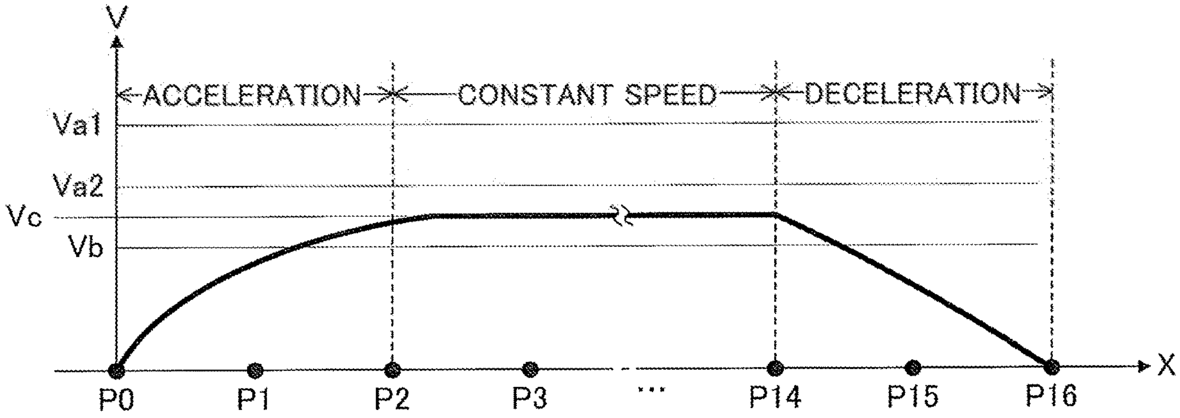
FIG. 30 are diagrams for explaining respective states in a collecting operation.

FIG. 30(*a*) is a diagram for explaining state transition of the banknote transport system 10. The banknote transport system 10 of the present embodiment transitions to a preparatory state, an acceleration state, a constant-speed state, and a deceleration state in this order when performing the collecting operation. FIG. 30(*a*) indicates details of control of the air blowing device 300*x*, and the rotational position (such as the neutral position) of the switching valve 325 in each of the states. As is understood from FIG. 30(*a*), the details of control of the air blowing device 300*x* and the rotational position of the switching valve 325 can differ according to the states.

FIG. 30(*a*) indicates an end moment (a transition moment to the next state) of each of the states. For example, when the collecting operation is started, the banknote transport system 10 transitions to the preparatory state. In the preparatory state, rotation of the blades of the air blowing device 300*x* is started (air blowing is started). However, in the preparatory state, the switching valve 325 is at the neutral position and an air flow (the air flow for moving the moving body 200) is not generated in the air blowing tube 100. The moving body 200 stops at the bank end (the detection position P1) before start of the collecting operation. Accordingly, the moving body 200 remains stopped in the preparatory state.

The control device 100*x* of the present embodiment monitors the number N (number/second) of rotations per unit time of the blades of the air blowing device 300*x* in the preparatory state. Specifically, the blades of the air blowing device 300*x* have stopped before transition to the preparatory state. When the banknote transport system 10 transitions to the preparatory state, the control device 100*x* stepwise increases the output intensity Q of the air blowing device 300*x*. When the output intensity Q is increased, the number N of rotations of the blades of the air blowing device 300*x* increases. The control device 100*x* monitors whether the number N of rotations has reached a predetermined open value Nh in the preparatory state.

When the number N of rotations has reached the open value Nh, the preparatory state ends and the banknote transport system 10 transitions to the acceleration state. When the banknote transport system 10 has transitioned to the acceleration state, the switching valve 325 is rotated to the positive direction position and an air flow in the positive direction is generated in the air blowing tube 100.

In the present embodiment, as is understood from the above explanations, the flow path for generating the air flow in the positive direction in the air blowing tube 100 is closed immediately after start of the rotation of the blades of the air blowing device 300*x* and the flow path is thereafter opened when the number N of rotations has reached the open number Nh. In the above configuration, the air flow in the flow path immediately after the opening is stronger than, for example, in a comparative example in which the flow path has been opened since before the system transitions to the preparatory state (the switching valve 325 is at the positive direction position). Therefore, the acceleration of the moving body 200 immediately after the system transitions to the acceleration state is higher. In the present embodiment described above, an effect where the time required for the moving body 200 to be accelerated to the predetermined speed Vb after the system transitions to the preparatory state is more likely to be shortened, for example, relative to the comparative example has been recognized.

The acceleration state is a state in which the moving body 200 is accelerated to a speed equal to or higher than the speed Vb. Specifically, the control device 100*x* maintains the output intensity Q of the air blowing device 300*x* at a reference intensity Qk in the acceleration state. The reference intensity Qk is an output intensity Q for moving the moving body 200 at a speed Vc in a state in which banknotes are not retained on the transport body 500. This speed Vc is higher than the speed Vb. For example, in a configuration in which the speed Vb is set to about 1600 (mm/sec), the speed Vc is about 2000 (mm/sec). Therefore, when the output intensity Q is maintained at the reference intensity Qk, the moving body 200 is accelerated to a speed equal to or higher than the speed Vb. When the moving body 200 is accelerated to a speed equal to or higher than the speed Vb, the system transitions from the acceleration state to the constant-speed state. As will be described later in detail, the reference intensity Qk varies according to the shape (the length or the like) of the air blowing tube 100. The present embodiment is configured to enable the reference intensity Qk to be automatically calculated (see FIG. 34 described later).

The constant-speed state is a state in which the moving body 200 is moved at a substantially constant speed V. Specifically, in the constant-speed state, the output intensity Q of the air blowing device 300*x* is adjusted to cause the moving body 200 to move in a range from the speed Vb to a speed Va2 (see FIG. 30(*b*) described later). For example, when the moving body 200 moves at a speed equal to or lower than the speed Vb (V≤Vb), the control device 100*x* increases the output intensity Q. On the other hand, when the moving body 200 moves at a speed equal to or higher than the speed Va2 (V≥Va2), the control device 100$x$ decreases the output intensity Q. When the moving body 200 moves at a speed equal to or higher than a speed Va1 that is higher than the speed Va2 (V≥Va1≥Va2), the control device 100$x$ decreases the output intensity Q more than a case in which the moving body 200 moves in a range from the speed Va2 to the speed Va1 (Va1≥V≥Va2). This configuration will be described later in detail with reference to FIG. 31(*a*).

The constant-speed state ends when the moving body 200 (the transport body 500) reaches a preset detection position P. In the present embodiment, the constant-speed state ends when the moving body 200 reaches the detection position P14. Specifically, the constant-speed state ends when the sensor Sb at the detection position P14 detects the transport body 500. When the constant-speed state ends, the banknote transport system 10 transitions to the deceleration state. In the configuration in which the speed Vb is set to about 1600 (mm/sec), a configuration in which the speed Va2 is about 2200 (mm/sec) and the speed Va1 is about 2600 (mm/sec) is suitable.

The deceleration state is a state for decelerating the moving body 200. Specifically, the deceleration state is a state in which the moving body 200 is decelerated to a speed that enables the moving body 200 to safely stop at the safe unit 700 (the detection position P16). In the present embodiment, as described above, the air flow in the opposite direction is generated or generation of an air flow is stopped depending on the speed of banknotes (the moving body 200) in the deceleration state. Specifically, the switching valve 325 is changed to the opposite direction position or is changed to the neutral position depending on the speed of the moving body 200. This configuration will be described in detail later with reference to FIG. 32(*a*). The deceleration state ends when the sensor Sb at the detection position P16 detects the transport body 500.

FIG. 30(*b*) is a diagram for explaining a specific example in which the state of the banknote transport system 10 transitions. FIG. 30(*b*) is a graph with the position (the position in the X-axis direction) in the air blowing tube 100 as the horizontal axis and the speed V of the moving body 200 as the vertical axis. FIG. 30(*b*) indicates a section in which the system is controlled in the acceleration state, a section in which the system is controlled in the constant-speed state, and a section (the deceleration region) in which the system is controlled in the deceleration state in the X-axis direction. The speed Vb (about 1600 mm/sec) and the speed Vc (about 2000 mm/sec) are indicated in FIG. 30(*b*). The speed Va2 (about 2200 mm/sec) and the speed Va1 (about 2600 mm/sec) are also indicated in FIG. 30(*b*).

FIG. 30(*b*) indicates the speed V of the moving body 200 immediately after the system transitions to the acceleration state (immediately after the preparatory state ends) until the deceleration state ends. In the acceleration state, the air flow in the positive direction is generated in the air blowing tube 100 and the moving body 200 is accelerated. The acceleration state ends when the moving body 200 is accelerated to the speed Vb. In the present embodiment, the speed V is measured each time the moving body 200 passes each of the detection positions P and whether the measurement result is equal to or higher than the speed Vb is judged. In the specific example of FIG. 30(*b*), a case in which the measurement result at the detection position P1 is lower than the speed Vb and the measurement result at the following detection position P2 is equal to or higher than the speed Vb is assumed. In this case, the system transitions to the constant-speed state immediately after the moving body 200 passes the detection position P2 as illustrated in FIG. 30(*b*).

In the constant-speed state, the output intensity Q of the air blowing device 300$x$ is adjusted to cause the moving body 200 to move in the range from the speed Vb to the speed Va2. In the constant-speed state of the present embodiment, the speed V is measured each time the moving body 200 passes each of the detection positions P and whether the measurement result is in the range "from Vb to Va2" is judged. When the measurement result is equal to or lower than the speed Vb, the control device 100$x$ increases the output intensity Q. On the other hand, when the measurement result is equal to or higher than the speed Va2, the control device 100$x$ decreases the output intensity Q. In the specific example of FIG. 30(*b*), a case in which the moving body 200 moves at a speed in the range from the speed Va2 to the speed Vb in the constant-speed state is assumed. In this case, the output intensity Q of the air blowing device 300$x$ is not adjusted (is constant).

When the moving body 200 reaches the detection position P14, the system transitions from the constant-speed state to the deceleration state. In the deceleration state, the moving body 200 is decelerated. Specifically, the control device 100$x$ controls the output intensity Q of the air blowing device 300$x$ (the force of the air flow) and the position of the switching valve 325 (the direction of the air flow) according to the speed V measured at the detection position P14 and the speed V measured at the detection position P15.

Figures 31A, 31B:
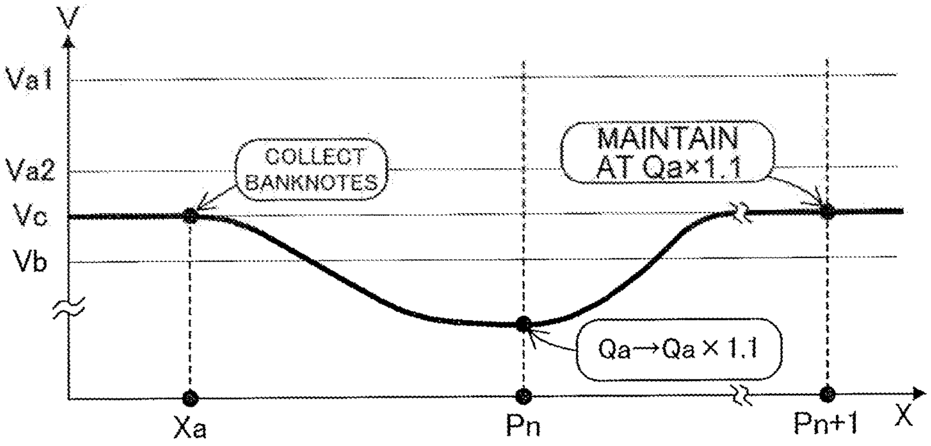
FIG. 31 are diagrams for explaining details of a constant-speed state.

FIG. 31(*a*) is a diagram for explaining details of the constant-speed state. As described above, the system is in the constant-speed state immediately after a detection position P where a speed equal to or higher than the speed Vb (about 1600 mm/sec) has been measured until the detection position P13. In the following descriptions, a detection position P first reached by the moving body 200 in the constant-speed state is referred to as "detection position Px". The control device 100$x$ determines to change or maintain the output intensity Q of the air blowing device 300$x$ according to the speed V at each of the detection positions P(x to 13). FIG. 31(*a*) indicates the changed output intensity Q for each of the speeds V (measurement results).

As described above, control to maintain the speed V of the moving body 200 between the value "Va2" (about 2200 mm/sec) and the value "Vb" is executed in the constant-speed state. Specifically, when the speed V measured (calculated) at a detection position P(x to 13) is equal to or lower than the value "Vb" (V≤Vb), the output intensity Q is changed (increased) by a factor of about 1.1 (Q→Q×1.1). With this configuration, when the moving body 200 is slower than the speed Vb, the output intensity Q is increased and the moving body 200 can accordingly be caused to be faster than the speed Vb.

On the other hand, when the speed V measured at each of the detection positions P(x to 13) is lower than the value "Va1" (about 2600 mm/sec) and equal to or higher than the value "Va2" (Va1>V≥Va2), the output intensity Q is changed (decreased) by a factor of about 0.95 (Q→Q×0.95). With this configuration, when the moving body 200 is faster than the speed Va2, the output intensity Q is decreased and the moving body 200 can accordingly be caused to be slower than the speed Va2.

When the speed V measured at each of the detection positions P(x to 13) is equal to or higher than the value "Va1", the output intensity Q is changed (decreased) by a factor of about 0.7 (Q→Q×0.7). That is, in a case in which the moving body 200 moves at the speed Va1 higher than the speed Va2, the decrease in the output intensity Q is larger than a case in which the moving body 200 is not faster than the speed Va1. This configuration has an advantage that the moving body 200 is likely to be decelerated to a speed equal to or lower than the speed Vb at an earlier stage.

As is understood from the above explanations, in the constant-speed state of the present embodiment, the moving body 200 is accelerated when slower than the speed Vb and is decelerated when faster than the speed Va2. With this configuration, the speed of the moving body 200 in the constant-speed state is adjusted to a value between the value "Va2" and the value "Vb". When the speed V calculated at each of the detection positions P (Px to P13) is in the range from the value "Va2" to the value "Vb", the output intensity Q of the air blowing device 300*x* is not changed (maintained).

FIG. 31(*b*) is a diagram for explaining a specific example in a case in which the output intensity Q is changed in the constant-speed state. FIG. 31(*b*) is a graph with the position (the position in the X-axis direction) in the air blowing tube 100 as the horizontal axis and the speed V of the moving body 200 as the vertical axis similarly to FIG. 30(*b*) described above. FIG. 31(*b*) indicates a specific example in which the moving body 200 decelerates from the speed Vb in the constant-speed state and the output intensity Q is increased. In the specific example of FIG. 31(*b*), a case in which the output intensity Q before changed has a value "Qa" is assumed.

For example, a moment when the transport body 500 retains a new banknote is assumed as a moment when the moving body 200 decelerates. Particularly, there is a situation where the moving body 200 is likely to become slower than the speed Vb when a new banknote is retained on the transport body 500 after plural banknotes are already thereon. In the specific example of FIG. 31(*b*), a case in which a new banknote is retained on the transport body 500 at a position Xa is assumed. A case in which the moving body 200 (the transport body 500) decelerates from the position Xa and a speed equal to or lower than the speed Vb is measured at a detection position Pn ($x \leq n \leq 13$) is assumed. In this case, the output intensity Q of the air blowing device 300*x* is increased from the value "Qa" to a value "Qa×1.1".

In the specific example of FIG. 31(*b*), a case in which a speed V lower than the value "Va2" and higher than the value "Vb" is measured at a detection position Pn+1 following the detection position Pn is assumed. In this case, the output intensity Q after the detection position Pn+1 is maintained at the value "Qa×1.1". When the moving body 200 is slower than the speed Vb at the detection position Pn+1 (when the acceleration is insufficient), the output intensity Q is increased to a value "(Qa×1.1)×1.1".

Figure 32A:
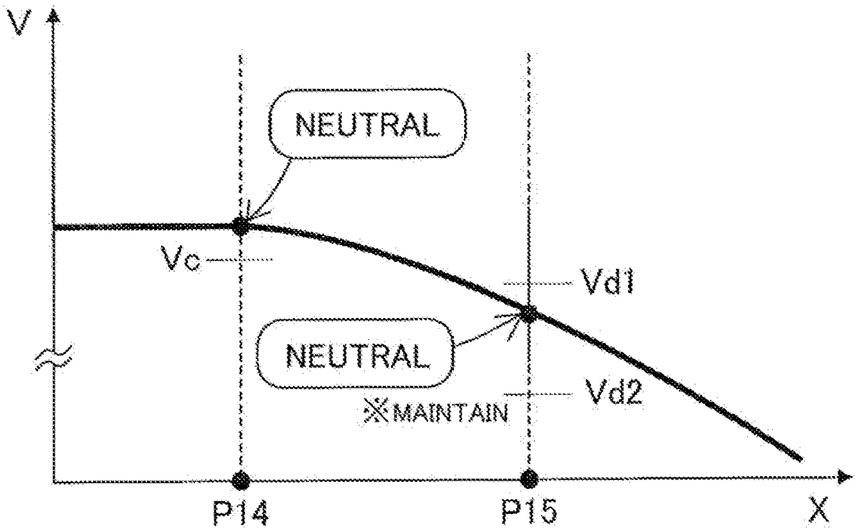
FIG. 32 are diagrams for explaining details of a deceleration state.
Figure 32A:
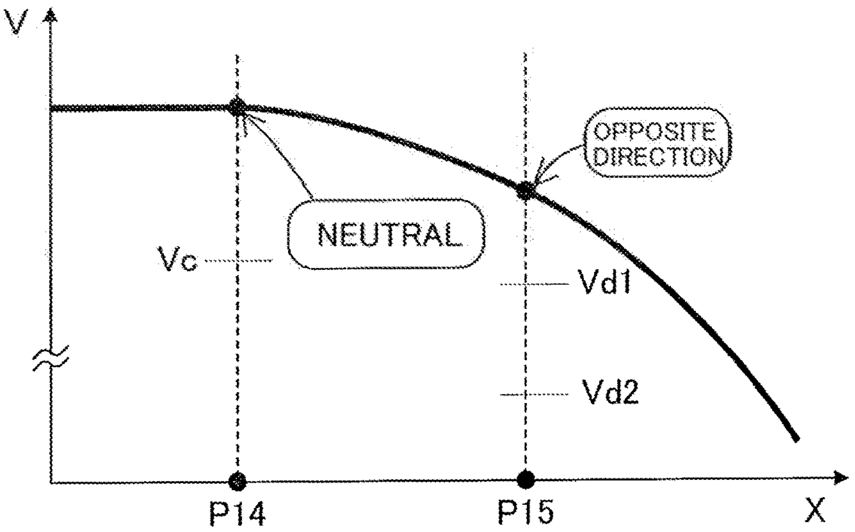

FIG. 32(*a*) is a diagram for explaining details of the deceleration state. As described above, the system transitions to the deceleration state when the moving body 200 reaches the detection position P14. Specifically, the system is in the deceleration state during a period in which the moving body 200 passes the detection position P14 or the detection position P15. At the detection position P14 and the detection position P15, control to decelerate the moving body 200 is executed according to the measured speed V.

In the present embodiment, as illustrated in FIG. 32(*a*), control that can be executed to decelerate the moving body 200 differs between a time when the moving body 200 has passed the detection position P14 and a time when the moving body 200 has subsequently passed the detection position P15. Specifically, when the speed V measured at the detection position P14 is equal to or higher than the value "Vc" (about 2000 mm/sec), the switching valve 325 is changed to the neutral position. That is, when the moving body 200 is faster than the speed Vc at the detection position P14, the air flow (the air flow for transporting the moving body 200) in the air blowing tube 100 is stopped. In this case, the moving body 200 decelerates after passing the detection position P14.

On the other hand, when the speed V measured at the detection position P14 is lower than the value "Vc", the switching valve 325 is maintained at the positive direction position and the output intensity Q of the air blowing device 300*x* is maintained. That is, when the speed V measured at the detection position P14 is lower than the value "Vc", no special control to decelerate the moving body 200 is executed when the moving body 200 passes the detection position P14.

When the speed V measured at the detection position P15 is equal to or higher than the value "Vd1" (for example, about 1800 mm/sec), the switching valve 325 is changed to the opposite direction position in a state in which the output intensity Q of the air blowing device 300*x* is maintained. That is, when the moving body 200 is faster than the speed Vd1 at the detection position P15, the air flow in the opposite direction to the travel direction of the moving body 200 is generated in the air blowing tube 100. A configuration in which the output intensity Q of the air blowing device 300*x* is changed at the time when the switching valve 325 is changed to the opposite direction position may be applied. For example, a configuration in which the output intensity Q of the air blowing device 300*x* is changed to the reference intensity Qk (the initial value) in the case described above may be applied.

When the speed V measured at the detection position P15 is lower than the value "Vd1" and equal to or higher than the value "Vd2" (for example, about 1400 mm/sec), the switching valve 325 is changed to the neutral position. As described above, when the switching valve 325 is changed to the neutral position, the moving body 200 decelerates more gently than a case in which the switching valve 325 is changed to the opposite direction position. In the present embodiment described above, an inconvenience that the moving body 200 stops before reaching the safe unit 700 can be suppressed as compared to a configuration in which the air flow in the opposite direction is uniformly generated (even if the moving body 200 is sufficiently slow) when the moving body 200 reaches the detection position P15.

When the speed V measured at the detection position P15 is lower than the value "Vd2" (about 1400 mm/sec), the switching valve 325 is changed to the positive direction position and the output intensity Q of the air blowing device 300*x* is changed to the reference intensity Qk. That is, when the moving body 200 passes the detection position P15 at a speed lower than the speed Vd2, the air blowing device 300*x* generates the air flow in the positive direction. With the configuration described above, an effect where the inconvenience that the moving body 200 stops before reaching the safe unit 700 can be suppressed is especially noticeable. The output intensity Q of the air blowing device 300*x* in the case in which the speed V measured at the detection position P15 is lower than the value "Vd2" is not limited to the reference intensity Qk. For example, the output intensity Q at the time when the moving body 200 has reached the detection position P14 may be adopted.

FIG. 32(*b*-1) is a diagram for explaining a specific example of the deceleration state. FIG. 32(*b*-1) is a graph with the position (the position in the X-axis direction) in the air blowing tube 100 as the horizontal axis and the speed V of the moving body 200 as the vertical axis similarly to FIGS. 30(*b*) and 31(*b*) described above (the same holds for FIG. 32(*b*-2) described later). In the specific example of FIG. 32(*b*-1), a case in which the moving body 200 passes the detection position P14 at a speed equal to or higher than the speed Vc (about 2000 mm/sec) is assumed. In this case, the switching valve 325 is changed to the neutral position to decelerate the moving body 200 (see FIG. 32(*a*) described above).

In the specific example of FIG. 32(*b*-1), a case in which the speed V of the moving body 200 measured at the detection position P15 is lower than the value "Vd1" (about 1800 mm/sec) and equal to or higher than the value "Vd2" (about 1400 mm/sec) is assumed (Vd1>V≥Vd2). In this case, the switching valve 325 is changed to the neutral position (see FIG. 32(*a*) described above). In the specific example of FIG. 32(*b*-1), the switching valve 325 has already been changed to the neutral position at the detection position P14. Therefore, at the detection position P15, the switching valve 325 is maintained at the neutral position. In this specific example of FIG. 32(*b*-1), the switching valve 325 is maintained at the neutral position from when the moving body 200 has passed the detection position P14 until when the moving body 200 reaches the safe unit 700 (the detection position P16). Therefore, the moving body 200 gently decelerates from the detection position P14 to the detection position P16.

FIG. 32(*b*-2) is a diagram for explaining another specific example of the deceleration state. In the specific example of FIG. 32(*b*-2), a case in which the moving body 200 passes the detection position P14 at a speed higher than the speed Vc is assumed similarly to FIG. 32(*b*-1) described above. In this case, the switching valve 325 is changed to the neutral position to decelerate the moving body 200 (see FIG. 32(*a*) described above).

In the specific example of FIG. 32(*b*-2), a case in which the moving body 200 passes the detection position P15 at a speed equal to or higher than the speed Vd1 is assumed. In this case, the switching valve 325 is changed to the opposite direction position (see FIG. 32(*a*) described above). That is, the air flow in the opposite direction for decelerating the moving body 200 is generated in the air blowing tube 100 in a period after the moving body 200 passes the detection position P15. With the configuration described above, the moving body 200 is easily sufficiently decelerated before the detection position P16 even if the moving body 200 passes the detection position P15 at a speed equal to or higher than the speed Vd1.

Figure 33A:
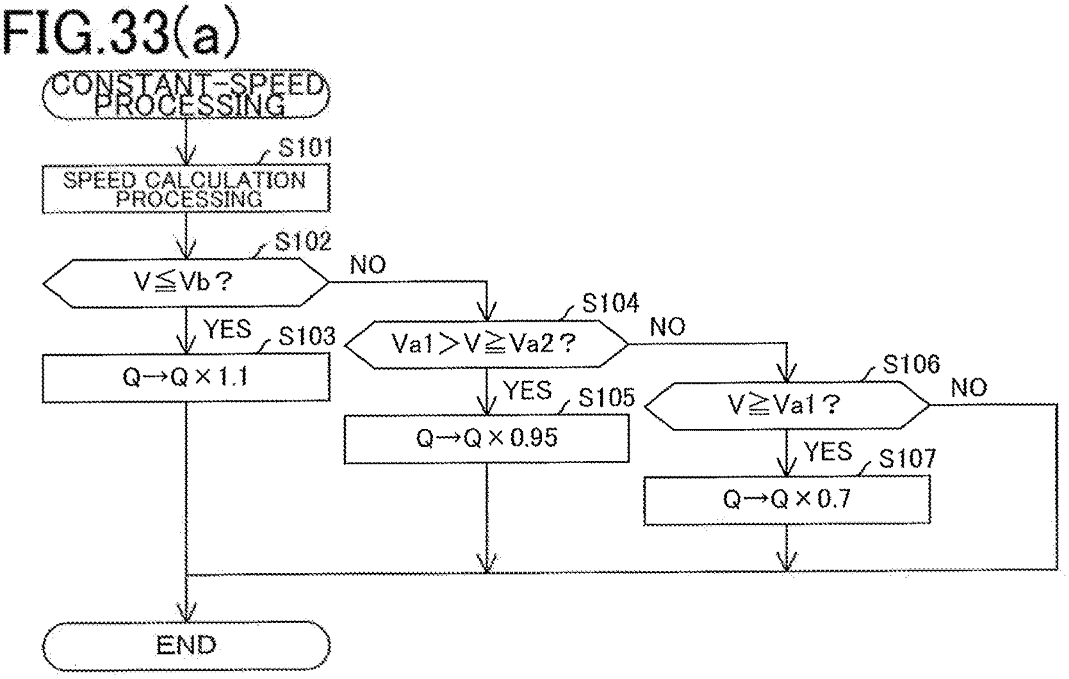
FIG. 33 are flowcharts of respective processing by a control device in the collecting operation.
Figure 33A:
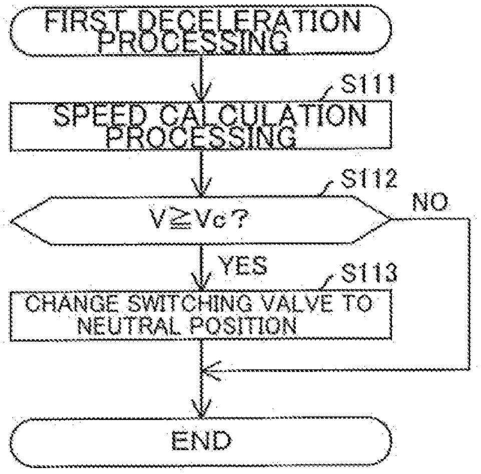
Figure 33A:
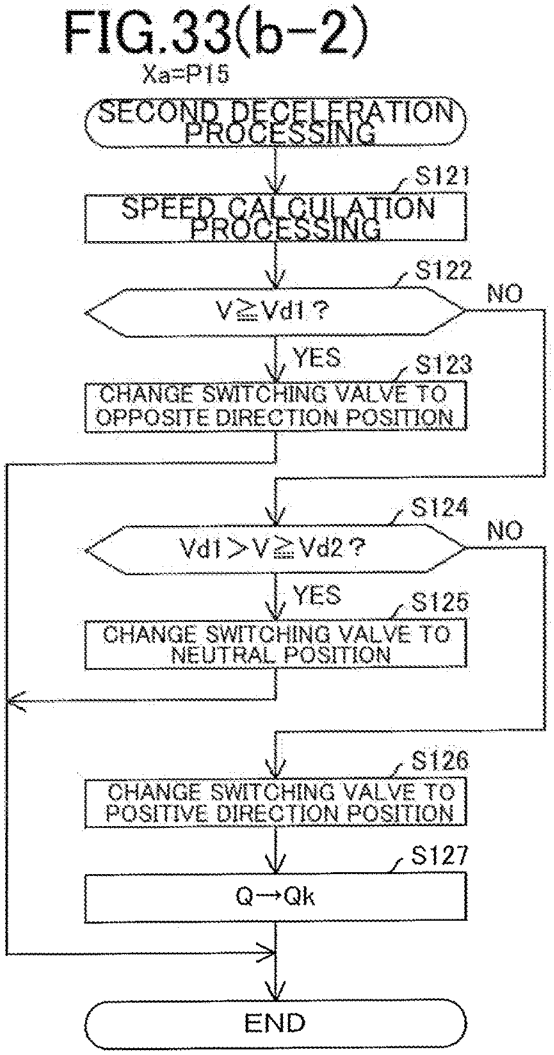

FIG. 33(*a*) is a flowchart of constant-speed processing. The control device 100*x* performs constant-speed processing when the moving body 200 passes the detection position P (Px to P13) in the constant-speed state. However, the period in which the constant-speed processing is performed and specific details of the constant-speed processing can be properly changed.

When the constant-speed processing is started, the control device 100*x* performs speed calculation processing (S101). In the speed calculation processing, the speed V of the moving body 200 at a detection position P having passed this time is calculated. Specifically, the control device 100*x* divides the length L (mm) of the moving body 200 by the time T (sec) in which the sensor Sa of this detection position P is in an ON-state and stores therein the calculated result as the speed V (V=L/T).

After performing the speed calculation processing, the control device 100*x* judges whether the speed V calculated in the speed calculation processing is equal to or lower than the value "Vb" (about 1600 mm/sec) (S102). When determining that the speed V is equal to or lower than the value "Vb" (YES at S102), the control device 100*x* multiplies the output intensity Q (the current value) of the air blowing device 300*x* by 1.1 (S103) and ends the constant-speed processing. On the other hand, when determining that the speed V is not equal to or lower than the value "Vb" (NO at S102), the control device 100*x* judges whether the speed V is lower than the value "Va1" (about 2600 mm/sec) and equal to or higher than the value "Va2" (about 2200 mm/sec) (S104).

When the speed V is lower than the value "Va1" and equal to or higher than the value "Va2" (YES at S104), the control device 100*x* multiplies the output intensity Q (the current value) of the air blowing device 300*x* by 0.95 (S105) and ends the constant-speed processing. On the other hand, when the speed V is not lower than the value "Va1" and is not equal to or higher than the value "Va2" (NO at S104), the control device 100*x* judges whether the speed V is equal to or higher than the value "Va1" (S106). When determining that the speed V is equal to or higher than the value "Va1" (YES at S106), the control device 100*x* multiplies the output intensity Q (the current value) of the air blowing device 300*x* by 0.7 (S107) and ends the constant-speed processing.

When determining that the speed V calculated in the speed calculation processing is not equal to or higher than the value "Va1" (NO at S106), the control device 100*x* does not change (maintains) the output intensity Q of the air blowing device 300*x* and ends the constant-speed processing. A case in which "NO" is determined at all of Steps S102, S104, and S106 is a case in which the speed V is lower than the value "Va2" and higher than the value "Vb" (Va2>V>Vb).

FIG. 33(*b*-1) is a flowchart of first deceleration processing. The control device 100*x* performs first deceleration processing when the moving body 200 has passed the detection position P14 in the deceleration state. When the first deceleration processing is started, the control device 100*x* performs speed calculation processing (S111). In the speed calculation processing of the first deceleration processing, the speed V of the moving body 200 at the time of passing the detection position P14 is calculated by the same method as that in the speed calculation processing of the constant-speed processing described above. After performing the speed calculation processing, the control device 100*x* judges whether the speed V is equal to or higher than the value "Vc" (about 2000 mm/sec) (S112).

When determining that the speed V is equal to or higher than the value "Ve" (YES at S112), the control device 100*x* changes the switching valve 325 to the neutral position (S113) and ends the first deceleration processing. On the other hand, when determining that the speed V is not equal to or higher than the value "Vc" (NO at S112), the control device 100*x* omits Step S113 described above and ends the first deceleration processing. In this case, the switching valve 325 is maintained at the positive direction position before and after the first deceleration processing.

FIG. 33(*b*-2) is a flowchart of second deceleration processing. The control device 100*x* performs the second deceleration processing when the moving body 200 has passed the detection position P15 in the deceleration state. When the second deceleration processing is started, the control device 100*x* performs speed calculation processing (S121). In this speed calculation processing, the speed V of the moving body 200 at the time of passing the detection position P15 is calculated by the same method as that in the speed calculation processing of the constant-speed processing described above. After performing the speed calculation processing, the control device 100*x* judges whether the speed V is equal to or higher than the value "Vd1" (about 1800 mm/sec) (S122).

When determining that the speed V is equal to or higher than the value "Vd1" (YES at S122), the control device 100*x* changes the switching valve 325 to the opposite direction position (S123) and ends the second deceleration processing. When determining that the speed V is not equal to or higher than the value "Vd1" (NO at S122), the control device 100*x* judges whether the speed V is lower than the value "Vd1" and equal to or higher than the value "Vd2" (about 1400 mm/sec) (S124). When determining that the speed V is lower than the value "Vd1" and equal to or higher than the value "Vd2" (YES at S124), the control device 100*x* changes the switching valve 325 to the neutral position and ends the second deceleration processing.

When determining that the speed V calculated in the speed calculation processing is not lower than the value "Vd1" and is not equal to or higher than the value "Vd2" (NO at S124), the control device 100*x* performs processing at Step S126. A case in which "NO" is determined at both Steps S122 and S124 is a case in which the speed V is lower than the value "Vd2" (V<Vd2). When the speed V is lower than the value "Vd2", the control device 100*x* changes the switching valve to the positive direction position (S126) and changes the output intensity Q of the air blowing device 300*x* to the reference intensity Qk (S127). After changing the output intensity Q, the control device 100*x* ends the second deceleration processing.

Figure 34:
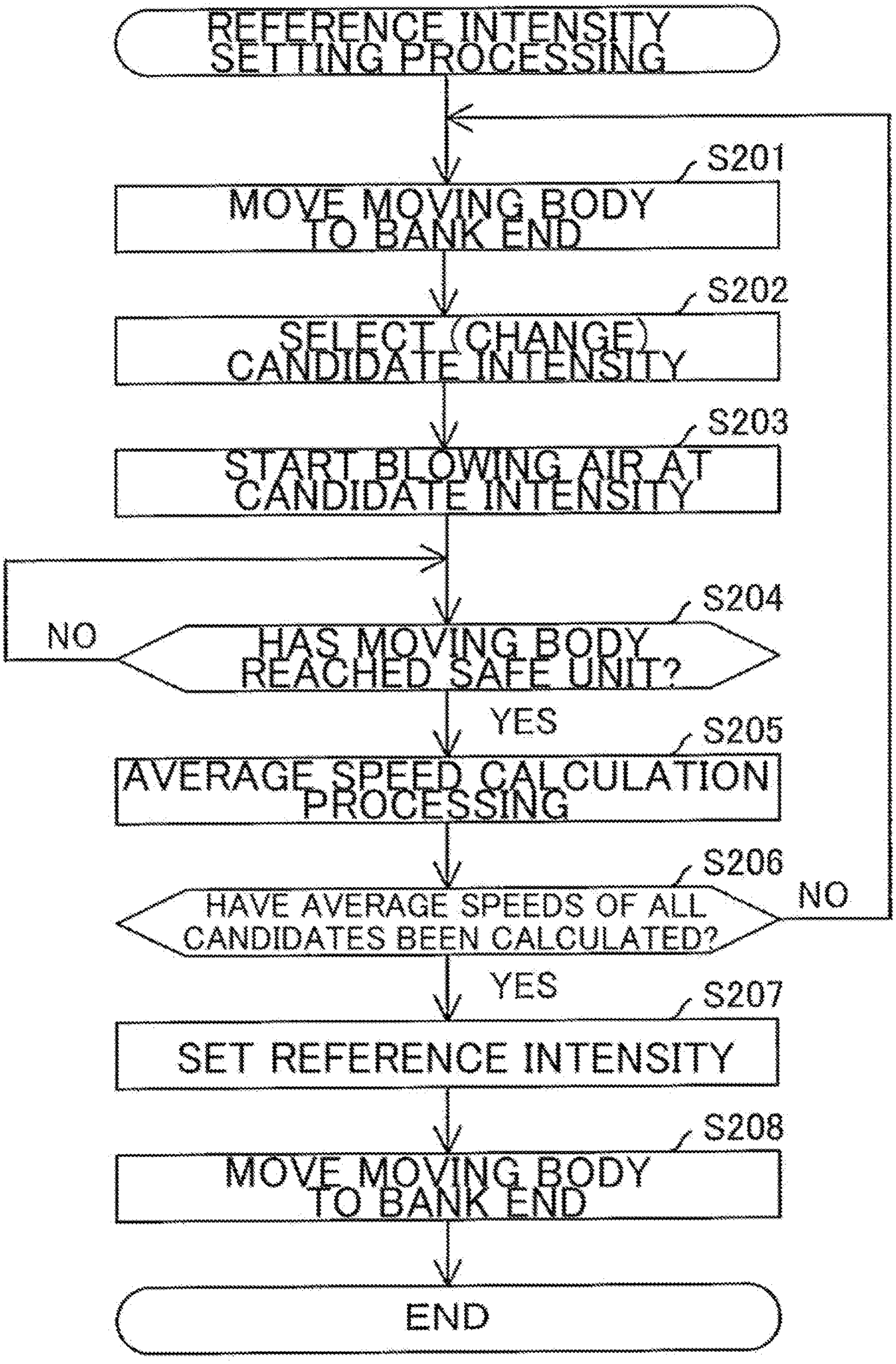
FIG. 34 is a flowchart of reference intensity setting processing by the control device.

FIG. 34 is a flowchart of reference intensity setting processing. As described above, the reference intensity Qk is an output intensity Q that enables the moving body 200 to move at the speed Vc in a state in which banknotes are not retained on the transport body 500. This reference intensity Qk can vary, for example, according to the shape (the length or the like) of the air blowing tube 100. The control device 100*x* of the present embodiment automatically sets the reference intensity Qk by performing the reference intensity setting processing. The reference intensity setting processing is performed, for example, outside the opening hours of a game hall. Therefore, banknotes are not collected by the transport body 500 in the reference intensity setting processing.

When the reference intensity setting processing is started, the control device 100*x* moves the moving body 200 to the bank end (the detection position P1) (S201). Subsequently, the control device 100*x* selects one candidate intensity Qx from a plurality of candidate intensities Qx (S202). As will be described later in detail, the processing at Step S202 is repeatedly performed. One is selected from all the candidate intensities Qx at the first step S202, and one other than the already selected candidate intensity (or intensities) Qx is selected at the next and subsequent steps S202. The control device 100*x* causes the air blowing device 300*x* to start blowing air at the candidate intensity Qx selected at the immediately preceding step S202 (to transition to the acceleration state through the preparatory state) (S203).

After causing the air blowing device 300*x* to start blowing air, the control device 100*x* judges whether the moving body 200 has reached the safe unit 700 (the detection position P16) (S204). The control device 100*x* repeatedly performs the processing at Step S204 until determining that the moving body 200 has reached the safe unit 700 (NO at S204). When determining that the moving body 200 has reached the safe unit 700 (YES at S204), the control device 100*x* causes the processing to proceed to average speed calculation processing (Step S205). In the reference intensity setting processing of the present embodiment, the output intensity Q of the air blowing device 300*x* is not changed from the selected candidate intensity Qx during a period in which the moving body 200 moves.

In the average speed calculation processing, an average speed Vx of the moving body 200 moving with the air flow generated at the selected candidate intensity Qx is calculated.

Specifically, in the reference intensity setting processing, the speed V of the moving body 200 is measured at each of the detection positions P. The control device 100*x* identifies detection positions P (hereinafter, "target positions Pm") after a detection position P where a speed V equal to or higher than the speed Vb (about 1600 mm/sec) has been first measured among the detection positions P. The control device 100*x* sums up the speeds V measured at the target positions Pm and divides the result of the sum by the number of the target positions Pm to store the obtained result as the average speed Vx of the current candidate intensity Qx.

After performing the average speed calculation processing, the control device 100*x* judges whether the average speed Vx has been calculated for all the candidate intensities Qx (S206). When a candidate intensity Qx for which the average speed Vx has not been calculated remains (NO at S206), the control device 100*x* repeatedly performs the processing from Step S201 to Step S205 described above. When thereafter determining that the average speed Vx has been calculated for all the candidate intensities Qx (YES at S206), the control device 100*x* sets the reference intensity Qk (S207).

Specifically, the control device 100*x* sets a candidate intensity Qx that provides the average speed Vx closest to the value "Ve" (about 2000 mm/sec) among the candidate intensities Qx as the reference intensity Qk. After setting the reference intensity Qk, the control device 100*x* moves the moving body 200 to the bank end (S208) and ends the reference intensity setting processing. A configuration in which the reference intensity setting processing can be performed at a timing desired by a user is suitable. Specifically, a configuration in which the user properly operates the control device 100*x* to perform the reference intensity setting processing is suitable.

<Modification>

The respective modes described above may be variously modified. Specific aspects of modifications are exemplified below. Two or more of aspects arbitrarily selected from the following examples may be appropriately combined with each other.

(1) Stop of the moving body 200 (banknotes) may be detected in the middle of the collecting operation in each mode. For example, a modification in which stop detection processing is performed may be adopted. A stop judging timer for measuring the time is provided in this modification. The stop judging timer is initialized each time the moving body 200 (the transport body 500) is detected at any of the detection positions P. Therefore, the value of the stop judging timer normally does not exceed a predetermined threshold (for example, four seconds) unless the moving body 200 stops or becomes extremely slow in the collecting operation. In the stop detection processing, the value of the stop judging timer is monitored and it is determined that the moving body 200 has stopped when the value exceeds the threshold described above. In the present modification, it is determined that the moving body 200 has stopped when the calculated speed V in the speed calculation processing at a time when the moving body 200 passes each of the detection positions P is equal to or lower than a value "50" (mm/sec).

In this modification, a configuration in which the output intensity Q of the air blowing device 300x is increased when it is determined that the moving body 200 has stopped is suitable. For example, a configuration in which the output intensity Q is increased by a factor of about 1.3 when it is determined that the moving body 200 has stopped is conceivable. A configuration in which the normal processing in each state (the processing in the acceleration state, the constant-speed processing, the first deceleration processing, and the second deceleration processing) is performed after the output intensity Q is increased by a factor of about 1.3 is suitable. A configuration in which it is informed that stop of the moving body 200 has been determined may be applied. A configuration in which the processing to detect stop of the moving body 200 described above is performed in all the acceleration state, the constant-speed state, and the deceleration state is suitable.

(2) In the collecting operation in each mode, a failure in which the moving body 200 is separated from the transport body 500 (the moving body magnets 213 are separated from the transport body magnets 523) may occur. Therefore, a configuration in which separation of the moving body 200 from the transport body 500 can be detected is suitable. For example, when the moving body 200 is separated from the transport body 500, only the moving body 200 moves in the air blowing tube 100 and the transport body 500 stops inside the transport tube 400. In this case, only one of a relevant sensor Sa and a sensor Sb corresponding to (provided just above) the sensor Sa (see FIG. 27(*a*)) is brought to an ON-state. In view of these circumstances, a configuration in which separation of the moving body 200 from the transport body 500 is determined when only one of the sensor Sa and the corresponding sensor Sb is brought to an ON-state can be adopted.

When the moving body 200 is separated from the transport body 500, the moving body 200 rapidly becomes faster. In view of these circumstances, a configuration in which the position of the switching valve 325 is changed to generate an air flow in the opposite direction to the travel direction of the moving body 200 in the air blowing tube 100 when it is determined that the moving body 200 is separated from the transport body 500 is suitable.

(3) While the speed of the moving body 200 is calculated as the speed of banknotes in each mode, the calculation method of the speed of banknotes can be properly changed. For example, the speed of banknotes may be calculated by dividing the length in the X-axis direction of the transport body 500 by the time length in which the sensor Sb is in an ON-state. That is, the speed of banknotes can be obtained by calculating the speed of any object as long as the object moves integrally with the banknotes. A configuration in which a sensor that is brought to an ON-state during a period in which banknotes pass through is provided in the transport tube 400 and the speed of the banknotes is calculated by dividing the length of the banknotes in the X-axis direction by the time when the sensor is in an ON-state may be applied. With this configuration, the present invention can be applied to the technique in Patent Literature 1, for example.

(4) In each mode, a configuration in which the system transitions to the preparatory state, the acceleration state, the constant-speed state, and the deceleration state also in an operation (hereinafter, "return operation") to return the moving body 200 from the safe unit 700 to the bank end similarly to the collecting operation is suitable. However, the directions of the air flow in the air blowing tube 100 in the collecting operation and the return operation are opposite to each other (the position of the switching valve 325 differs). In the return operation, for example, the system transitions to the deceleration state when the moving body 200 reaches the detection position P3.

<Summary of Actions and Effects of Aspects of Present Embodiment>

<First Aspect>

A paper sheet transport system (the banknote transport system 10) according to the present aspect is a paper sheet transport system including: an air blowing device (300x) that generates an air flow (an air flow in the air blowing tube 100) for transporting paper sheets; a transport device (200x) that transports paper sheets with the air flow; and a control device (100x) that controls the air blowing device, wherein the control device includes a measuring unit (100x) that measures a speed of paper sheets on the transport device, and an adjusting unit (103x) that adjusts the air flow according to a result of the measurement. According to the present aspect, the speed of paper sheets on the transport device is measured and the air flow of the air blowing device is adjusted according to the result of the measurement. Therefore, the air flow generated by the air blowing device can be more easily adjusted than a configuration in which the air flow generated by the air blowing device is manually adjusted.

<Second Aspect>

In the paper sheet transport system according to the present aspect, the control device includes a detecting unit (102x) that detects arrival of paper sheets at a deceleration region, and when paper sheets in the deceleration region (the detection position P15) are faster than a specific speed (Vd1), the adjusting unit causes the air blowing device to generate an air flow in an opposite direction to that of an air flow for transporting the paper sheets (see FIG. 32(*b*-2)). The present aspect has an advantage of being able to more quickly decelerate paper sheets than in, for example, a configuration in which an air flow in the opposite direction to that of the air flow for transporting paper sheets cannot be generated.

<Third Aspect>

In the paper sheet transport system according to the present aspect, the adjusting unit stops the air flow when paper sheets in the deceleration region are at a predetermined speed (between Vd1 and Vd2 at the detection position P15) equal to or lower than the specific speed (see FIG. 32(*b*-1)). The present aspect has an advantage of suppressing an inconvenience that paper sheets stop during transport, for example, as compared to a configuration in which an air flow in the opposite direction is uniformly generated regardless of the speed of paper sheets.

<Fourth Aspect>

A control device (100x) according to the present aspect is a control device that controls an air blowing device that generates an air flow for transporting paper sheets with a transport device and includes: a measuring unit that measures a speed of paper sheets on the transport device; and an adjusting unit that adjusts the air flow generated by the air blowing device according to a result of the measurement. According to the preset aspect, identical effects as those of the first aspect described above can be attained.

<Fifth Aspect>

A control method according to the present aspect is a control method of an air blowing device that generates an air flow for transporting paper sheets with a transport device and includes: a step of measuring a speed of paper sheets on the transport device (S101 in FIG. 33(*a*), S111 in FIG. 33(*b*-1), and S121 in FIG. 33(*b*-2)); and a step of adjusting the air flow generated by the air blowing device according to a result of the measurement (S103, S105, and S107 in FIG. 33(*a*), S113 in FIG. 33(*b*-1), and S123, S125, and S127 in FIG. 33(*b*-2)). According to the preset aspect, identical effects as those of the first aspect described above can be attained.

<Sixth Aspect>

A program according to the present aspect is a program that causes a computer to execute the steps described in the fifth aspect. According to the preset aspect, identical effects as those of the first aspect described above can be attained.

REFERENCE SIGNS LIST

10 banknote transport system, 100 air blowing tube, 1000 management unit, 1001 body, 100*x* control device, 101 air flow path, 101*x* measuring unit, 102*x* detecting unit, 103*x* adjusting unit, 110 first air blowing tube, 111 moving route part, 120 second air blowing tube, 200 moving body, 200*x* transport device, 300*x* air blowing device, 310 blower, 320 switching unit, 321 casing, 323 flow path, 325 switching valve, 331 air discharge tube, 333 air intake tube, 340 connection pipe, 400 transport tube, 450 keeping part, 500 transport body, 510 transport base, 520 divided piece, 521 hinge, 525 roller, 540 banknote collecting/retaining part, 541 support member, 544 collecting pawl, 545 roller, 600 receiving unit, 700 safe unit.

The invention claimed is:

1. A paper sheet transport system comprising:

an air blowing device that generates an air flow;

a transport device that transports paper sheets with the air flow; and a control device that controls the air blowing device, wherein the transport device includes a transport path where paper sheets are transports, and a transport body that moves in the transport path by the air flow, and moves with the paper sheets after the transport body reaches the paper sheets in a first area in the middle of the transport route, the control device includes a detecting unit that detects the transport body reaches a second area from the first area, a measuring unit that measures a speed of the transport body in the first area and a speed of the transport body in the second area, and an adjusting unit that adjusts the air flow according to the speed of the transport body in the first area and causes the air blowing device to generate an air flow in a direction opposite to an air flow for transporting the transport body when the transport body in the second area moves faster than a specific speed.

2. The paper sheet transport system according to claim 1, wherein the adjusting unit stops the air flow when the transport body in the second area is at a predetermined speed equal to or lower than the specific speed.

3. The paper sheet transport system according to claim 1, comprising a setting unit that sets a reference intensity of the air flow by moving the transport body during a period when there are no paper sheets on the transport path.

4. A control device that controls an air blowing device that generates an air flow for transporting paper sheets with a transport device, the transport device comprising:

a transport path where paper sheets are transports, and a transport body that moves in the transport path by the air flow, and moves with the paper sheets after the transport body reaches the paper sheets in a first area in the middle of the transport route, and the control device comprising:

a detecting unit that detects the transport body reaches a second area from the first area, a measuring unit that measures a speed of the transport body in the first area and a speed of the transport body in the second area, and an adjusting unit that adjusts the air flow according to the speed of the transport body in the first area and causes the air blowing device to generate an air flow in a direction opposite to an air flow for transporting the transport body when the transport body in the second area moves faster than a specific speed.

5. A control method of an air blowing device that generates an air flow for transporting paper sheets with a transport device, the transport device comprising:

a transport path where paper sheets are transports, and a transport body that moves in the transport path by the air flow, and moves with the paper sheets after the transport body reaches the paper sheets in a first area in the middle of the transport route, and the control method comprising:

a step of measuring a speed of the transport body in the first area, a step of adjusting the air flow according to the speed of the transport body in the first area a step of detecting that the transport body reaches the second area from the first area, a step of measuring a speed of the transport body in the second area, and, a step of causing the air blowing device to generate an air flow in a direction opposite to an air flow for transporting the transport body when the transport body in the second area moves faster than a specific speed.

6. A non-transitory storage medium storing a program for controlling an air blowing device that generates an air flow for transporting paper sheets with a transport device, the transport device comprising:

a transport path where paper sheets are transports, and a transport body that moves in the transport path by the air flow, and moves with the paper sheets after the transport body reaches the paper sheets in a first area in the middle of the transport route, and wherein the program causing a computer to execute:

a step of measuring a speed of the transport body in the first area, a step of adjusting the air flow according to the speed of the transport body in the first area a step of detecting that the transport body reaches the second area from the first area, a step of measuring a speed of the transport body in the second area, and, a step of causing the air blowing device to generate an air flow in a direction opposite to an air flow for transporting the transport body when the transport body in the second area moves faster than a specific speed.

* * * * *